(12) United States Patent
McKenzie et al.

(10) Patent No.: US 7,207,326 B2
(45) Date of Patent: Apr. 24, 2007

(54) GAS BARBEQUE ASSEMBLY

(76) Inventors: Stuart T. McKenzie, R.R. #1, Box 16, L45 BC4, Tiny T.P., Wyevale, Ontario (CA) L0L 2T0; Sydney Richard Barkhouse, 988 Fernandez Drive, Mississauga, Ontario (CA) L5V 1W9

( * ) Notice: Subject to any disclaimer, the term of this patent is extended or adjusted under 35 U.S.C. 154(b) by 268 days.

(21) Appl. No.: 10/478,511

(22) PCT Filed: Oct. 31, 2001

(86) PCT No.: PCT/CA01/01533

§ 371 (c)(1),
(2), (4) Date: Nov. 24, 2003

(87) PCT Pub. No.: WO02/094071

PCT Pub. Date: Nov. 28, 2002

(65) Prior Publication Data

US 2004/0244790 A1    Dec. 9, 2004

(30) Foreign Application Priority Data

May 24, 2001  (CA) ..................................... 2348316
Aug. 7, 2001  (CA) ..................................... 2354785

(51) Int. Cl.
*F24C 3/00*      (2006.01)
*F16L 5/00*      (2006.01)

(52) U.S. Cl. ...................... 126/39 N; 126/40; 137/356

(58) Field of Classification Search ............. 126/39 N, 126/40; 431/343; 137/356
See application file for complete search history.

(56) References Cited

U.S. PATENT DOCUMENTS 2,673,570 A * 3/1954 Cunningham et al. . 137/543.13

* cited by examiner

*Primary Examiner*—Alfred Basichas
(74) *Attorney, Agent, or Firm*—Blake, Cassels & Graydon LLP; Sean X. Zhang

(57) ABSTRACT

A barbeque assembly including a support structure for a barbeque grill housing that may be easily and quickly assembled. Assembly of the support structure may be completed with few or no tools. The support structure includes first (62) and second support (64) members for supporting the grill housing (74) in a generally horizontal orientation, and a cross beam (66). A manually installable connector (200) is used to manually connect the cross beam (66) at a first end to the first support member (62) and to manually connect the cross beam (66) at a second end to the second support member (64). The first and second support members (62, 64) and connection member (66) preferably form a substantially rigid structure. Additional components of the barbeque assembly, such as a grill housing (74) (with a burner (80) attached therein), a front panel (72) or condiment rack, shelves (68), a side burner (with an attached valve), a console (86), wheels (94) or castors (96), bridging members (102), a fuel tank (90) and a fuel tank retainer (304) may be conveniently added to the support structure.

15 Claims, 69 Drawing Sheets

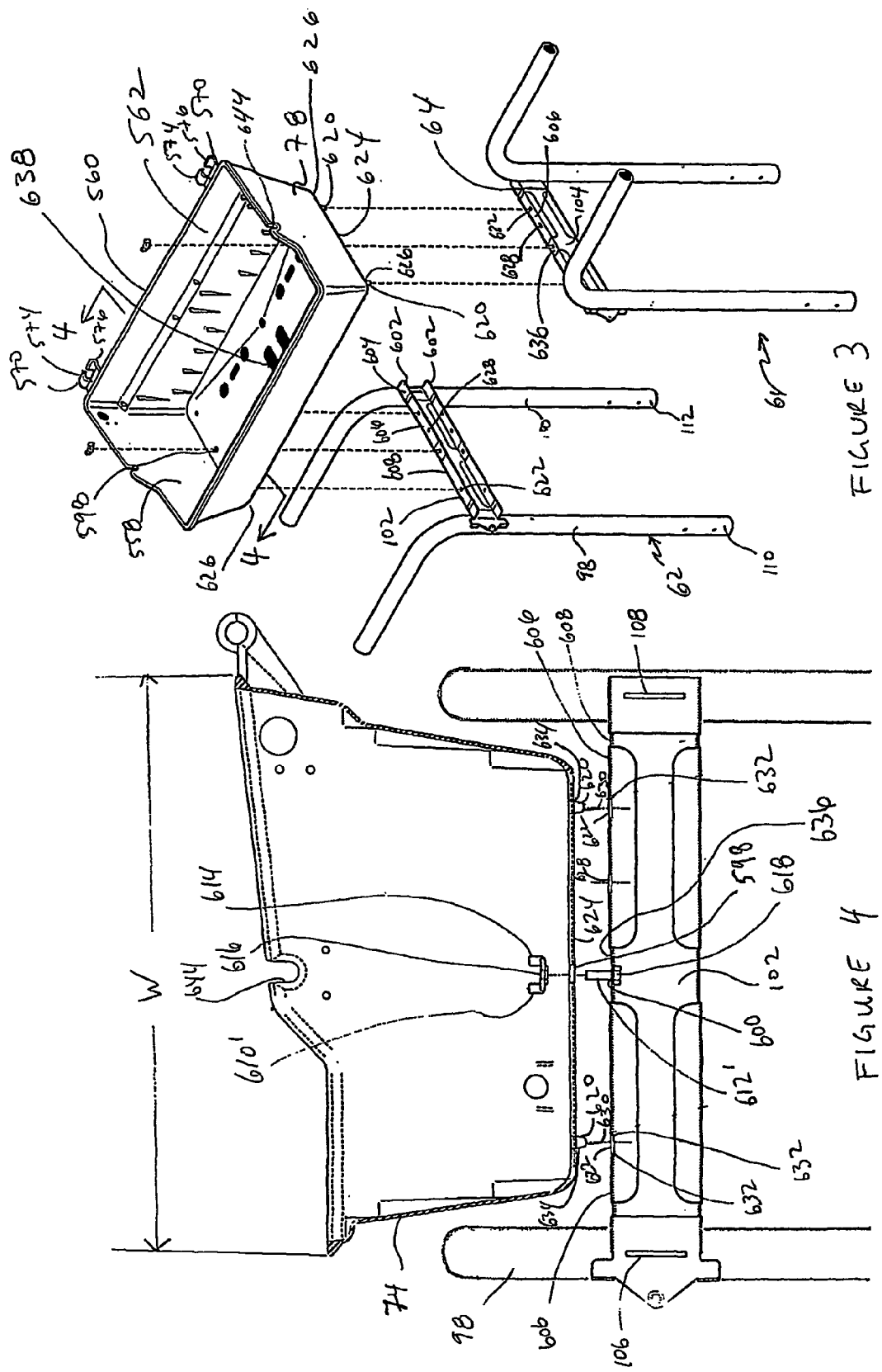

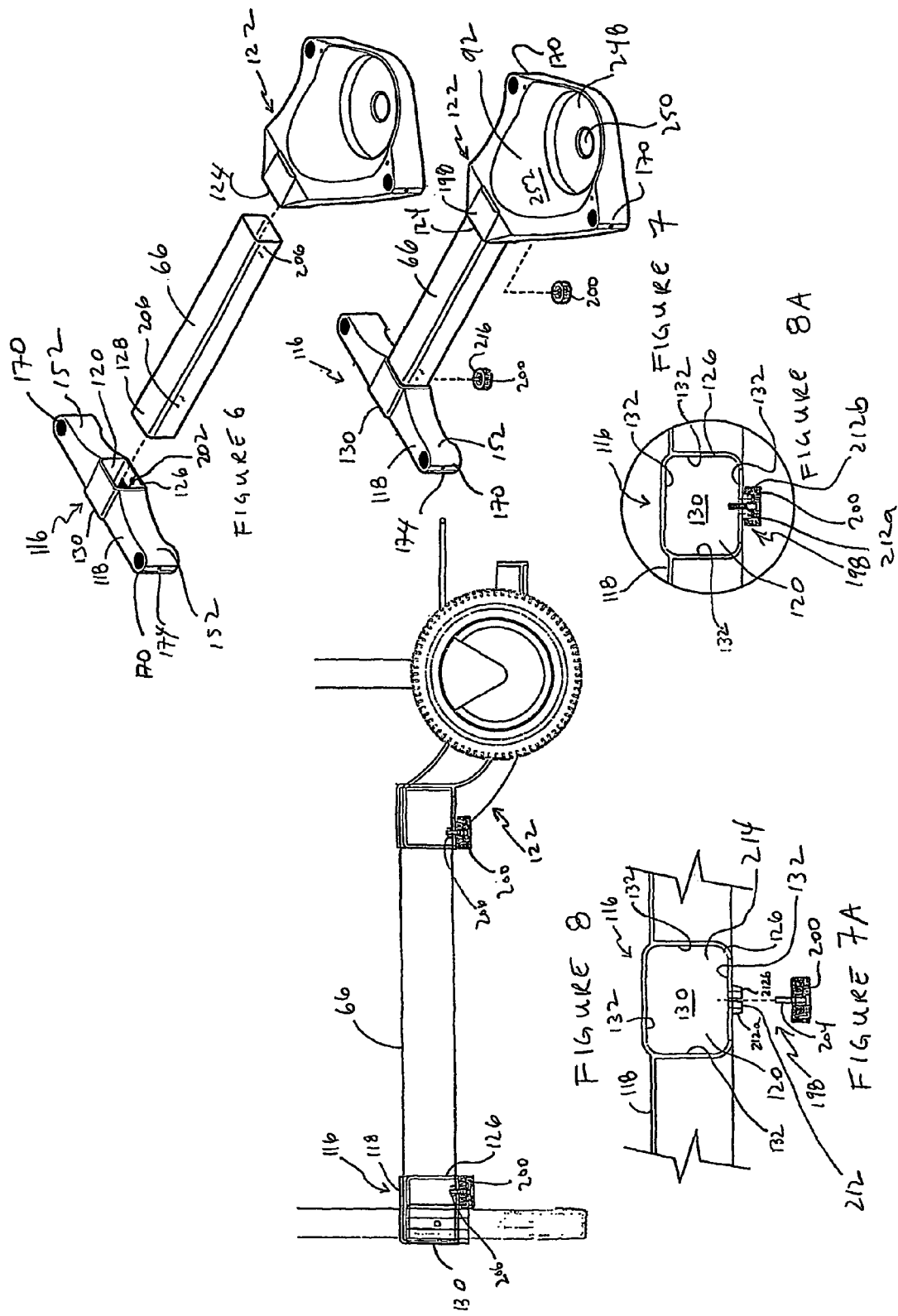

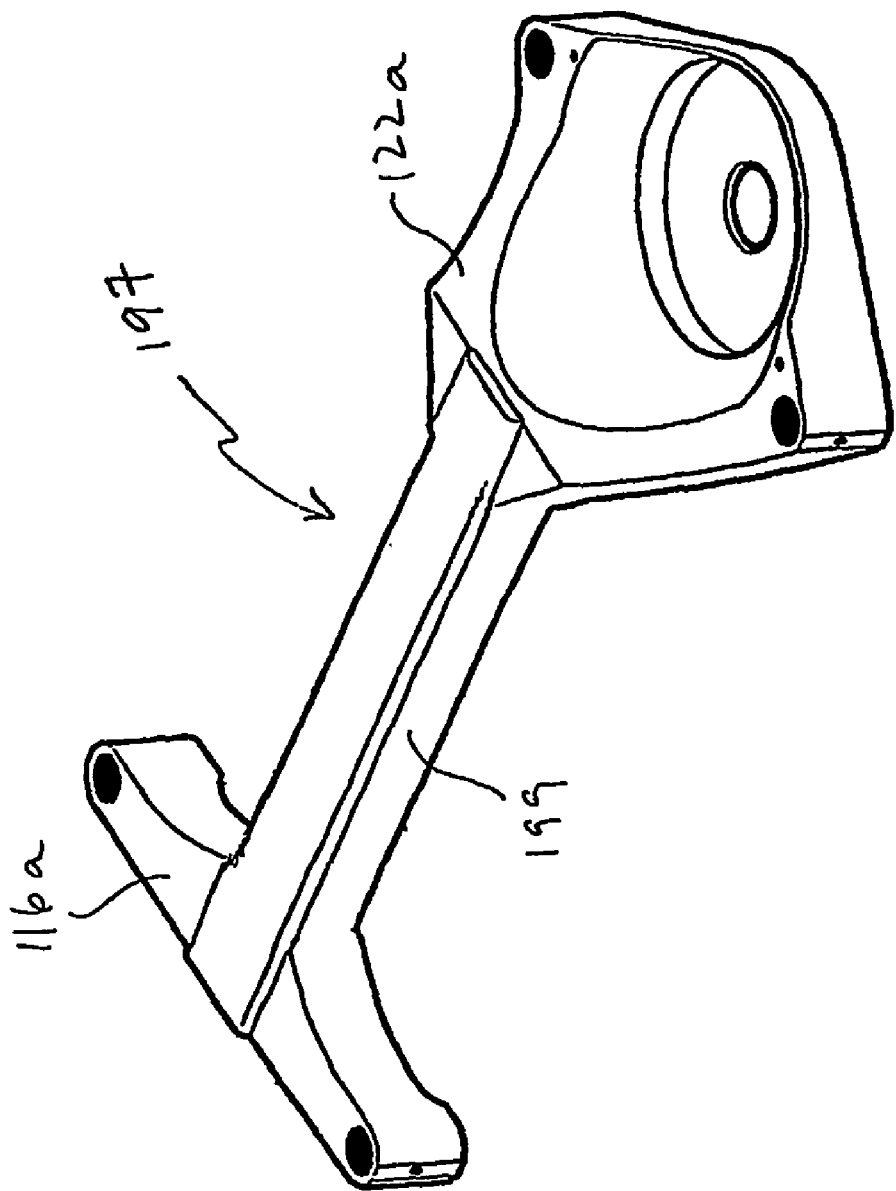

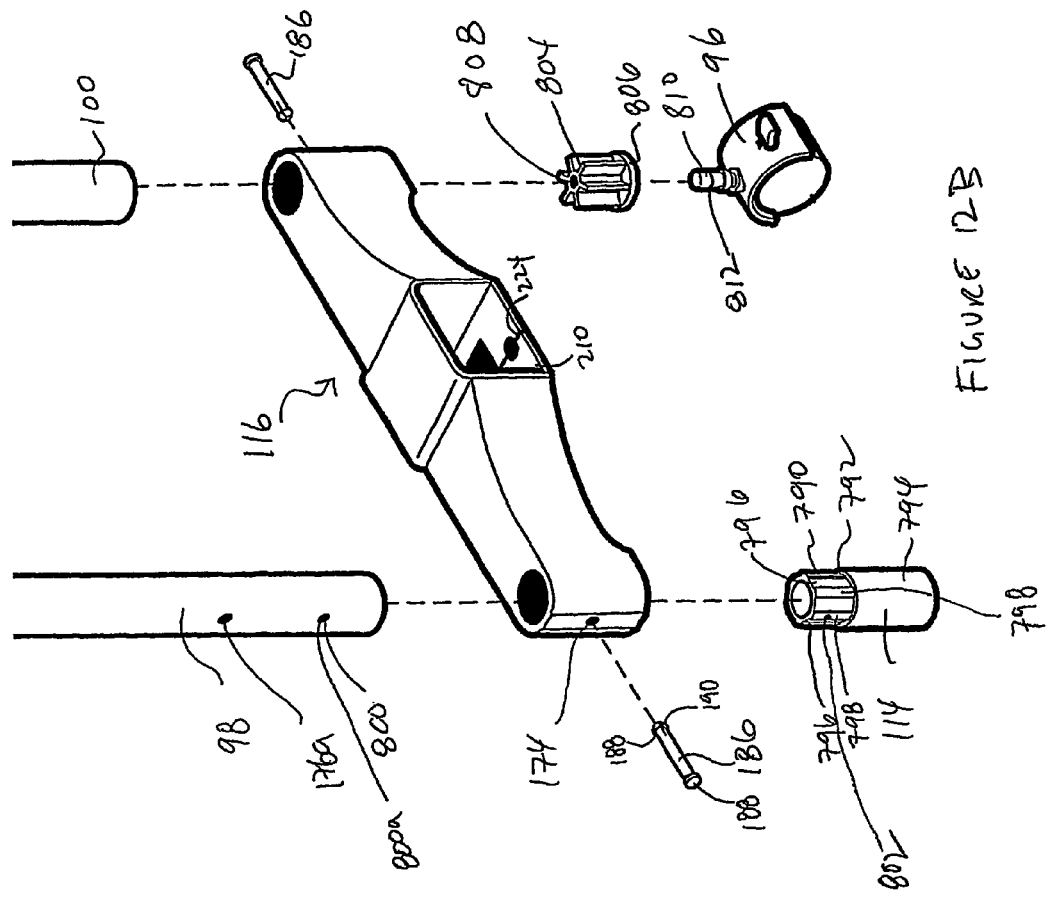
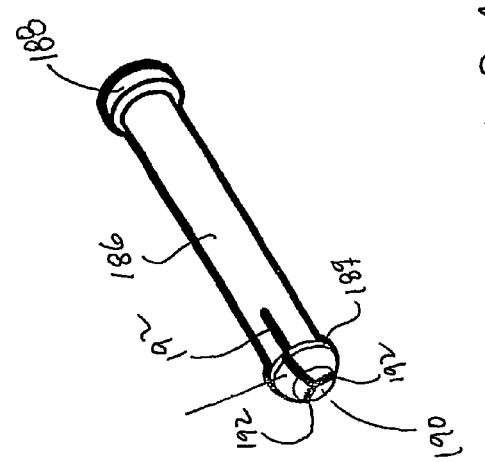
FIGURE 12B
FIGURE 12A

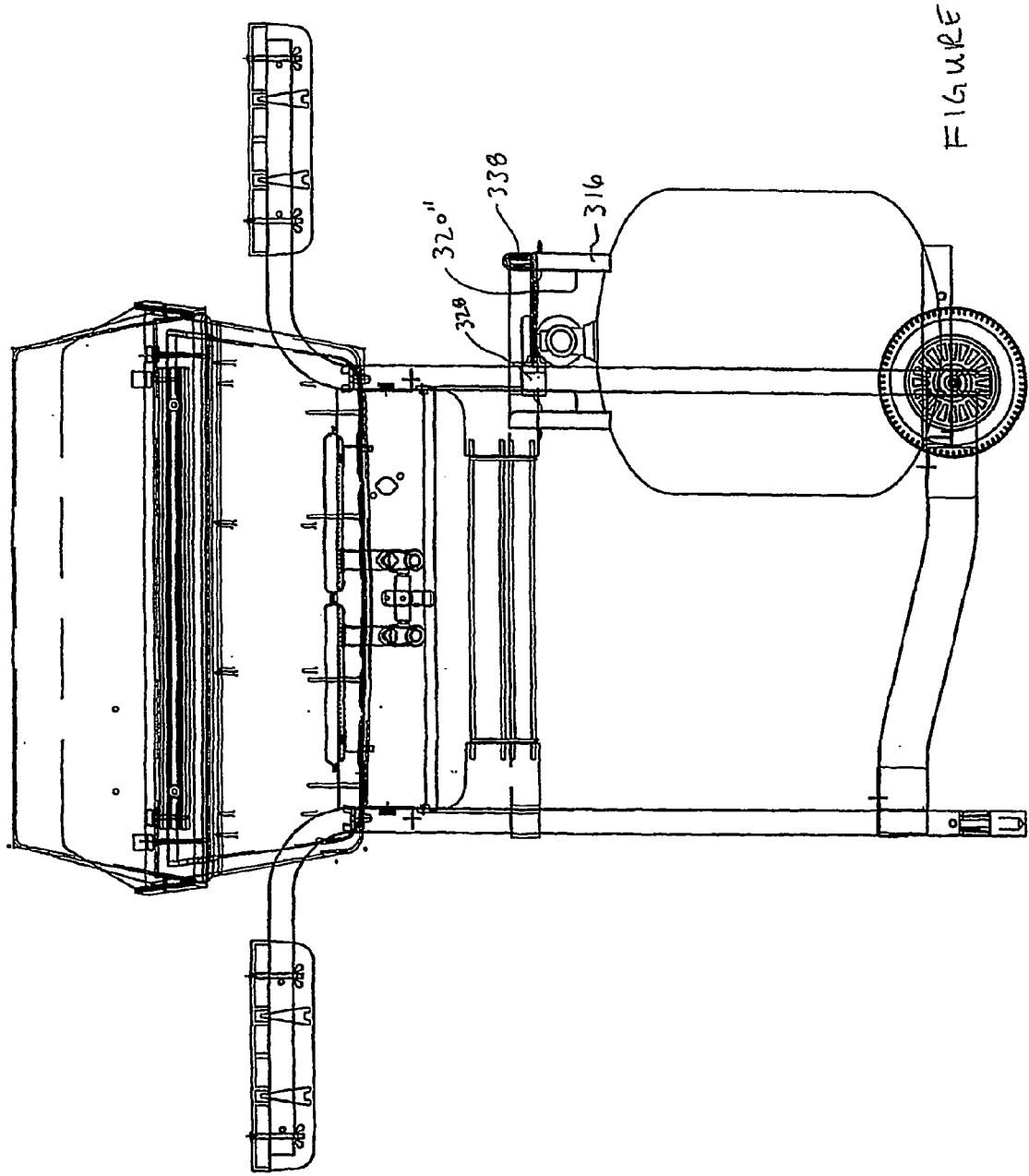

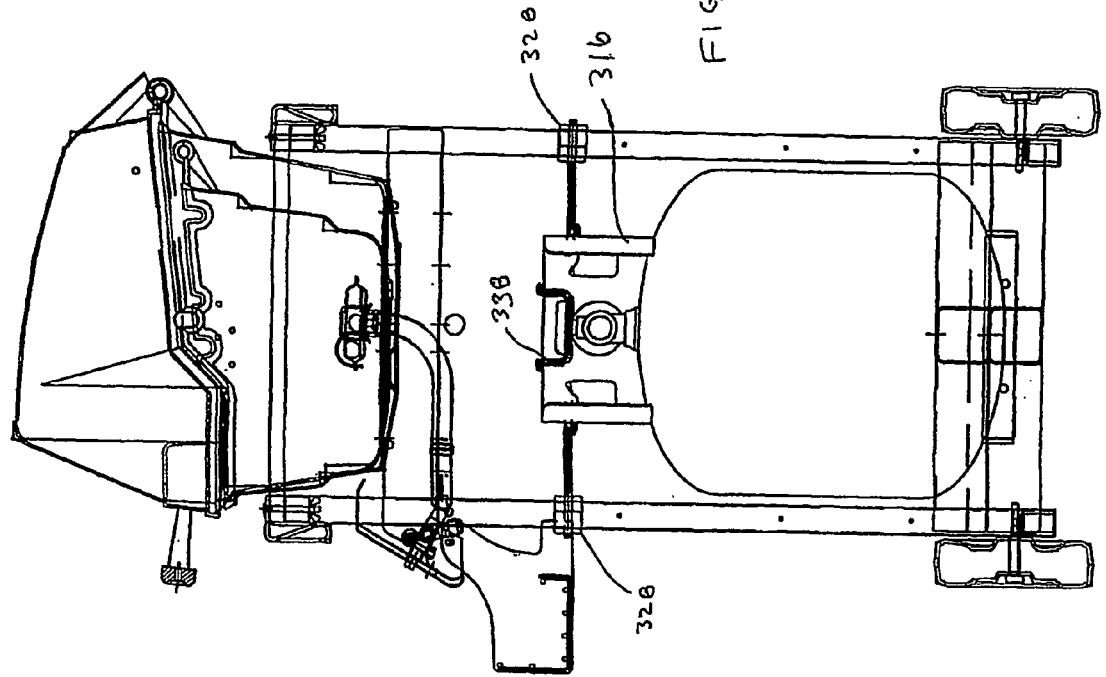

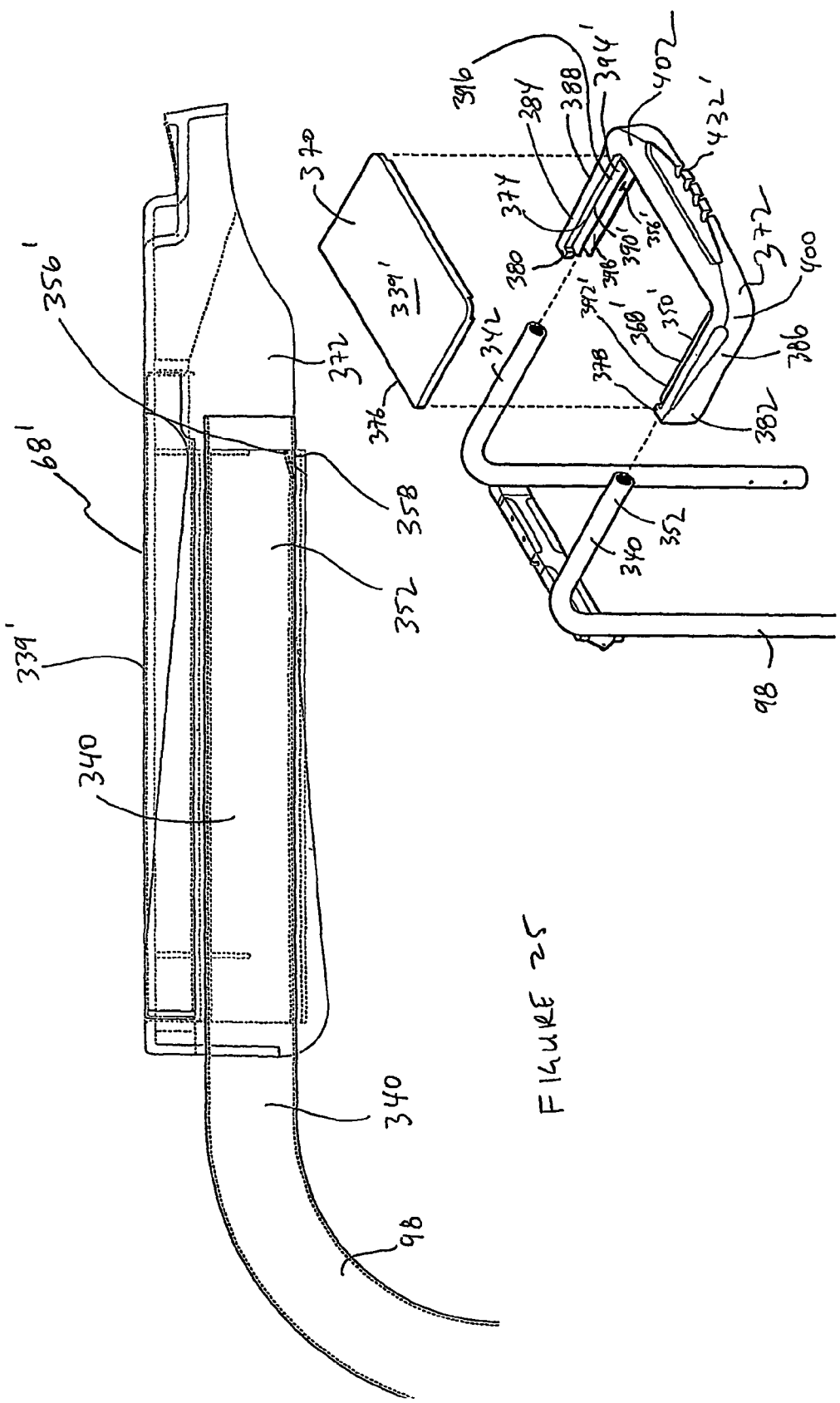

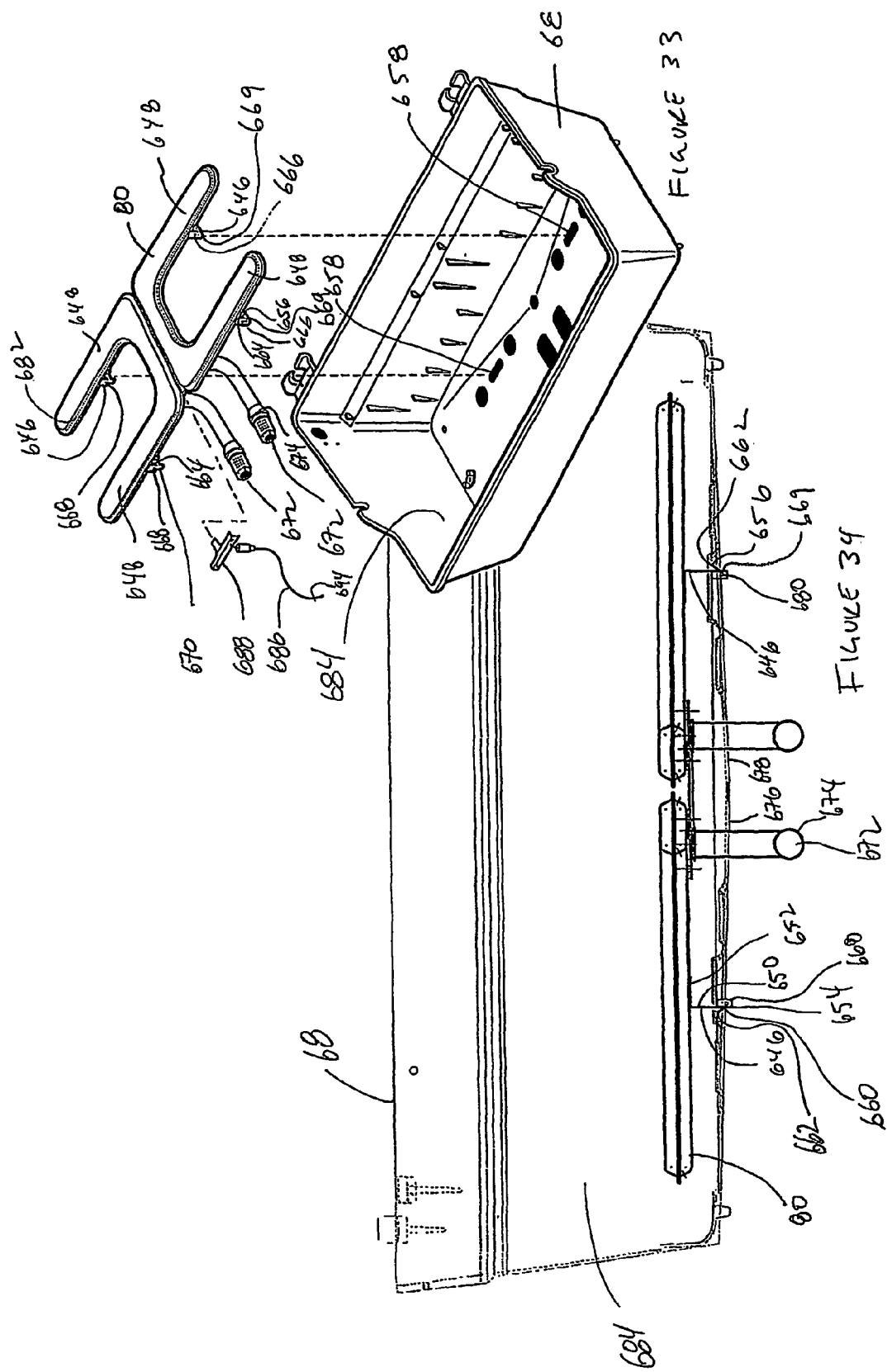

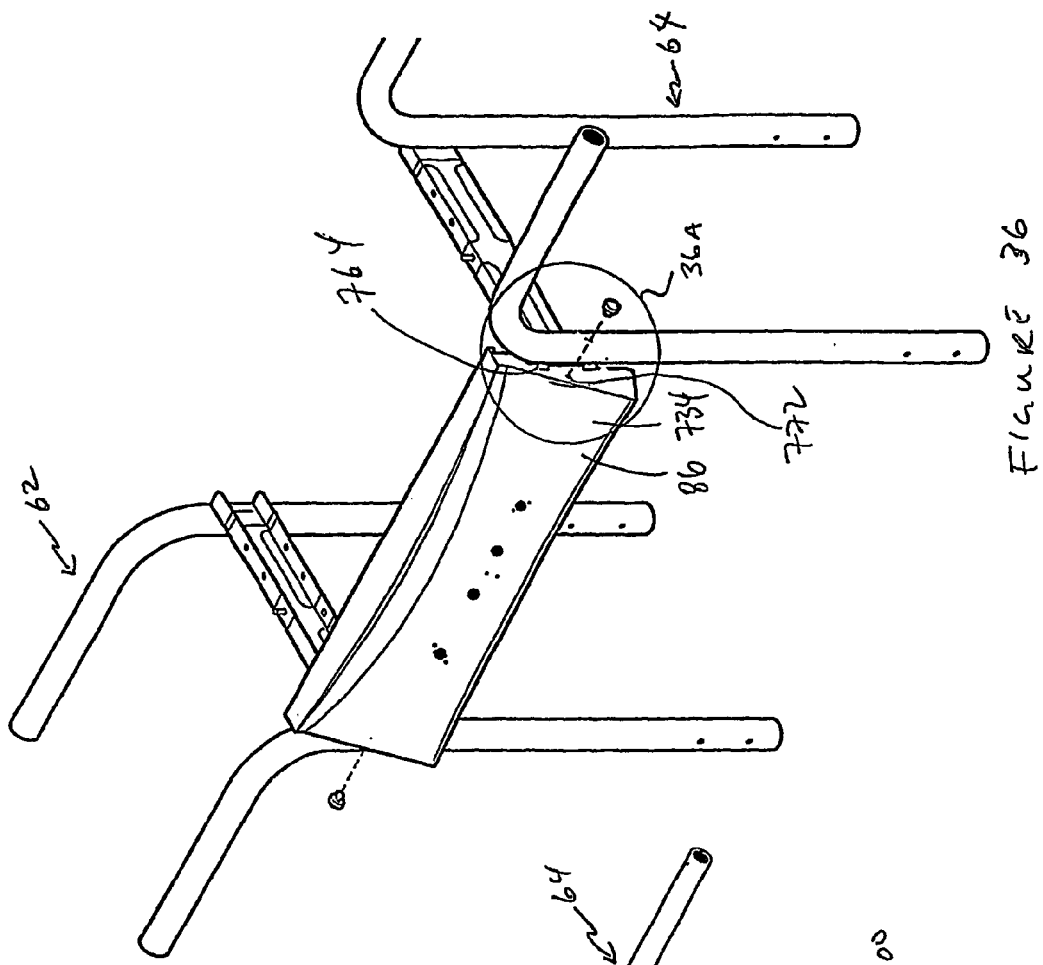
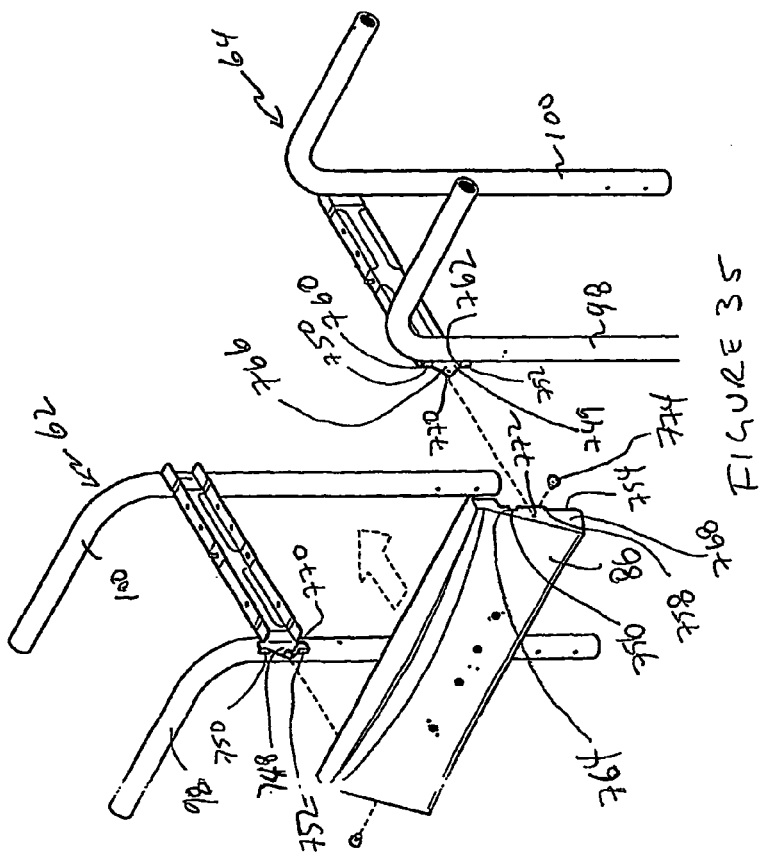

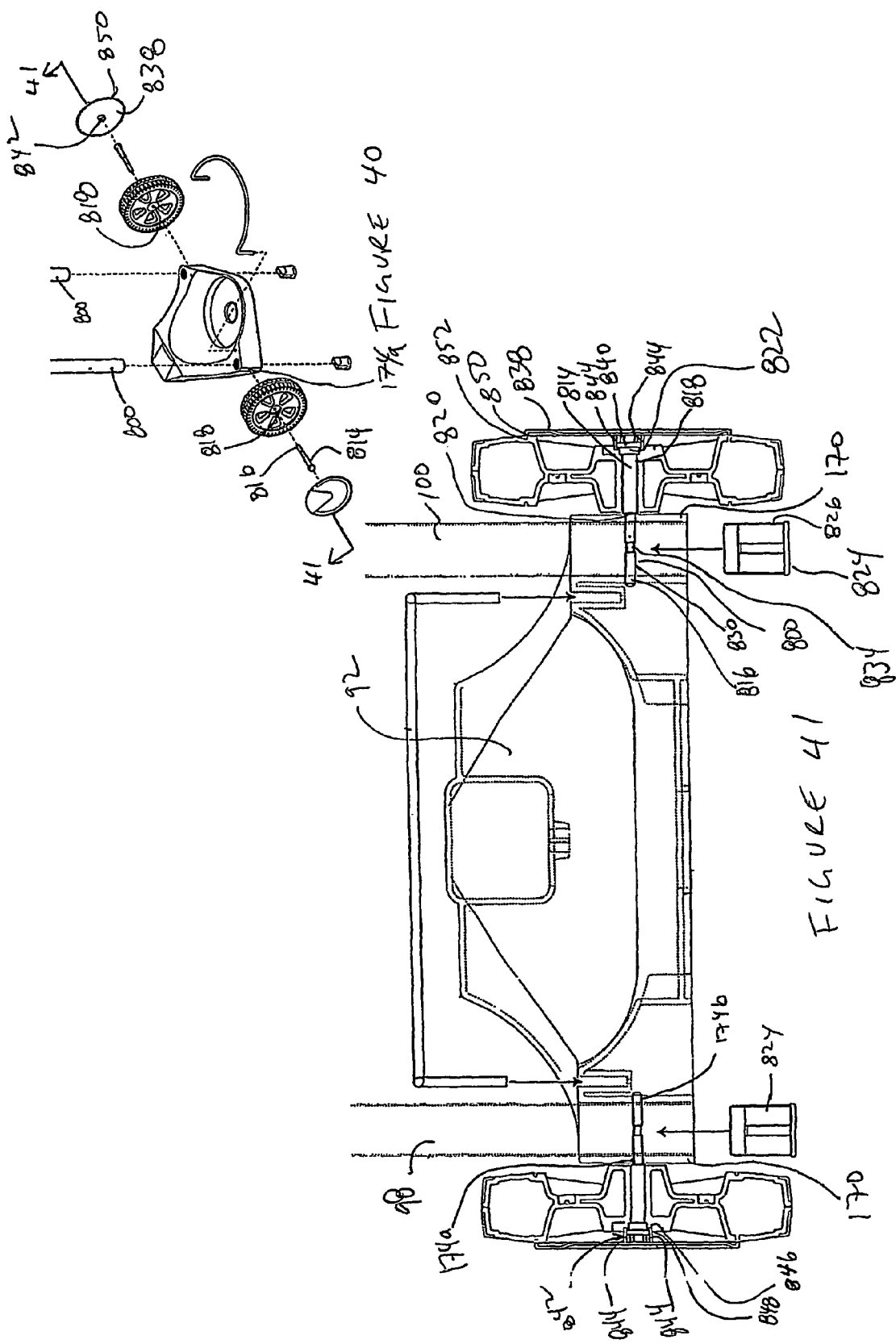

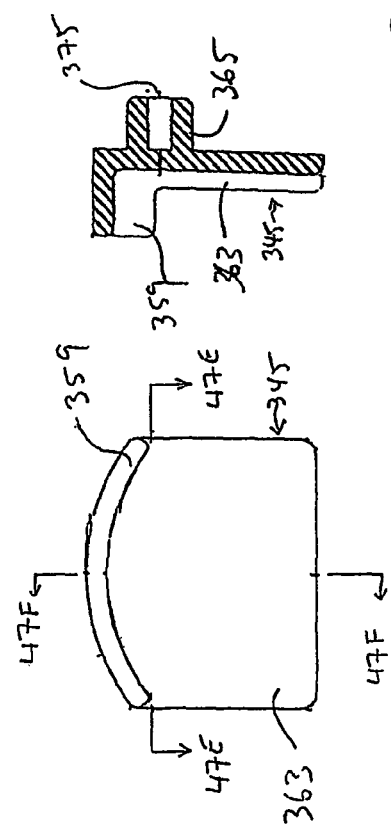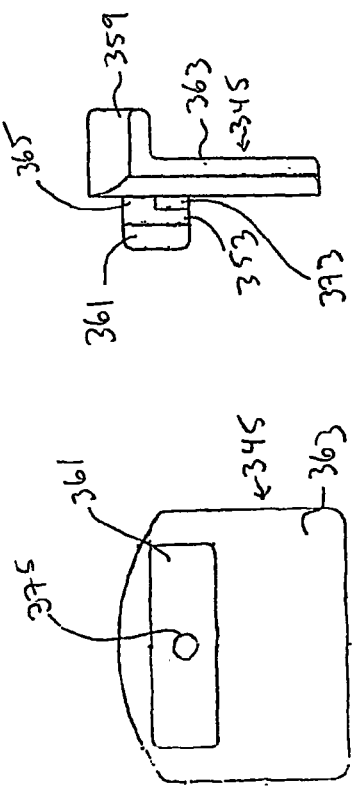

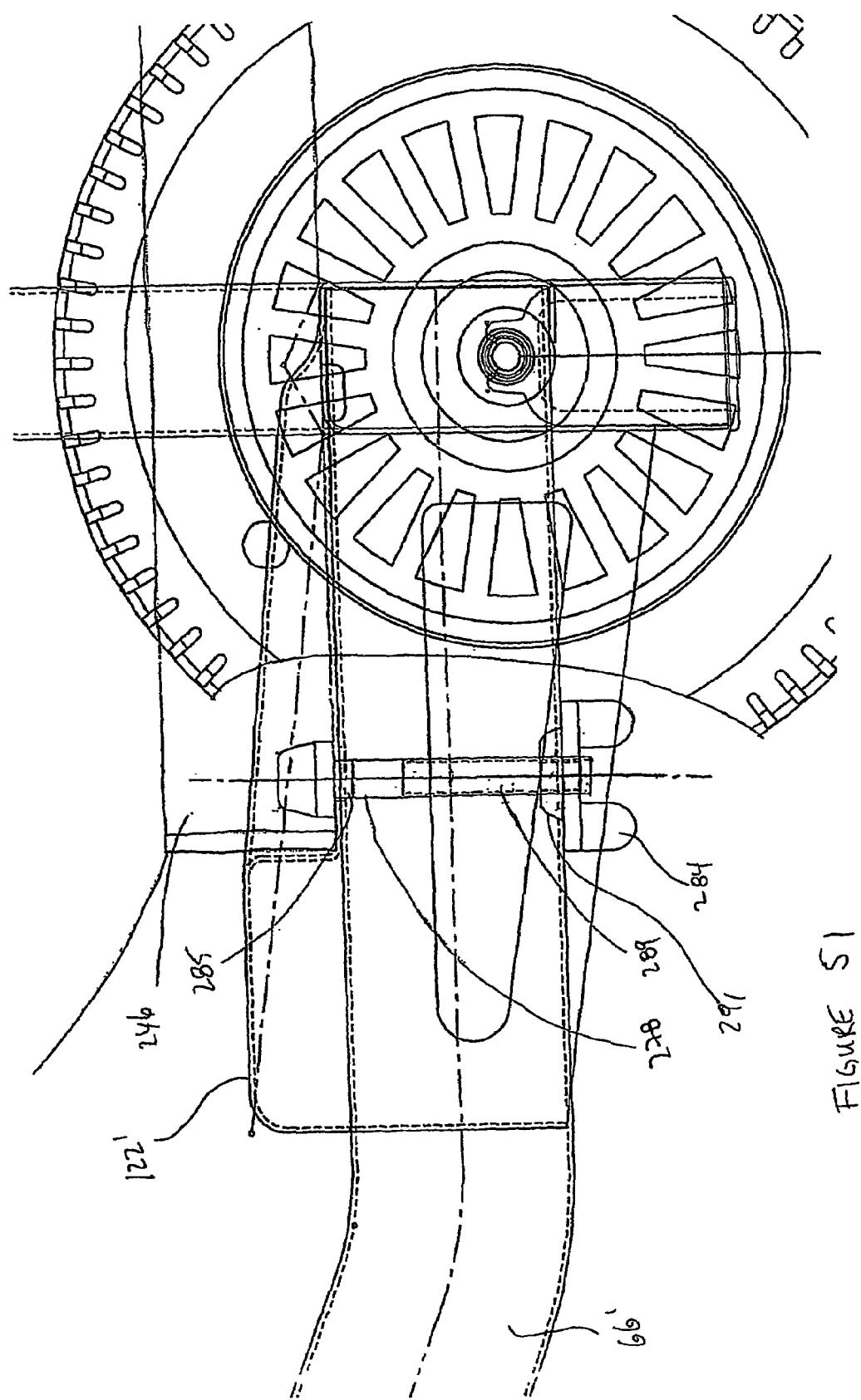

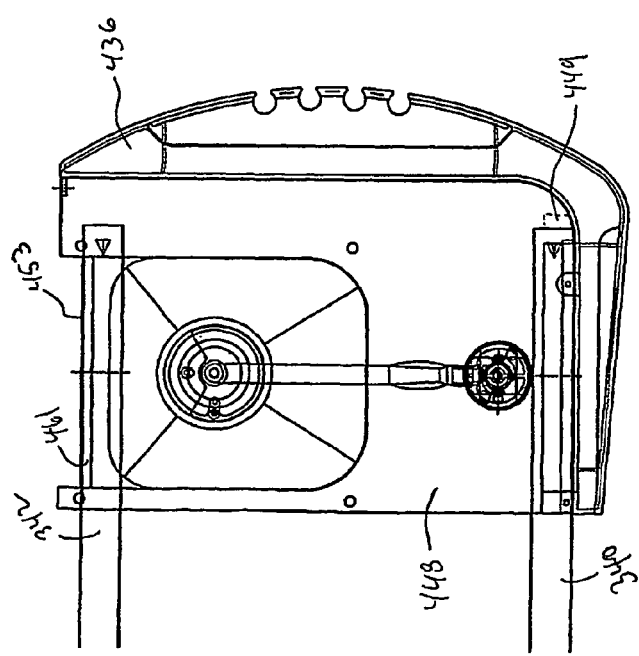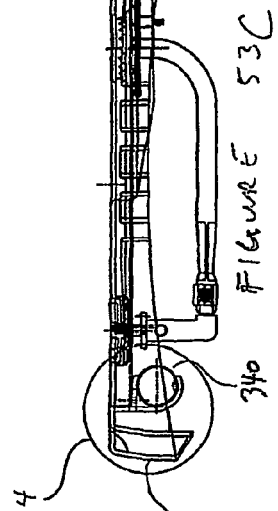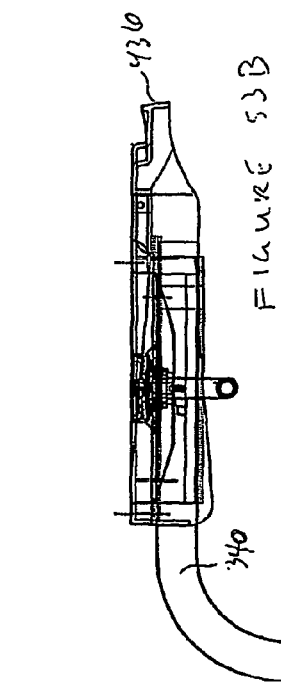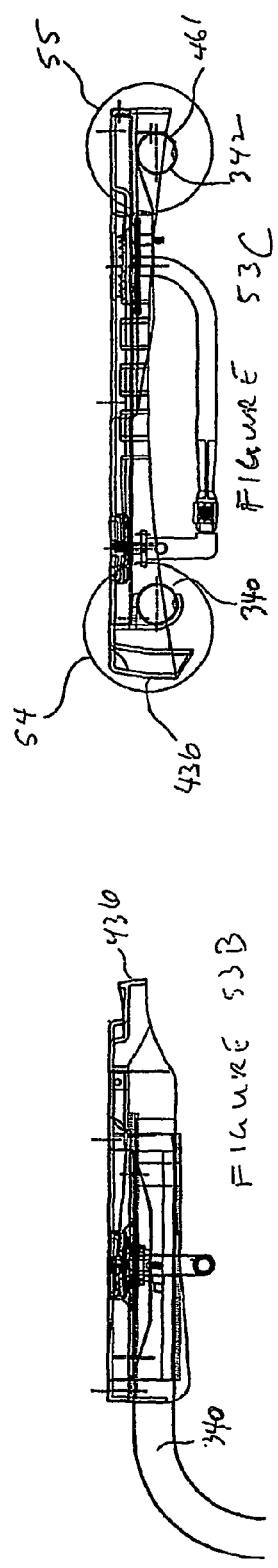

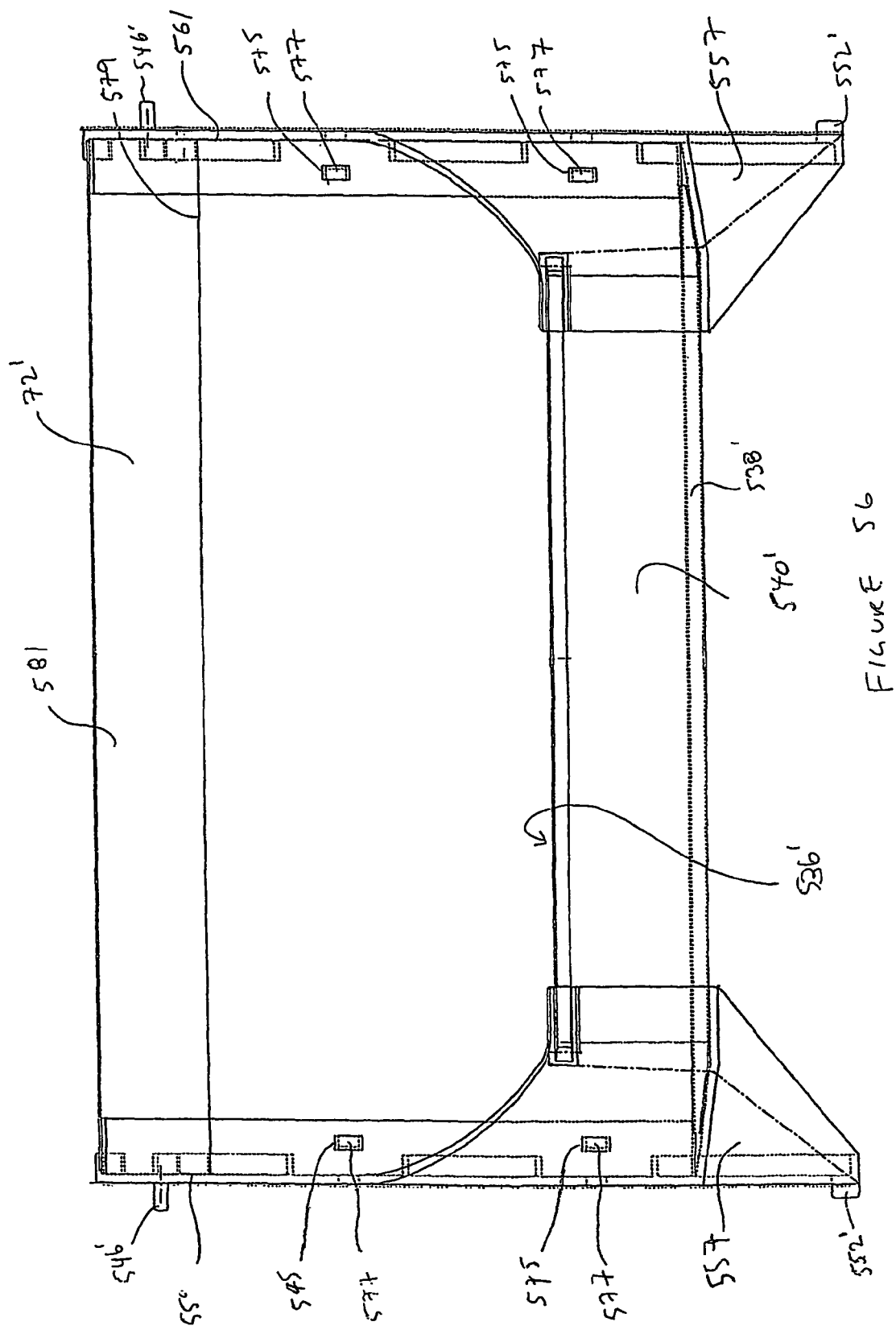

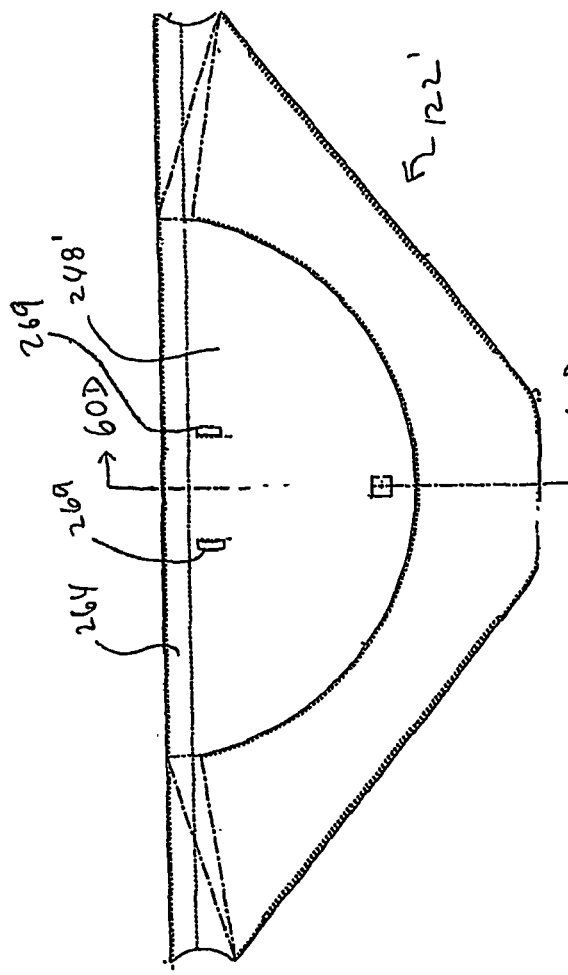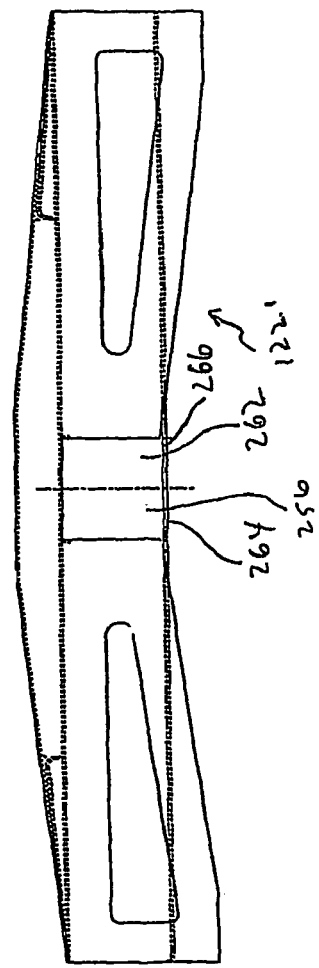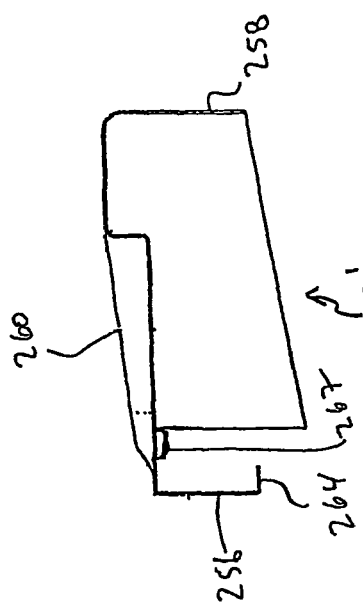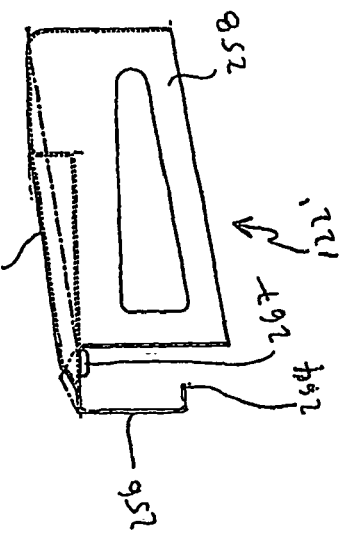

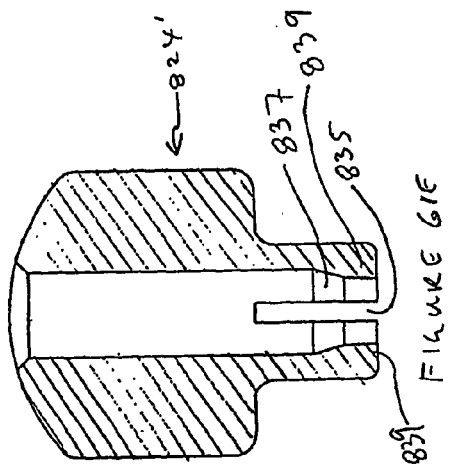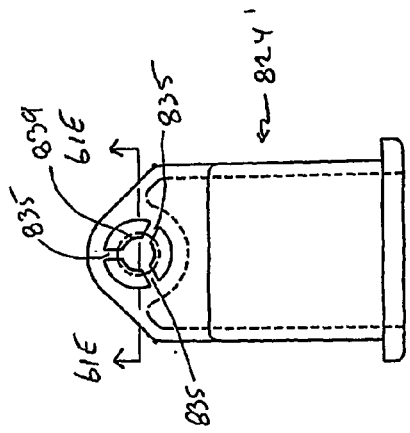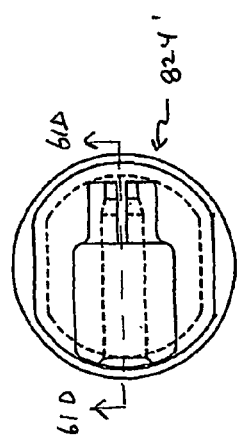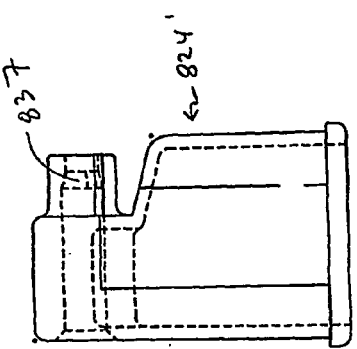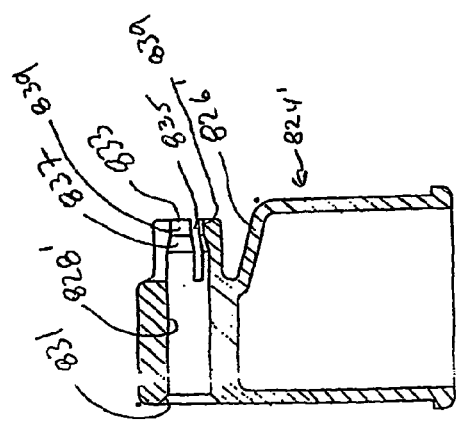

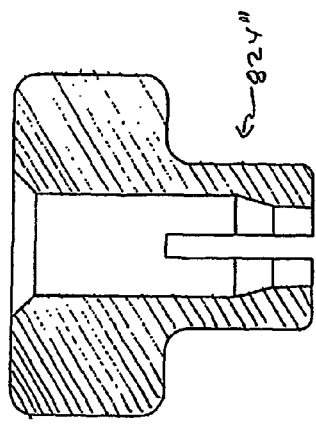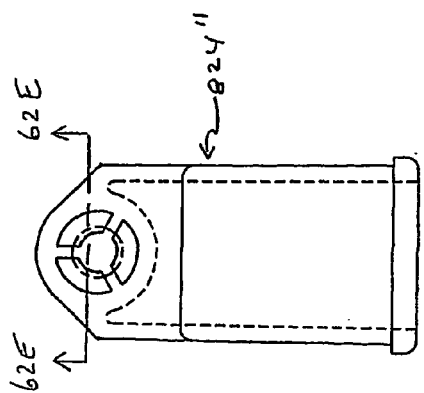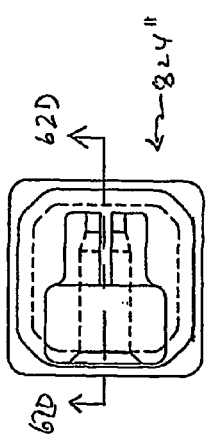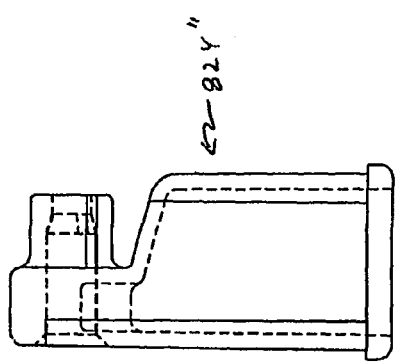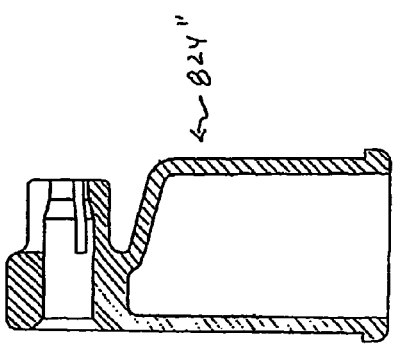

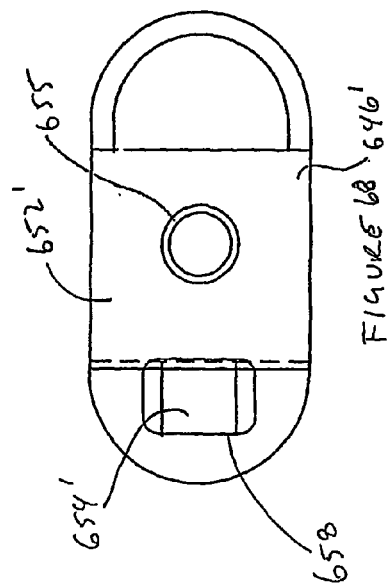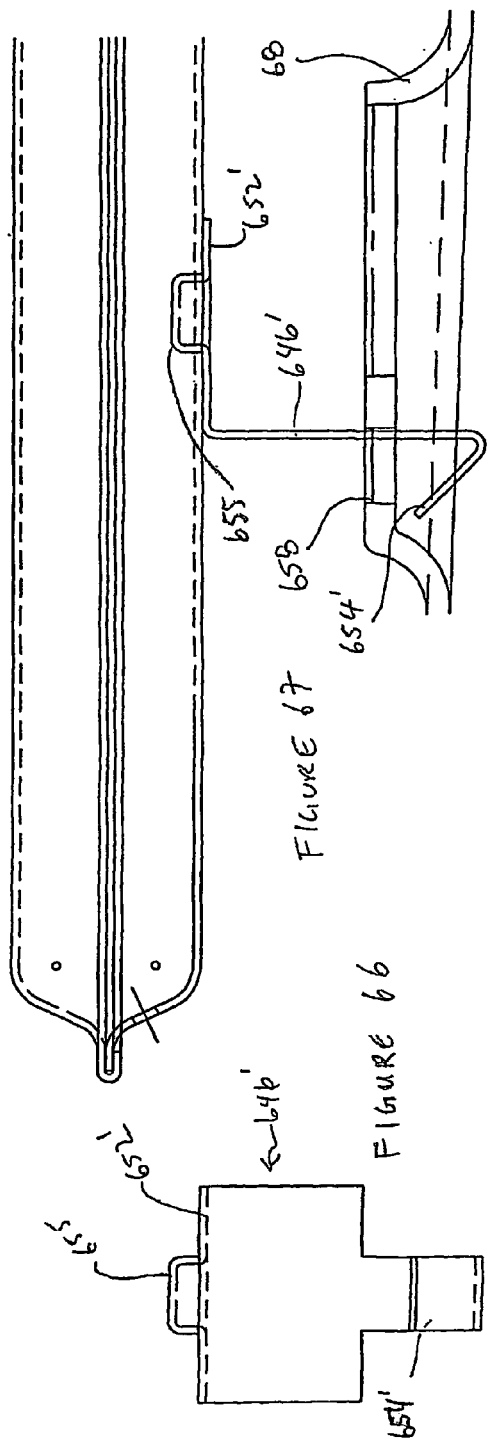

GAS BARBEQUE ASSEMBLY

FIELD OF THE INVENTION

The present invention relates generally to the field of cooking apparatus, and more particularly to barbeques such as outdoor gas fuelled barbeques.

BACKGROUND OF THE INVENTION

To reduce manufacturing, shipping and storage costs, barbeque grill manufacturers often ship unassembled barbeques to retailers for subsequent assembly by consumers. While some manufacturers may provide barbeques with a number of components pre-assembled, consumers are generally required to assemble at least some part of the barbeque. This assembly often requires consumers to follow detailed instructions to combine a plurality of barbeque components. These components may include: an upper and lower casting containing burners and a grill, shelves, a console for regulating the flow of fuel to the burners, and a structure for supporting the upper and lower castings. Following assembly of the various barbeque components, a fuel source is connected to the barbeque. The fuel source may be a tank containing pressurized propane, which should be safely secured to the barbeque support structure.

To assemble the barbeque, the support members and one or more of the other components may be securely fastened to one another. For example, a typical barbeque may require that over twenty such connections be made by a consumer. Common tools such as screwdrivers and wrenches may also be required. Since not all consumers have a facility with such tools or with interpreting assembly instructions for the barbeque, assembly of the barbeque may be a relatively complex and frustrating process, which could take a significant amount of time to complete.

Difficulty may also be encountered due to the required orientation of fasteners during installation. For example, to assemble some barbeques, fasteners such as screws or bolts are required to be installed in a generally upward direction. This may necessitate that the consumer crouch beneath a partially assembled barbeque to install additional components or to secure assembled components. Use of tools in this position may be difficult for those who do not have dexterity with tools. Even unassisted or manual insertion and tightening of screws or bolts in this position may be difficult. Alternatively, a consumer may have to reposition a partially assembled barbeque numerous times during its assembly process if it is desired to install screws or bolts in a more convenient orientation than in a generally upward direction.

While manufacturers often provide detailed written assembly instructions, including figures, the required orientation of some barbeque components might not be apparent to unskilled consumers. This may lead to improperly assembled barbeques. For example, the grill casting might not be adequately balanced on the support structure which could make the barbeque unstable. Other elements such as the burners, heat deflectors, and the propane tank should also be properly oriented to ensure safe operation of the barbeque.

The above difficulties might also be faced by retailers attempting to assemble floor models for display to potential consumers. This may make retailers reluctant to assemble floor models, which could make it more difficult for the unassembled barbeques to be sold because consumers are deprived of the opportunity to see an assembled model. Similarly, if retailers assemble floor models improperly, consumers may be discouraged from purchasing the corresponding barbeque model.

Fully assembled barbeques may alternatively be shipped by manufacturers to retailers to avoid problems associated with the assembly of the barbeque by the consumer. A potential drawback of this approach is that the fully assembled barbeque generally requires a significantly larger shipping carton and therefore occupies a greater volume when shipped. As a result, fewer barbeques may be shipped at a time leading to increased shipping costs. Manufacturers also incur increased labour costs in assembling the barbeque themselves.

Based on the foregoing, it would be desirable to develop alternative barbeques that may be shipped unassembled to reduce costs, but that may be readily and quickly assembled by unskilled consumers.

SUMMARY OF THE INVENTION

The invention consists of a barbeque assembly and method of assembling a barbeque assembly. According to one broad aspect of the invention, the barbeque assembly has a barbeque grill housing support structure. The support structure includes first and second support members for supporting the grill housing in a generally horizontal orientation, and a cross beam. A connector is included for manually connecting the cross beam at a first end to the first support member and for manually connecting the cross beam at a second end to a second support member. The first and second support members and connection member combine to form a substantially rigid structure.

According to another broad aspect of the invention, there is provided an apparatus for mounting a burner valve to a barbeque support structure. The apparatus includes retaining means for frictionally retaining the apparatus to the support structure.

In an illustrative embodiment of the invention, the valve has a stem for controlling fuel flow through the valve, and the barbeque support structure has edges defining an opening for receiving the valve clip. The valve clip has a body that has a passage defined therein for receiving the stem of the valve, means for mounting the body to the valve, and a retainer for engaging an edge of the valve clip opening. The retainer includes two parts of opposed wings for receiving the edge therebetween. The valve clip body is movable from a first position, where it is positioned within the opening, to a second position, wherein the retainer engages the edge of the valve clip opening.

BRIEF DESCRIPTION OF THE DRAWINGS

For a better understanding of the present invention and to show more clearly how it may be carried into effect, reference is now made, by way of example only and not of limitation, to the accompanying drawings in which:

FIG. 3 is an exploded perspective view of supports and a lower casting of the barbeque of FIG. 1;

FIG. 4 is a cross-sectional view of the lower casting of the barbeque of FIG. 1 taken along the line 4—4 of FIG. 3;

FIG. 6 is an exploded perspective view of beam connection members and a cross beam of the barbeque of FIG. 1;

FIG. 7 is an assembled perspective view of the beam connection members and cross beam of FIG. 6 showing bolts oriented for insertion;

FIG. 7A is an exploded partial end view of a beam connection member and bolt of the barbeque of FIG. 1;

FIG. 7B is a perspective view of an alternative embodiment of the beam connection member of the barbeque of FIG. 1;

FIG. 8 is a partial side view including the beam connection members and cross beam of the barbeque of FIG. 1;

FIG. 8A is an assembled partial end view of a beam connection member and bolt of the barbeque of FIG. 1;

FIG. 12A is side view of an alternative embodiment of the pin of FIG. 11;

FIG. 12B is an exploded partial perspective view of a beam connection member, leg extension, caster and legs of the barbeque of FIG. 1;

FIG. 21A is an end view of a further alternative embodiment of the fuel source retainer of FIG. 19;

FIG. 21B is a side view of the fuel source retainer of FIG. 21A;

FIG. 25 is a side view of a shelf of the barbeque of FIG. 1, with hidden features shown in phantom;

FIG. 26 is an exploded partial perspective view of a shelf and support of the barbeque of FIG. 1;

FIG. 33 is an exploded perspective view of a lower casting and burner of the barbeque of FIG. 1;

FIG. 34 is a side view of the lower casting and burner of FIG. 23 showing the burner attached to the lower casting;

FIG. 35 is an exploded perspective view of the console and leg members of the barbeque of FIG. 1;

FIG. 36 is a perspective assembled view of the console and leg members of FIG. 35;

FIG. 40 is a partial exploded perspective view of the wheel assembly of the barbeque of FIG. 1;

FIG. 41 is a cross-sectional view of the wheel assembly of the barbeque of FIG. 1 taken along the line 41—41 of FIG. 40;

FIG. 47A is an isolated end view of an engaging member of the alternative fuel source retainer of FIG. 44;

FIG. 47B is a side view of the engaging member of FIG. 47A;

FIG. 47C is an another end view of the engaging member of FIG. 47A, viewed from a direction opposite to the end view of FIG. 47A;

FIG. 47D is a top view of the engaging member of FIG. 47A, with hidden features shown in phantom;

FIG. 47E is a cross-sectional view of the engaging member of FIG. 47A taken along the line 47E—47E of FIG. 47C;

FIG. 47F is a cross-sectional view of the engaging member of FIG. 47A taken along the line 47F—47F of FIG. 47C;

FIG. 51 is an isolated transparent side cutaway view showing a bolt and wing nut joining the beam connection member and cross beam of the barbeque of FIG. 2;

FIG. 53A is a transparent top view of the burner tray of FIG. 28 additionally including a bracket;

FIG. 53B is a side view of the burner tray of FIG. 53A;

FIG. 53C is an end view of the burner tray of FIG. 53A;

FIG. 56 is a side view of the panel of the barbeque of FIG. 2, with hidden features shown in phantom;

FIG. 60A is an isolated top view of a beam connection member FIG. 2;

FIG. 60B is an end view of the beam connection member of FIG. 60A, showing hidden features in phantom;

FIG. 60C is a side view of the beam connection member of FIG. 60A, showing hidden features in phantom;

FIG. 60D is a cross-sectional view of the beam connection member of FIG. 60A, taken along the line 60D—60D of FIG. 60A;

FIG. 61A is an isolated side view of an alternative axle lock of the barbeque of FIG. 1, with hidden features shown in phantom;

FIG. 61B is another isolated side view of axle lock of FIG. 61A, viewed from a direction transverse to the side view of FIG. 61A, with hidden features shown in phantom;

FIG. 61C is an end view of axle lock of FIG. 61A, with hidden features shown in phantom;

FIG. 61D is a cross-sectional view of the axle lock of FIG. 61C taken along the line 61D—61D;

FIG. 61E is a cross-sectional view of the axle lock of FIG. 61B taken along the line 61E—61E;

FIG. 62A is an isolated side view of an alternative axle lock of the barbeque of FIG. 2, with hidden features shown in phantom;

FIG. 62B is another isolated side view of axle lock of FIG. 62A, viewed from a direction transverse to the side view of FIG. 62A, with hidden features shown in phantom;

FIG. 62C is an end view of axle lock of FIG. 62A, with hidden features shown in phantom;

FIG. 62D is a cross-sectional view of the axle lock of FIG. 62C taken along the line 62D—62D;

FIG. 62E is a cross-sectional view of the axle lock of FIG. 62B taken along the line 62E—62E;

FIG. 66 is an isolated view of a burner support member of FIG. 52A, which includes a member for attaching it to a burner;

FIG. 67 is an isolated transparent side view of a burner, burner support member and a portion of the lower casting defining a casting opening of the barbeque of FIG. 1;

FIG. 68 is an isolated top view of the burner support member and casting portion of FIG. 67;

FIG. 72 is an isolated side view of an alternative nut of the barbeque of FIG. 1;

FIG. 73A is a top view of the valve clip of FIG. 29;

FIG. 73B is an end view of the valve clip of FIG. 29;

FIG. 73C is an side view of the valve clip of FIG. 29;

FIG. 73D is a bottom view of the valve clip of FIG. 29; and

FIG. 73E is a cross-sectional view of the valve clip of FIG. 29, taken along the line 73E—73E of FIG. 73C.

DETAILED DESCRIPTION OF ILLUSTRATIVE EMBODIMENTS OF THE INVENTION

Figure 1:
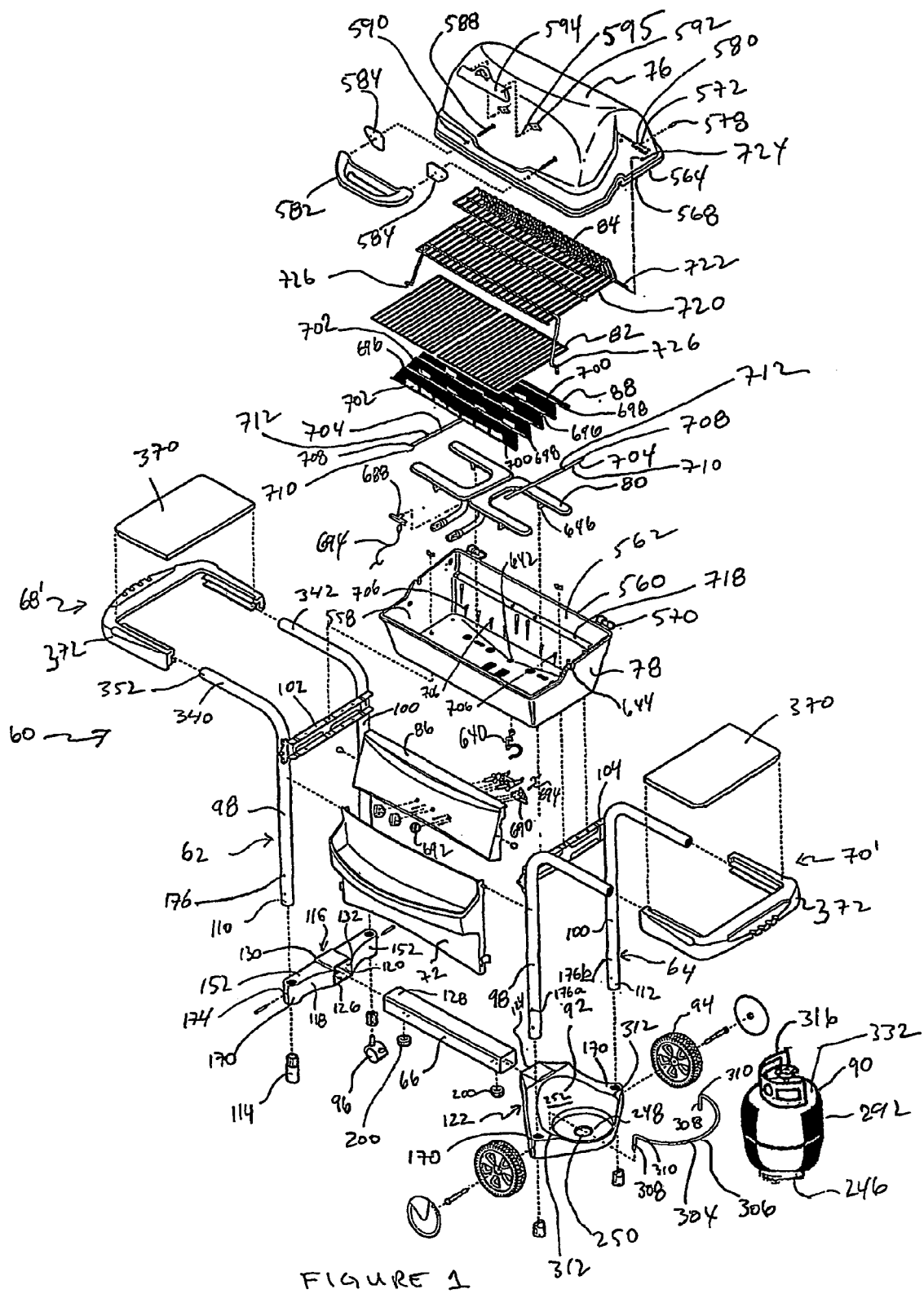
FIG. 1 is an exploded perspective view of the barbeque according to an illustrative embodiment of the invention.

Referring to FIG. 1, a first illustrative embodiment of the claimed invention is shown in exploded view. The illustrative embodiment of the claimed invention includes a barbeque 60 having a support structure which has first and second support members 62, 64, and a cross member in the nature of a cross beam 66 rigidly connected therebetween. A preparation or storage surface in the nature of first and second shelves 68', 70' may be included. To provide limited structural support to the support members 62, 64, a panel such as an accessory panel 72 may be provided. A grill housing 74, having opposed castings 76 and 78 that enclose a burner 80, is supported by the support members 62, 64. A cooking surface or cooking grid, in the nature of one or more grill plates 82, and a warming rack 84 may also be contained within the grill housing 74. A fuel flow controller, for instance console 86, may be provided to moderate the flow of fuel to the burner 80. To deflect heat produced by burners 80, a heat deflector, such as angled bars 88 may also be included. If a self-contained fuel source is used, including a fuel container, for example, such as a propane tank 90, then a fuel source or container support base 92 may be employed to support tank 90. If an external fuel source, such as piped natural gas, is used then base 92 may be omitted, and support members 62 and 64 may have a substantially identical or mirror configuration of one another. Relocation of the barbeque 60 may be facilitated by the addition of wheels 94 and/or casters 96.

Figure 2:
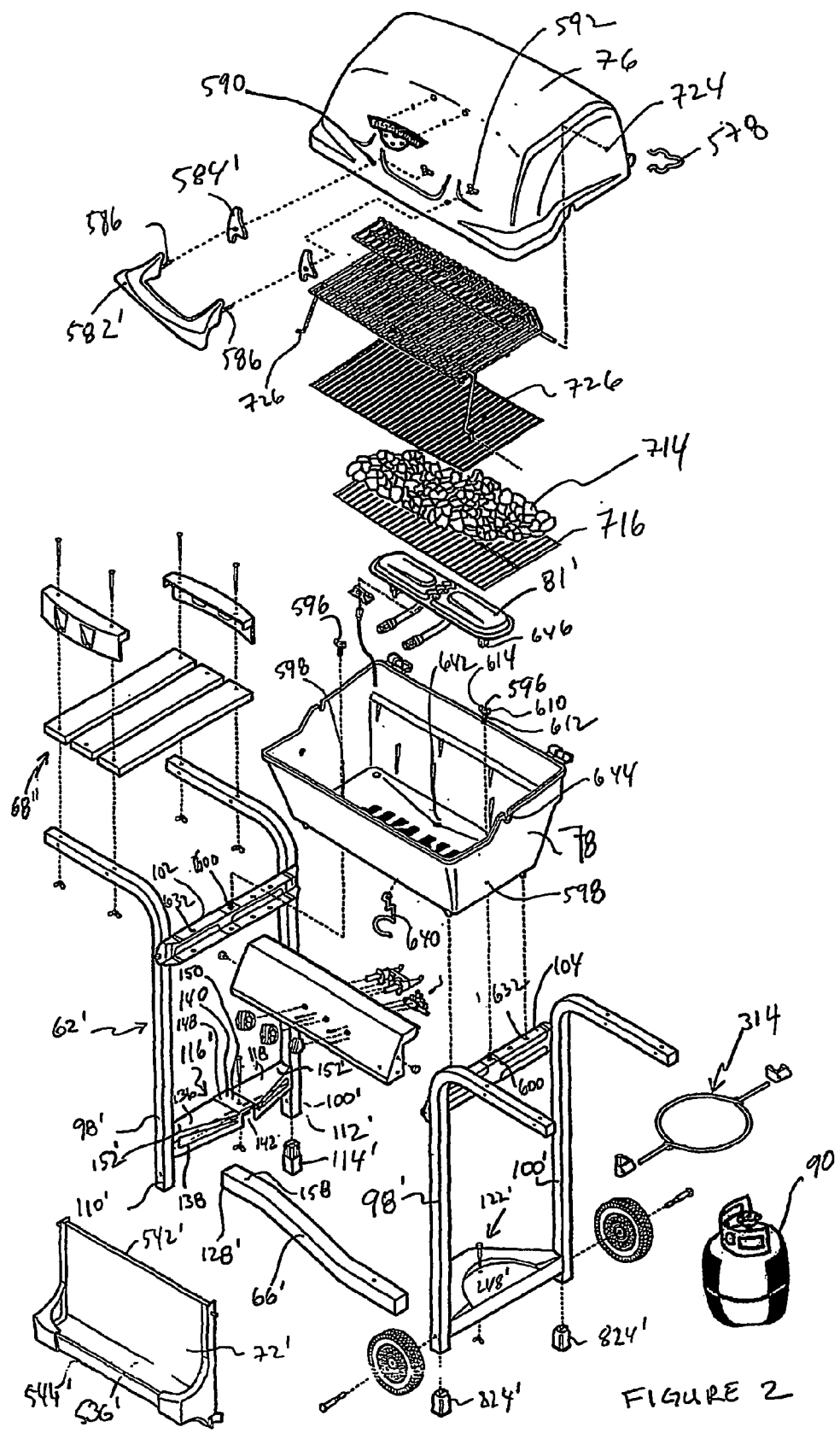
FIG. 2 is an exploded perspective view of the barbeque according to an alternative illustrative embodiment of the invention.

In the context of describing embodiments of the claimed invention, variations of detail are disclosed, a number of which are shown, for example, in FIG. 2. While one such variation is described in conjunction with another particular variation, yet other variations may generally be used in association as well. The description provided is therefore not intended to be limited to the particular combination of variations disclosed.

Support Member

Support member 62 may be configured to be substantially identical to support member 64, and may have a mirror configuration to support 64. In the embodiment illustrated in FIG. 2, support members 62, 64 differ in that support member 64 is provided with a fuel source support base 92. Except for the description of support base 92, the description of support member 62 generally applies to support member 64, unless otherwise noted.

Support member 62 has two leg members 98 and 100. In the illustrative embodiment, the leg members 98, 100 are substantially cylindrical, and may be hollow to reduce cost and weight. If leg members 98, 100 are made of a metal, such as steel tubing, they may have an external diameter of 1⅜ inches and a wall thickness of 0.036 inches. Leg members having other dimensions may also be used as long as sufficient structural support for barbeque 60 is provided. In an alternative embodiment, legs 98 and 100 may have substantially rectangular cross sections. For example, leg members 98 and 100 may be configured as leg members 98' and 100' having a generally square cross-section with one inch sides, as is shown in FIG. 2.

Referring to FIGS. 3 and 4, leg members 98, 100 may be joined to each other by at least one member, such as bridging member 102. Bridging member 102 may be connected to leg members 98, 100 either by spot welding, bolting, riveting or in some other appropriate manner known to those in this art. In the illustrative embodiment, bridging member 102 has one, and preferably two, slots 106 and 108 therethrough. Slots 106 and 108 laterally traverse bridging member 102 and are positioned to receive a weld therethrough for attaching leg members 98 and 100 to the bridging member 102. To conserve weld material, the width of slots 106 and 108 may be made narrow enough to receive a standard weld.

Figure 4B:
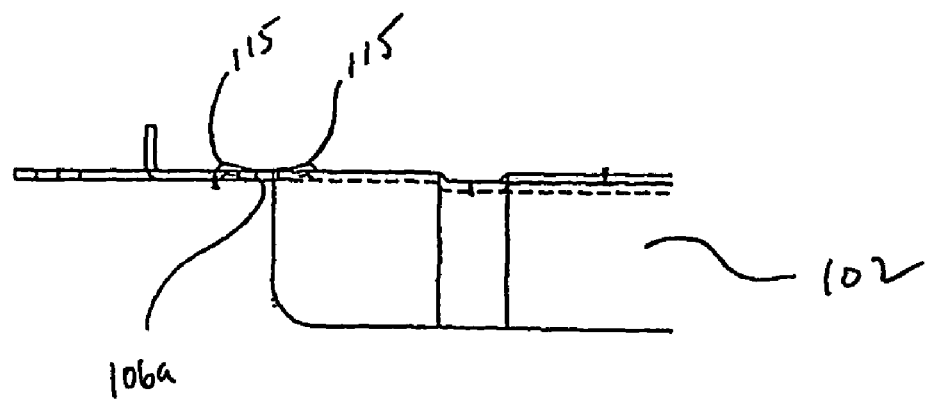
FIG. 4B is a partial top view of the end of the bridging member shown in FIG. 4A.
Figure 4A:
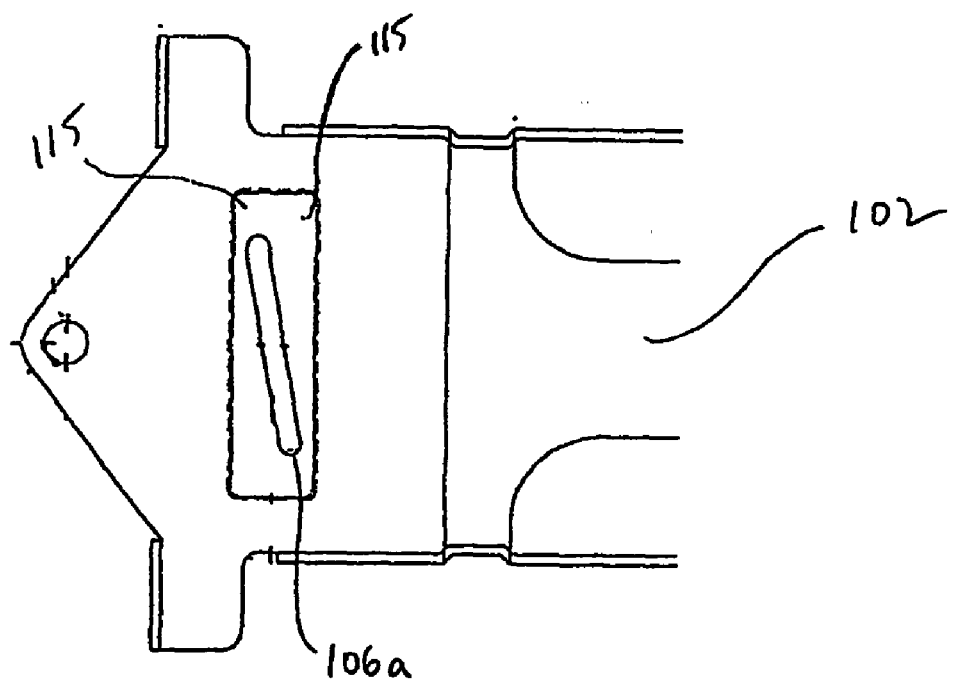
FIG. 4A is a partial side view of an end of a bridging member of the barbeque of FIG. 1 showing an alternate welding slot.
Figure 5:
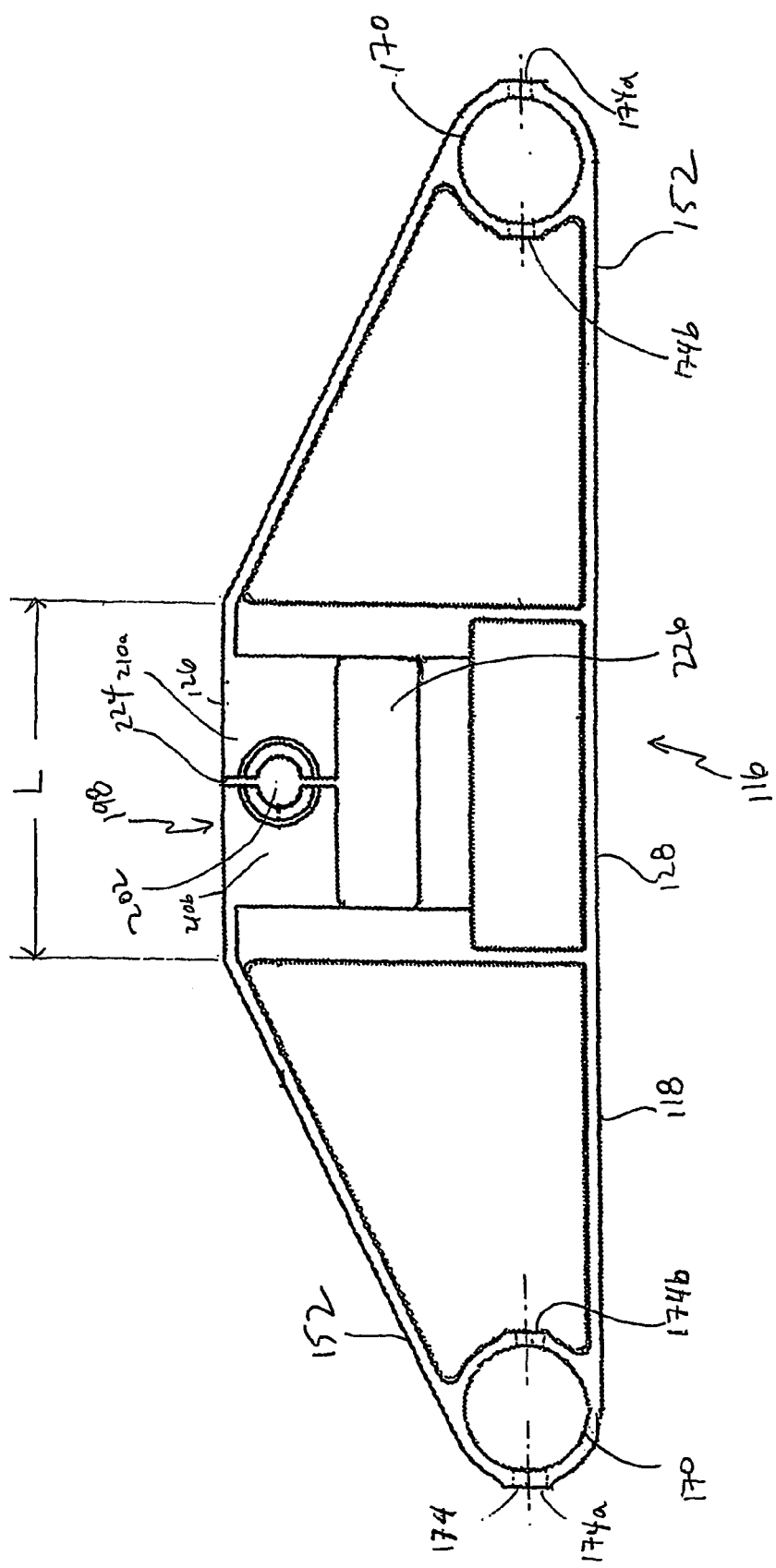
FIG. 5 is a side view of a beam connection member of the barbeque of FIG. 1.

Referring to Figure to FIGS. 4A and 4B, an alternate weld slot such as slot 106a may be used to strengthen the weld formed between bridging member 102 and leg 98. In comparison to the location of slot 106, slot 106a is rotated about its centroid so that the weld material applied through slot 106a attaches to leg 98 at both sides of a longitudinal centerline of leg 98, whereas slot 106 directs the weld material to an orientation that is substantially parallel to a longitudinal centerline of leg 98. The rotation of slot 106a is preferably approximately 10 degrees. An abutting member or saddle having protrusions or wings 115 for abutting leg 98 may be added to, or integrally formed with, bridging member 102 so that bridging member 102 is closer to leg 98 adjacent the location of a weld. Wings 115 may also facilitate the positioning of leg 98 relative to slot 106a before a weld is applied. Wings 115 are preferably stamped, embossed or otherwise integrally formed with bridging member 102 so that they protrude from bridging member 102 to abut and conform to a portion of the periphery of leg 98. As shown in FIG. 4B, wings 115 may have an arcuate cross section which conforms to a portion of leg 98.

In an alternative configuration (not shown), a weld may be applied to both sides of a longitudinal centerline of leg 98 to attach bridging member 102 thereto by including two substantially parallel slots in bridging member 102, instead of one slot such as slot 106a. The two slots are preferably oriented adjacent one another and are generally parallel to a longitudinal centerline of leg 98. Bridging member 102 may then be welded to leg 98 through each slot.

By joining leg members 98 and 100 using bridging member 102, a substantially rigid structure is created, with leg members 98 and 100 preferably oriented generally parallel to one another, and bridging member 102 may be generally perpendicular to leg members 98 and 100. When in their operative position, legs 98 and 100 preferably are generally vertically oriented, and may rest on their respective base ends 110 and 112. Alternatively, leg members 98 and 100 may rest on wheels 94, casters 74, leg extensions 114 or other terminating elements as are known to those skilled in the art.

For stability, leg members 98 and 100 may be substantially uniformly spaced from each other by a distance corresponding generally to a width W of the grill housing 74. It will be appreciated by those versed in the art that a wider spacing for the leg members 98 and 100 may provide greater stability to barbeque 60, while a narrower spacing could make barbeque 60 top-heavy and prone to tipping. For example, if a narrower grill housing is used (not shown), the spacing between leg members 98 and 100 as configured for a larger housing 74 may be appropriate, and may provide greater stability to barbeque 60 than if a spacing approximating the width of the narrower grill housing was used.

While support members 62, 64 each have at least two leg members 98 and 100, they could alternatively each have just one leg member (not shown) if the single leg member is made sufficiently large to provide adequate support and stability to the grill housing 74 and other components of the barbeque 60. Components herein described as being attached or connected between leg members 98 and 100, could be attached to the single leg member in substantially the same orientation as for the embodiment of support members 62, 64 each having two leg members 98 and 100.

Cross Beam

A cross member, in the nature of cross beam 66, joins first support member 62 to second support member 64 to form a substantially rigid structure for supporting grill housing 74, and other components of the barbeque 60. For stability, cross beam 66 may be of a length which is approximately the same as that of the grill housing 74. For example, cross beam 66 may be approximately 18 inches long. This ensures that support members 62 and 64 may be attached to grill housing 74 generally below and approximately aligned with opposite sides of the grill housing 74.

Cross beam 66 may have a uniform lateral cross-section that is generally rectangular in shape, for example, having two respective opposed sides of three-inch width and two respective opposed sides of four inch width, or sides all having a similar width such as 2½ inches. Alternatively, beam 66 may have a cross-sectional configuration which is polygonal, round, or non-uniform in shape. To reduce costs and material, the beam 66 may be hollow. A rigid plastic, or a metal, whether formed by injection moulding, extrusion, bending, or some other appropriate process, is preferably used to construct cross beam 66.

While cross beam 66 is generally linear in the illustrative embodiment of the invention, it may have angles or curves formed therein for orienting the beam 66 for attachment to each support member 62 or 64, as described in greater detail below. For example, FIG. 2 shows an alternative cross beam 66' used in an embodiment of the invention.

Beam Connection Member

Referring additionally to FIGS. 5, 6, 7, 7A, 8 and 8A, a beam connection member 116, having a strut 118 with a beam receptacle 120 defined therein, connects beam 66 to support member 62. A second beam connection member 122, having a beam receptacle 124, connects beam 66 to support member 64. Beam connection members 116 and 122 are similar in configuration except that at least one of the beam connection members, for example beam connection member 122, may be configured to have a fuel source support base 92 for supporting a fuel container such as a propane tank 90, as described below. If a propane tank 90 is not used in conjunction with barbeque 60, for example if a natural gas feed is used, then beam connection members 116 and 122 may alternatively be configured identically to one another or as mirror images of one another (not shown). Aside from the possible consideration of a fuel source support base 92, the following description of beam receptacle 120, applies to beam receptacle 124 as well, unless otherwise indicated.

Beam receptacle 120 has an open end 126 for receiving an end 128 of cross beam 66. Beam receptacle 120 may also have a closed end 130 which is opposed to open end 126 prevents cross beam 66 from being inserted into the receptacle 120 any further. Closed end 130 also provides feedback by way of abutment of cross beam 66 thereagainst to indicate that beam 66 is fully inserted, and ready to be secured. In addition to closed end 130, beam receptacle 120 has walls 132 that, in conjunction with closed end 130, define receptacle 120 as substantially the same shape, and at least the same size as end 128 of cross beam 66. If a beam 66 with a round or curved lateral cross-section (not shown) is used, then receptacle 120 may have one continuous wall. The difference between the size of receptacle 120, as defined by walls 132 and end 130, and cross beam end 128, is preferably configured to be at a minimum to reduce movement of end 128 within beam receptacle 120.

Beam connection member 116 may be made from a metal, plastic or other suitable material known to those in this art. If made from a plastic, it may be integrally formed by injection moulding or extrusion.

Figure 9:
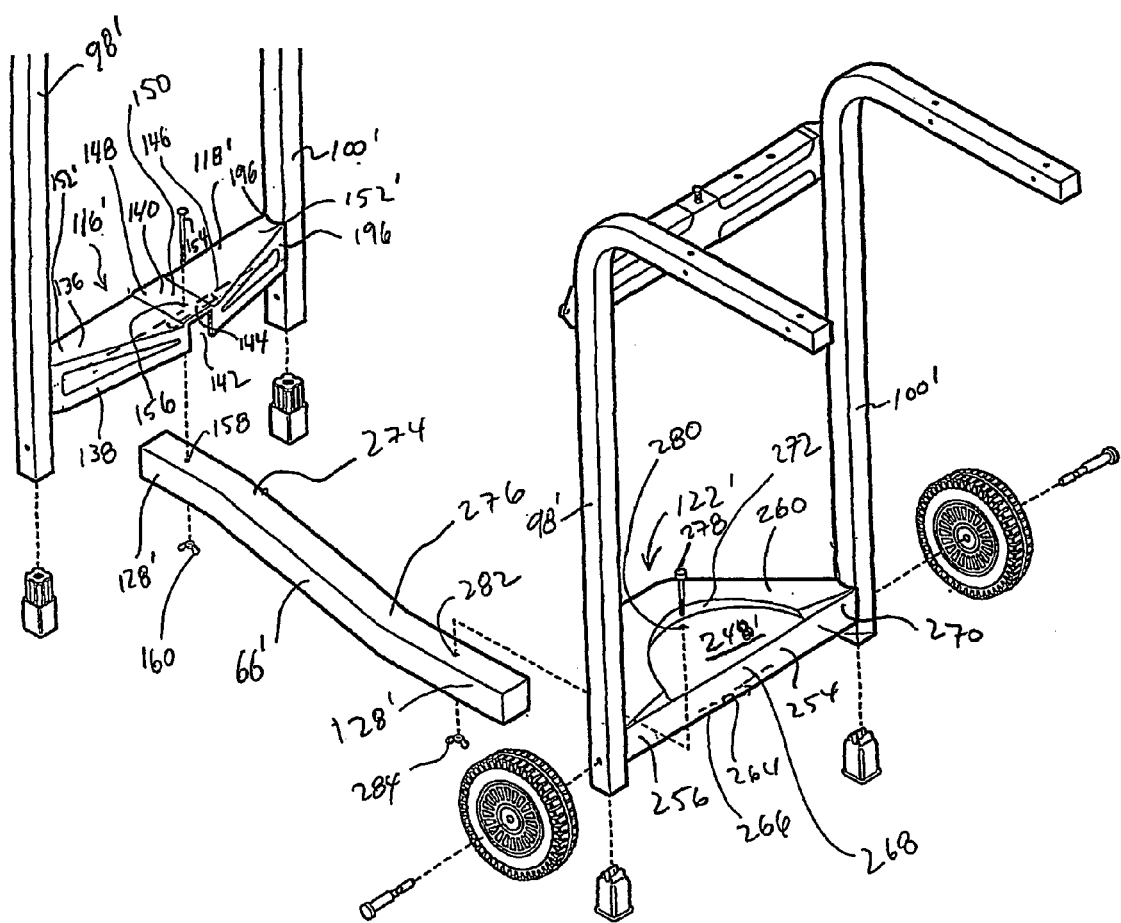
FIG. 9 is an exploded partial perspective view including beam connection members, support members and a cross beam of the barbeque of FIG. 2.

Referring to FIGS. 2 and 9, an alternative embodiment of beam connection member 116' is formed as a strut 118' having a generally inverted U-shaped cross-section. Strut 118' may be attached between leg members, such as leg members 98' and 100', as described below. Arms 136 (whose lower longitudinal edge is shown in a phantom line) and 138 of the U-shaped cross-section are preferably substantially at right angles to base 140 of the U-shaped cross-section. Strut 118' is preferably attached between leg members 98' and 100' adjacent leg member base ends 110' and 112'. When attached between leg members 98' and 100', arms 136 and 138 may be generally parallel to the longitudinal axes of the leg members, and the U-shaped cross section preferably opens in the general direction of leg member base ends 110' and 112' (FIG. 2).

Arm 138 may have an opening 142 formed therein for receiving beam end 128'. Opening 142 preferably is substantially the same size as a lateral cross-section of beam end 128' so as to mate therewith. To facilitate placement of beam end 128' into opening 142, opening 142 may correspond to the general shape of just three sides of beam end 128', to define a generally right-angled U-shaped opening 142.

Cross beam 66' may be attached to strut 118' by first inserting beam end 128' into opening 142 until beam end 128' abuts arm 136 of strut 118'. Arm 136 of strut 118' may additionally have a supporting member attached thereto for supporting beam end 128'. The supporting member may be in the form of a substantially perpendicular flange 144 along a free end 146 (shown as a phantom line) of arm 136, the flange 144 being generally directed towards opening 142. Beam end 128' may rest on flange 144 once beam end 128' abuts arm 136. When fully inserted into opening 142, movement of beam end 128' is inhibited by arm 136, flange 144 of arm 136, base 140 of strut 118' and edges of opening 142. A transverse indent 148 in base 140 between arm 138 and opening 142 may also receive and align a portion of beam end 128'. Furthermore, opening 142 may additionally have a flange such as a peripheral flange (not shown) for abutting cross beam 66'.

To abut a greater portion of beam end 128', base 140 of strut 118' may be widened at a mid-section 150 of strut 118'. Mid-section 150 may widened in a direction generally away from arm 136 or away from arm 138, or in both directions. While strut 118' maintains its U-shaped cross-section in this configuration, arms 136 and 138 are closer to one another at the ends 152 of strut 118' and become gradually further apart to a maximum when adjacent mid-section 150. If mid-section 150 is widened in a direction away from arm 138 only, beam connection member 116' then projects from the plane of legs 98 and 100 in a similar direction as an attached shelf 68 (or 68' or 68"). This may enable a support member such as support member 62' having a shelf 68" and a beam connection member 116' to occupy a smaller volume when placed in a container such as a shipping box (not shown) than if mid-section 150 projected in an opposite direction.

Beam end 128' may be attached to strut 118' using at least one fastener, such as a bolt 154, which is inserted through a hole 156 in base 140 and a corresponding bore 158 in beam end 128'. When beam end 128' is inserted into opening 142 to abut arm 136, hole 156 and bore 158 are preferably aligned to receive bolt 154. Hole 156 and bore 158 are aligned and may be generally vertically oriented to permit insertion of bolt 154 in a downward direction. This arrangement permits bolt 154 to rest within both hole 154 and bore 158, while also, to a limited extent, securing base 140 to beam end 128'. Once bolt 154 is inserted through both hole 154 and bore 158, it may be secured with a manually securable bolt retainer such as a wing nut 160 or some other manually tightenable fastener.

In the context of this description the terms "unassisted", "manual", "manually", "by hand", or other similar terms, indicate that the component or components described may be installed, attached or otherwise arranged without assistance of any mechanical advantage, including the use of tools or other implement. However, while unassisted installation of a component is preferred, it is not necessary. An appropriate tool or tools may optionally be used.

Figure 49:
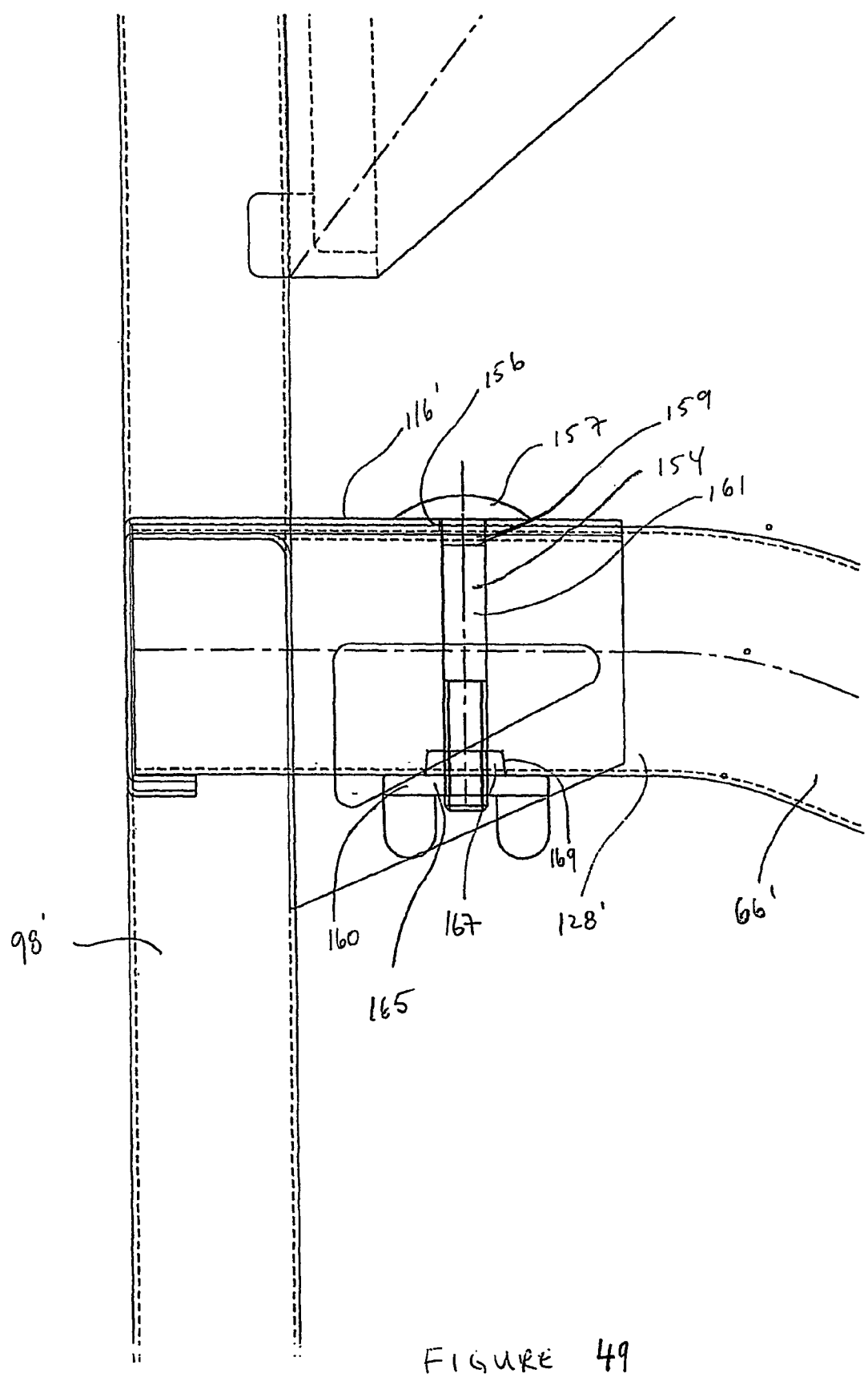
FIG. 49 is a transparent isolated side view showing the connection of a beam connection member and cross beam of the barbeque of FIG. 2.

As best seen in FIG. 49, bolt 154 may have a widened head 157 for abutting a greater portion of beam connection member 116'. By contacting a greater portion of beam connection member 116', movement of installed bolt 154 may be further inhibited, which in turn may reduce movement of retained cross beam 66' relative to beam connection member 116'.

Rotational movement of bolt 154 may be limited by a portion 159 of a bolt shaft 161 defining a non-rotatable shape. Shaft portion 159 may be located adjacent head 157. At least hole 156 (see also FIG. 9) may be configured to have substantially the same shape as defined by a periphery of shaft portion 159 to permit shaft portion 159 to be located therein. Because shaft portion 159 is non-rotatable, and may be located within similarly sized hole 156, shaft 161 may be inhibited from rotating, for example, when nut 160 is threaded and tightened thereon. This may permit additional unassisted or manual tightening of nut 160 to bolt 154 to further inhibit movement of connected beam end 128' relative to beam connection member 116'. In an illustrative embodiment, shaft portion 159 has a substantially rectangular cross section and hole 156 is similarly configured to be generally rectangular in shape.

Figure 50A:
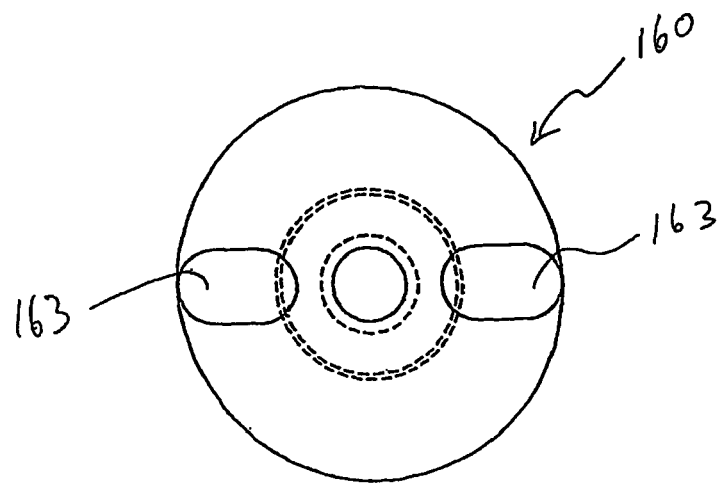
FIG. 50A is an end view of a wing nut of the barbeque of FIG. 2, with hidden features shown in phantom.
Figure 50B:
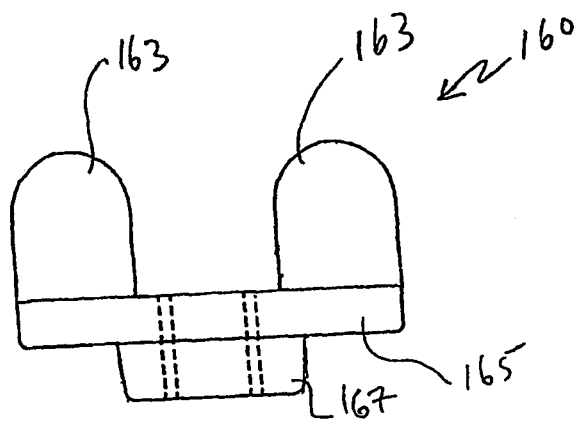
FIG. 50B is a side view of the wing nut of FIG. 50A, with hidden features shown in phantom.
Figure 50C:
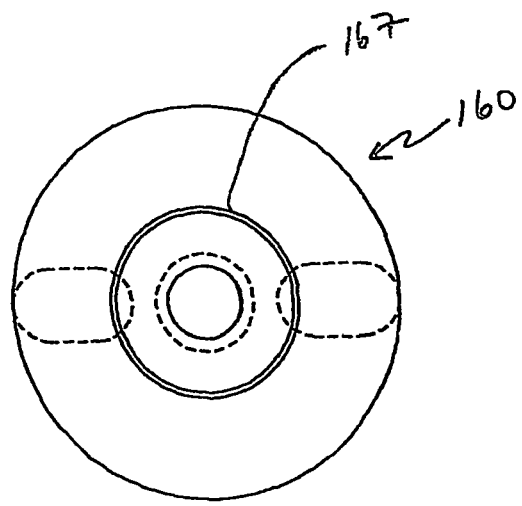
FIG. 50C is another end view of the wing nut of FIG. 50A viewed from a direction opposite to the end view of FIG. 50A, with hidden features shown in phantom.

Referring to FIGS. 50A–50C, nut 160 is shown with wings 163 extending in a direction generally perpendicular to nut body 165. Increased leverage for turning nut 160 may be obtained by angling wings 163 away from a central axis of nut 160 (not shown).

Nut 160 may additionally include a nub 167 for gripping sides of a corresponding rebate 169 in beam end 128'. Nub 167 protrudes from nut body 165 in a direction substantially opposite to the direction of the protrusion of wings 163, and may be tapered, being wider adjacent nut body 165. Rebate 169 may be similarly tapered but marginally smaller than nub 167. As nut 160 is threaded onto bolt shaft 161, nub 167 enters rebate 169. Because rebate 169 is marginally smaller than nub 167, and both rebate 169 and nub 167 are similarly tapered, friction between nub 167 and sides of rebate 169 gradually increases. Once nub 167 is tightened within rebate 169, loosening of nut 160, for example due to movement of barbeque 40, may be inhibited. Tapered rebate 169 may also guide nub 167 into position as nut 160 is tightened.

Beam connection member 116' is preferably made from a single sheet of metal, which may be cut and then bent to define the elements described above. Beam connection member 116' may alternatively be made of plastic or other suitable material, as known to those skilled in this art.

Figure 10:
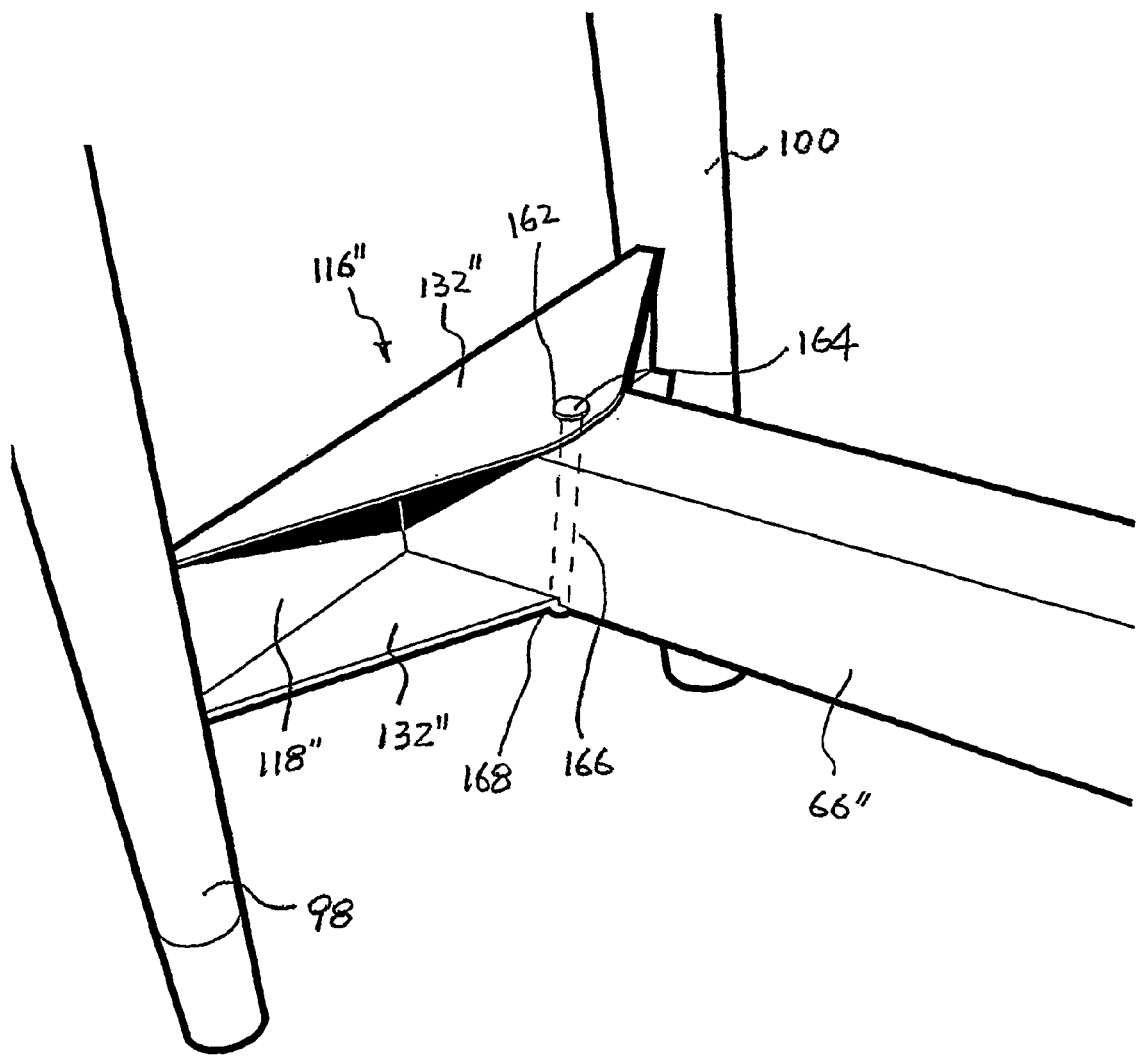
FIG. 10 is a partial perspective view of an alternative embodiment of the beam connection member and cross beam of the barbeque of FIG. 2.

Referring to FIG. 10, a further alternative beam connection member 116", preferably made of metal, has two walls 132" protruding substantially perpendicular to a strut 118" of beam connection member 116". Walls 132" are respectively preferably located to abut top and bottom opposite sides of end 128" of cross beam 66', as shown in FIG. 10. The walls 132" may respectively alternatively be oriented (not shown) to abut opposite sides of cross beam end 128" other than the said top and bottom opposite sides.

Each wall 132" has at least one hole 162 passing therethrough for receiving a fastener such as bolt 164. Holes 162 have collinear axes and align with a bore 166 (shown in phantom lines) in cross beam end 128". When wall holes 162 and bore 166 are aligned, bolt 164 may be inserted therethrough and manually secured at a free end using a wing nut 168 or some other manually tightenable fastener. Before bolt 164 is inserted, wall holes 162 and bore 166 are aligned and preferably generally vertically oriented to permit insertion of bolt 164 in a downward direction. This arrangement permits bolt 164 to rest within holes 162 and bore 166, while partially securing walls 132" to beam end 128". Wing nut 168 may then be conveniently attached and tightened causing walls 132" to urge against beam end 128".

Beam connection member 116" may be constructed from a single generally planar sheet of metal having two bends formed therein to define walls 132" and strut portion 118". The beam connection member 116" may then be welded to leg members such as leg members 98 and 100.

Attachment of Beam Connection Member to Leg Members

Beam connection member 116, may be rigidly attached to at least one, and preferably both, of the leg members 98, 100. If beam connection member 116 is attached to both leg members 98, 100, then the connection member 116 may provide structural support to support member 62. Strut 118 of beam connection member 116 spans leg members 98 and 100, and may be secured to leg members 98 and 100 at its ends 152 which may have portions defining two conduits 170. Each conduit 170 may be attached to, or be integral with, the respective ends 170 of strut 118. Strut 118, bridging member 102 and legs 98 and 100, preferably, combine to form a ladder-like configuration.

To attach strut 118 to leg members 98 and 100, each leg member 98, 100 is inserted through a respective conduit 170. The conduits 170 preferably have a lateral cross-section substantially equal to or larger than the size and shape of the lateral cross-section of the respective leg members 98, 100. This permits the leg members to be inserted through conduits 170. If the cross-sections of the conduits 170 and leg members 98, 100 are substantially the same size, then a friction fit may be formed between the each conduit 170 and leg member 98, 100. To position strut 118, the axes of conduits 170, are moved along the longitudinal axis of the leg members 98, 100.

Figure 11:
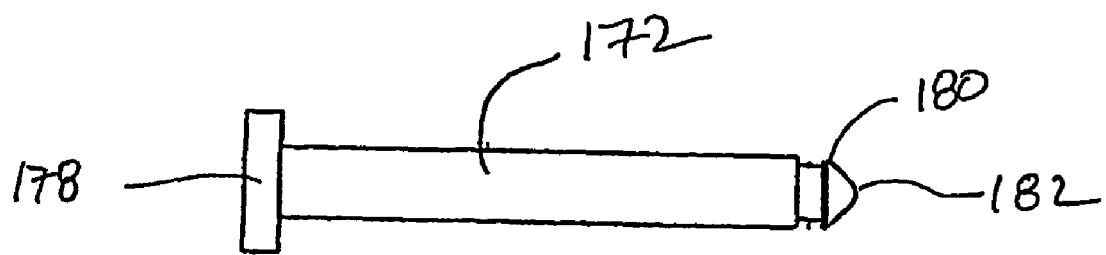
FIG. 11 is side view of a pin of the barbeque of FIG. 1.

Conduits 170 may be secured to leg members 98, 100 using pins 172 (see FIG. 11). Each conduit 170 has a hole 174 passing laterally therethrough for receiving a pin 172. Hole 174 has an entry 174a and an exit 174b. Similarly, each leg member 98, 100 has a hole 176, passing laterally therethrough for receiving pin 172. Hole 176 has an entry 176a and an exit 176b. To install pin 172, the respective entries 174a, 176a and exits 174b, 176b are aligned. The pin 172 may then be inserted therein to hinder movement of the conduit 170 relative to leg member 98, 100.

Pin 172 preferably has a head 178, which is larger than entry 174a to inhibit movement of pin 172 along its longitudinal axis within the holes 174, 176. Pin 172 may also have a catch 180 to inhibit longitudinal movement of the pin 172 within the holes 174, 176. Catch 180 is located at the insertion end 182 of the pin 172. End 182 is located opposite to head 178. Catch 180 may be marginally larger than exit hole 176b to inhibit pin 172 from being removed once end 182 is fully inserted therethrough. To facilitate passage of catch 180 through marginally smaller exit hole 176b, end 182 may be tapered. An annular rebate 184 may also be provided in pin 172. The annular rebate 184 is located adjacent to catch 180, and receives a portion of the boundary of marginally smaller exit hole 176b.

Referring to FIG. 12A, an alternative fastener, such as slotted pin 186, may be used to attach strut 118 to leg members 98, 100. In a similar manner as described for pin 172, slotted pin 186 is installed. Slotted pin 186 however has a slightly different configuration than pin 172. Slotted pin 186 preferably has a head 188, which is larger than entry 174a to inhibit movement of pin 186 along its longitudinal axis within the holes 174, 176. Pin 186 may also have a catch 189 to inhibit longitudinal movement of pin 186 within the holes 174, 176. Catch 189 is located at the insertion end 190 of pin 186. End 190 is located opposite to head 188. Catch 186 may be marginally larger than exit hole 176b to inhibit pin 186 from being removed once end 190 is fully inserted therethrough. To facilitate passage of catch 189 through marginally smaller exit hole 174b, end 190 may be tapered. To further facilitate passage of catch 186, end 190 may have at least one and preferably three partially transverse slots 192 emanating from a central longitudinal axis of pin 186. Each slot 192 is preferably uniformly angularly displaced from the other. As end 190 is inserted through the marginally smaller exit hole 174b, slots 192 permit end 190 to narrow, facilitating passage of catch 186, therethrough. Slotted pin 186 may be made of a resilient material such as a plastic so that end 190 returns to its original shape once it passes through exit hole 174b to enable catch 189 to inhibit removal of pin 186.

Yet further alternative means may be employed to secure strut 118 to leg members 98, 100. For example, an axial portion of conduit 170 may be removed to form a yoke (not shown). The yoke may be snapped onto a leg member 98, 100, and pinned in place as described above. Instead of, or in addition to catch 180, the insertion end 182 of pin 178 may have a lateral hole therethrough for receiving a retaining clip or cotter pin (not shown) which further inhibits movement of pin 178 along its longitudinal axis.

Referring again to FIG. 9, if beam connection member 116 is made of metal, for example as described above as beam connection member 116', strut portion 118' may be secured to the leg members 98, 100 by one or more welds, as long as legs members 98 and 100 are also made of a metal. To accommodate both rounded and square leg members 98, 100, ends 152' of strut 118' may have concave rebates 194, instead of having conduits 170. Concave rebates 194 may be arcuate and have substantially the same radius as leg members 98, 100 which have round cross-sections. Strut 118' may also be welded to leg members having rectangular cross-sections, such as leg members 98' and 100'. As long as the leg member 98', 100' is wider than the distance between edges 196 of the arcuate rebate 194, strut 118' may be welded to leg members 98', 100' along edges 196.

In the various embodiments, strut portion 118 is preferably attached so that it is substantially perpendicular to legs 98 and 100. Walls 132 of beam receptacle 120 are preferably oriented so that the received cross beam 66 is substantially perpendicular to both strut 118 and legs 98, 100. Similar relationships between the analogous structural elements of the alternative embodiments are also preferred.

Referring to FIG. 7B, in an alternative embodiment, beam connection members 116, 122 extend and combine to form a unitary beam connection member 197. Unitary beam connection member 197 does not have beam receptacles 120, 124, nor is a cross beam 66 included. Instead, the beam connection members 116a and 122a of each support member 62, 64 are integral with one another, having a joining portion 199 therebetween. To reduce the size of the combined beam connection members, for example for shipping, the joining portion may be bifurcated (not shown). The bifurcation is preferably located equidistant from each connection member 116a and 122a. As with other parts of the barbeque 60, the bifurcated joining portion may be assembled using connectors such as threaded receptacles and bolts that may preferably be manually installed. Alternatively, the free ends of the bifurcated joining portion may be configured to have a releasable snap fit or friction fit to permit unassisted joining and separation of the connection members.

Beam Securing Apparatus

Figure 13A:
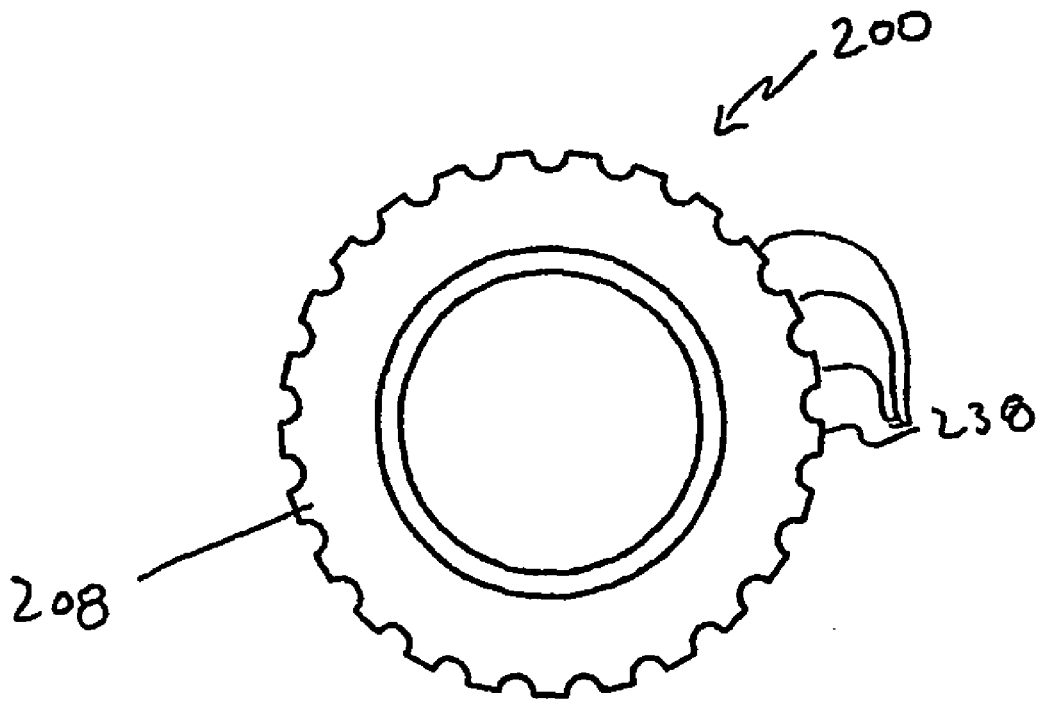
FIG. 13A is an end view of a bolt of the barbeque of FIG. 1.
Figure 13B:
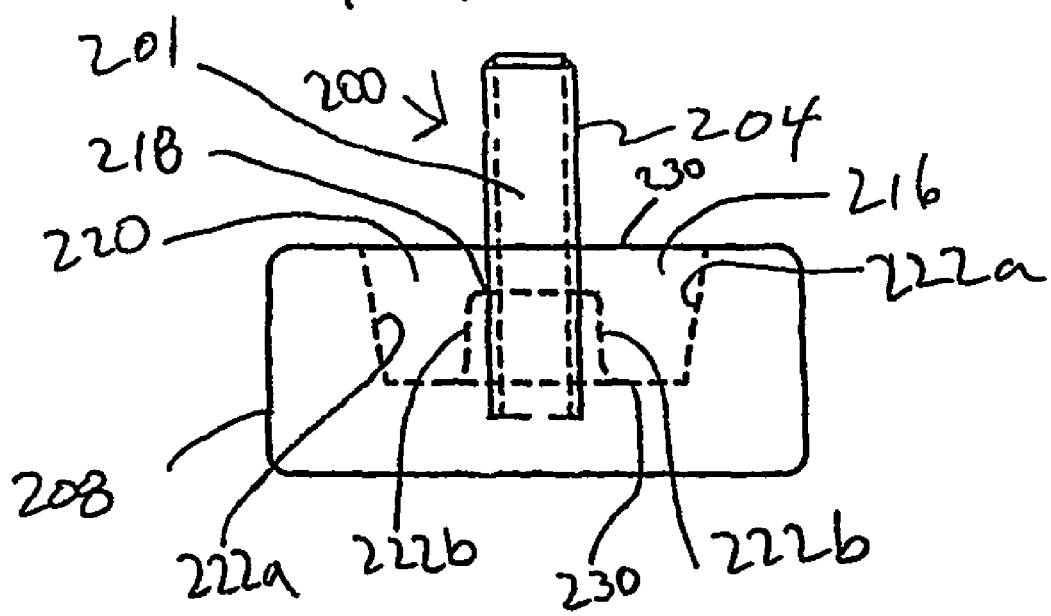
FIG. 13B is a side view of a bolt of the barbeque of FIG. 13A, with hidden features shown in phantom.

Referring again to FIGS. 5, 6, 7, 7A, 8, and 8A, and to FIGS. 13A and 13B, a beam securing apparatus 198 of beam connection member 116 secures beam 66 within receptacle 120. Beam connection member 122 may have a similar configuration to beam connection member 116, and is discussed in greater detail below.

The beam securing apparatus 198 includes a fastener for attaching receptacle 120 to beam 66. The fastener may be a manually installable fastener, such as bolt 200 (FIGS. 13A and 13B) that may be installed and tightened by hand. Bolt 200 may additionally be loosened and removed by hand. The beam securing apparatus 198 also includes an opening or passage, in the nature of a hole 202 defined in one of walls 132 and passing therethrough. A shaft 201 of bolt 200 having a threaded end 204 may be inserted through hole 202, and may be received by a bolt retainer in the nature of a corresponding bore of the beam securing apparatus 198, which may be a bushing 206, fixed in the cross beam 66. Bushing 206 preferably has internal threads 207 for threaded engagement with the threaded end 204. Hole 202 is smaller than a head 208 of bolt 200 to inhibit head 208 from passing through hole 202. As a result, when an end 128 of cross beam 66 is inserted into receptacle 120, it may be secured to a wall 132 of receptacle 120 by bolt 200, inserted through hole 202, into bushing 206, and tightened by hand. In the illustrative embodiment, at least one of the walls 132 is an attachment wall 210, and the hole 202 passes through attachment wall 210. While the hole 202 is located in a wall 210, additional holes 202 may be located in other walls 132 to receive additional screws 96. Similarly, more than one hole 202 may be included in the same wall 132.

To further secure an end 128 of cross beam 66, the beam securing apparatus 198 may include a protrusion in the nature of a raised collar 212 which may be used to limit movement of bolt 200 once the bolt 200 is tightened. The collar 212 is co-axial with hole 202, and protrudes away from the inside 214 of receptacle 120.

Head 208 of bolt 200 has a generally annular void 216 for matingly receiving collar 212. Void 216 is coaxial with threaded end 204 of bolt 200, and is open adjacent the point of attachment 218 of threaded end 204 and screw head 208. Void 216 has an internal surface 220 defining a shape that is congruent to and substantially the same size as collar 212. The shape of void 216 need not be uniform, nor does it have to correspond precisely to the shape of collar 212. The shape of void 216 and collar 212 need only be sufficiently similar to permit threaded end 204 of bolt 200 to be inserted through the hole 202, into threaded bushing 206, and tightened to cause collar 212 to enter void 216 and to come into sufficient contact with portions of internal surface 220 to inhibit movement of the bolt 200. If void 216 is slightly smaller than collar 212 then a friction fit may be formed between internal surface 220 and collar 212. If void 216 is made to be too small, or if it is a substantially different shape than collar 212, then collar 212 may be inhibited from entering void 216 and bolt 200 may not be turned and threaded, or it may only be partially threaded, into bushing 206, which is undesirable.

Beam securing apparatus 198 may also include a slot 224 located in attachment wall 210 to facilitate increasing the friction between receptacle walls 132 and beam end 128. As slot 224 is narrowed, the internal perimeter of receptacle 120, as defined by walls 132, decreases, causing the walls 132 to grip the beam end 128. This gripping may reduce movement of receptacle 120 relative to beam 66, and, by connection, movement of support member 62 relative to beam 66.

Slot 224 passes through collar 212 and adjacent attachment wall 210 to create collar pieces 212a and 212b, and adjacent wall portions 210a and 210b. Slot 224 may be oriented substantially perpendicular to the internal perimeter of the receptacle 120 as defined by walls 132. While slot 224 may pass through collar 212 at a chord, it preferably bisects the collar 212 into two substantially equal pieces 212a and 212b. To facilitate movement of collar pieces 212a and 212b relative to one another, so that beam end 128 may be gripped, slot 224 preferably extends to an edge of receptacle 120 adjacent open end 126. Movement of collar pieces 212a and 212b may be further facilitated by increasing the length of slot 224. Increasing the width of the slot 224 between adjacent portions 210a and 210b may also facilitate movement of collar pieces 212a and 212b. For example, slot 224 may be lengthened and widened adjacent collar pieces 212a and 212b to form a window 226 in attachment wall 210. The window 226 may be generally rectangular, having one inch and three inch sides. Other sizes and shapes created by lengthening and/or widening slot 224 may facilitate varying degrees of relative movement of collar pieces 212a and 212b.

As collar pieces 212a and 212b are moved closer to one another to a proximate position, slot 224 becomes narrower, and adjacent wall portions 210a and 210b move closer to one another to reduce the overall length L of adjacent wall 210. This shortening of wall 210 reduces the overall internal perimeter of the receptacle 120 defined by the walls 132. Receptacle 120 preferably initially has substantially the same perimeter as beam end 128. This enables a marginal reduction in the receptacle's perimeter to cause the walls 132 to grip the beam end 128. To keep collar pieces 212a and 212b proximate to one another, bolt 200 is installed while maintaining the position of pieces 212a and 212b. As bolt 200 is tightened, proximate collar pieces 212a and 212b enter void 216. The shape of void 216 is preferably similar to the combined shape of proximate collar pieces 212a and 212b. Once bolt 200 is installed, it limits the movement of collar pieces 212a and 212b. This arrangement maintains the grip of receptacle walls 132 on beam end 128.

Bolt 200 and collar pieces 212a and 212b may be configured to cause beam end 128 to be progressively clamped as bolt 200 is tightened. This may be achieved by configuring the annular void 216 of the bolt 200 to be narrower at a closed end 228 of void 216, and to be progressively wider at an open end 230 of void 216. Annular void 216 has an outer circumferential surface 222a and an inner circumferential surface 222b. In the illustrative embodiment outer circumferential surface 222a is angled, at 10 degrees for example, relative to the axis of threaded end 204. As a result, outer surface 222a is further from threaded end 204 at open end 230 of the void than it is at closed end 228. In the illustrative embodiment, the diameter of outer circumferential surface 222a is approximately one inch adjacent open end 230. Inner circumferential surface 222b may be angled in a direction opposite to that of surface 222a, or it may be parallel to the axis of threaded end 204. Due to the orientation of surfaces 222a and 222b, void 216 tapers to closed end 228.

When collar pieces 212a and 212b are positioned together to form collar 212, they are preferably configured to be substantially the same size and shape, and preferably marginally larger than, annular void 216. Accordingly, collar pieces 212a and 212b have outer circumferential surface portions 232a and 232b. When collar pieces 212a and 212b are positioned apart, free ends 234a and 234b of the respective collar pieces 212a and 212b are preferably positioned for engagement by open end 230 of void 216. This permits free ends 234a and 234b to be inserted into void 216 as threaded end 204 of bolt 200 is inserted into hole 202.

As bolt 200 is tightened, the outer circumferential surface 222a of void 216 and the corresponding outer circumferential surface portions 232a, 232b of collar pieces 212a and 212b gradually come into sliding contact with one another. Slot 224 permits collar pieces 212a and 212b to move closer to one another as force is exerted on the pieces 212a, 212b by outer circumferential surface 222a. This force is caused by the tightening of the bolt 200 moving the screw head 208 closer to the collar pieces 212a, 212b. As the pieces 212a and 212b are forced to move closer to one another, the walls 132 of receptacle 120 grip beam end 128 with increasing force, as described above. Bolt 200 may be manually tightened to the point that collar pieces 212a and 212b are at least partially retained by void 216. This arrangement permits the cross beam end 128 to be gripped by walls 132 forming a substantially rigid connection between cross beam 66 and support member 62, without the need for tools. Furthermore, the connection may be made using one bolt 200 at each end 128 of cross beam 66. Because collar pieces 212a and 212b together are marginally larger than void 216, a tight fit is formed between the screw head 208 and collar pieces 212a, 212b to inhibit loosening of bolt 200.

In the illustrative embodiment, slot 224 may be wider at slot portion 236a which is adjacent open end 126 of receptacle 120. As wall portions 210a and 210b are forced closer together by the tightening of bolt 200, a narrow portion 236b of slot 224 may become closed before bolt 200 is fully installed, while wide portion 236a is just narrowed. As installation of bolt 200 continues, the force exerted by bolt 200 on collar pieces 212a, 212b is increased. This forces slot wide portion 236a to narrow further, reducing the internal perimeter of the receptacle 120, as defined by walls 132, and causing the walls 132 increase their grip on beam end 128 adjacent to receptacle open end 126. In the illustrative embodiment, slot wide portion 236a may be 0.10 inches across, and slot narrow portion 236b may be 0.06 inches across.

In an alternative embodiment, the outer surface 222a of void 216 may be configured to define other shapes such as a concave or convex taper (not shown) or some other, preferably uniform, shape that permits the bolt 200 to be installed while at the same time forcing collar pieces 212a and 212b closer to one another so that beam end 128 may be gripped.

Similarly, the configuration of void 216 and the corresponding configuration of collar pieces 212a, 212b may be varied to achieve the same effect as described above. For example, while it is preferable that outer surface 222a defines void 216 which tapers to closed end 228, the shape of the taper may vary. Surface 222a may taper linearly, or it may follow a somewhat uniform curve, such as a parabolic, or higher order, function. Outer circumferential surface 222*a* may also be non-uniform as long as it generally tapers sufficiently to engage and force correspondingly configured collar pieces 212*a*, 212*b* together.

It is not necessary that collar pieces 212*a* and 212*b* be continuous. Portions of the collar pieces 212*a* and 212*b* may be removed to leave a number of smaller protrusions (not shown). Provided that sufficient portions of the collar 212 remain to engage, without significant deformation, the outer surface 222*a* of screw void 216, a substantially equivalent function as described above may be achieved. For example, instead of a collar, a plurality of posts may be provided (not shown), with at least one post on either side of slot 224, and with each post positioned for sliding engagement with outer circumferential surface 222*a*.

To permit the described movement of collar pieces 212*a* and 212*b* so that beam end 128 may be gripped as the bolt 200 is tightened, walls 132 defining receptacle 120 may be made of a bendable material, and are preferably made of a resilient material. An appropriate plastic or metal, for example, may be used.

The head 208 of bolt 200 may be graspable, having, for example, external grips, such as knurls (not shown), cross hatches (not shown), or ridges 238, to provide greater friction to facilitate unassisted installation of bolt 200. In the illustrative embodiment, the head 208 is cylindrical, having a diameter of about 1.5 inches and a thickness of about 0.625 inches, or some other size and shape suitable for manual manipulation. The threaded end 204 protrudes substantially co-axially with the axis of the head 208. A plurality ridges 238, each being substantially parallel to the axis of the threaded end 204, may be located about the circumference of the cylindrical head 208. Turning of the bolt 200 about its longitudinal axis may also be improved by using a non-circular or non-uniform shaped head (not shown) with the threaded end 204 preferably protruding from head 208 along an axis passing through a centroid of head 208.

Figure 14A:
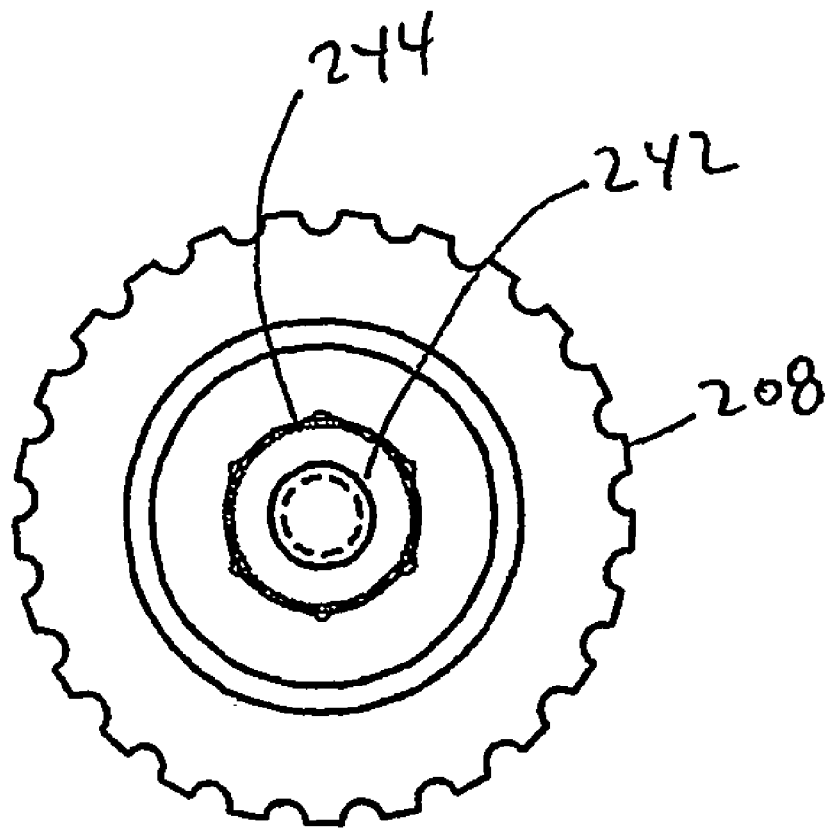
FIG. 14A is an end view of an alternative embodiment of the bolt of FIG. 13A.
Figure 14B:
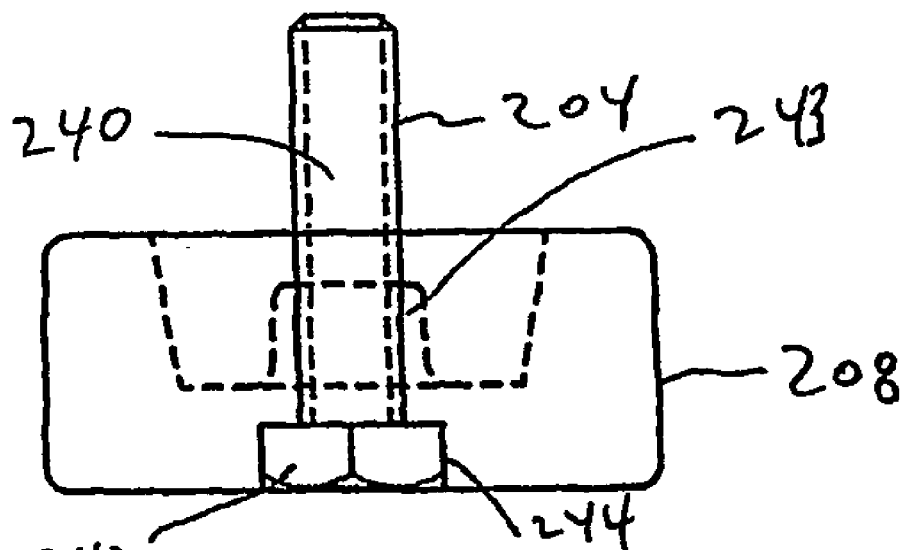
FIG. 14B is a side view of the bolt of FIG. 14A, with hidden features shown in phantom.

Head 208 may be made of any rigid material, such as nylon, plastic or a metal. If constructed from a plastic, bolt 200 may be integrally moulded with head 208. Referring to FIGS. 14A and 14B, provide an alternative connection between the threaded end 204 and head 208, the threaded end 204 may be part of a bolt 240 having a bolt head 242. To receive threaded end 204, screw head 208 may be provided with a bore 243 therethrough which is coaxial with the rotational axis of the screw-head 208. A rebate 244 may be added to a side of the head 208 opposite to void 216. Rebate 244 is centered about bore 243, and is substantially the same shape but marginally smaller than bolt head 242. Bolt 200 is assembled by inserting threaded end 204 into rebate 244 and through bore 243. Because rebate 244 is marginally smaller than bolt head 242, force must be applied to the bolt head 242 in the direction of the threaded end 204, to press fit head 242 into rebate 244. A bolt having a non-rotatable bolt head, such as a ¼-20 hex bolt, is preferably used to increase rotational resistance between screw head 208 and bolt head 242 within rebate 244.

Fuel Source Support

Referring to FIG. 7, beam connection member 122 may be similar in configuration to beam connection member 116, except that, in the illustrative embodiment, beam connection member 122, may be configured to have an integral fuel source support base 92 for supporting a self contained fuel source, such as a propane tank 90 (shown in FIG. 1). Other aspects of beam connection member 122, such as the beam securing apparatus 198 described above, are configured and operate in substantially the same manner as described for beam connection member 116. However, the relative positioning of receptacle 124 and conduits 170 for securing beam connection member 122 to leg members 98, 100 may require adjustment to accommodate base 92. In addition to supporting a fuel source, base 92 additionally performs a function analogous to strut 118 of beam connection member 116 in joining conduits 170 and having beam receptacle 124 defined therein.

Beam connection member 122 is preferably moulded to have a fuel source support base 92, which substantially conforms to the shape of at least a base rim 246 of a propane tank 90. A standard domestic use "20 pound" propane tank such as part number G20-28 manufactured by Wolfdale Engineering Ltd. of Brampton, Ontario, may be used to determine the dimensions of support base 92. Base rim 246 is received by a corresponding receptacle in the nature of a base rim cavity 248 defined in support base 92. Because base rim cavity 248 conforms to the shape of base rim 246, tipping or other movement of tank 90 is hindered by the support base 92. A void 250 may be located in cavity 248 to save material and to provide drainage for the cavity 248.

Tipping may be further reduced by increasing the dimensions of support base 92 to conform to a greater portion of the tank 90. For example, support base 92 may have an abutment including portions defining a receptacle in the nature of a lower tank cavity 252 that conforms to a continuous portion of the lower part of tank 90 that is adjacent to base rim 246. Tank cavity 252 does not need to encompass the entire circumference of tank 90. While complete circumferential support may be used to further reduce possible movement of tank 90, it may also make it more difficult to place tank 90 within base 92. For similar reasons, the portions of base 92 which define tank cavity 252 are preferably located adjacent beam receptacle 124. Tank 90 may then be placed into base 92 by first approaching a side of base 92 opposite to receptacle 124 to avoid encountering cross beam 66 and the portions defining lower tank cavity 252. Base 92 is preferably moulded from plastic but may moulded from metal as well.

Referring to FIGS. 9, 15 and 60A–60D, to reduce costs, an alternative beam connection member 122', which is similar in configuration to beam connection member 116', may be used. As with beam connection member 122, beam connection member 122', may have an integral fuel source support base 92'.

Beam connection member 122' is formed as a strut 254 having a generally U-shaped cross-section, and may be attached between leg members, such as leg members 98 and 100, or 98' and 100'. The U-shaped cross-section has arms 256 and 258 which are joined by a base 260 (best seen in FIGS. 60C and 60D). Arm 256 and arm 258 of the U-shaped cross-section are preferably substantially at right angles to base 260. Strut 254 is preferably attached between leg members 98 and 100 adjacent leg member base ends 110 and 112. When attached between leg members 98 and 100, arms 256 and 258 may be generally parallel to the longitudinal axes of the leg members, and the U-shaped cross section preferably opens in the general direction of leg member base ends 110 and 112.

Having a configuration similar to arm 138 of beam connection member 116', arm 258 may have an opening 262 formed therein for receiving beam end 128'. Opening 262 preferably is congruent to and substantially the same size as a lateral cross-section of beam end 128'. To facilitate placement of beam end 128' into opening 262, opening 262 may correspond to the general shape of just three sides of beam end 128, to define a generally right-angled U-shaped opening 262.

Cross beam 66' may be attached to strut 254 by first inserting beam end 128' into opening 262 until beam end 128' abuts arm 256 of strut 254. Arm 256 of strut 254 may additionally have a supporting member attached thereto for supporting beam end 128'. The supporting member may be in the form of a substantially perpendicular flange 264 along a free edge 266 of arm 256, flange 264 being generally directed towards opening 262. Beam end 128' may rest on flange 264 once beam end 128' abuts arm 256.

Referring in particular to FIGS. 60A–60D, to further inhibit movement of beam end 128' when inserted into opening 262, one or more projections 267, extending from base 260, abut beam end 128'. Projections 267 may be added to base 260 or they may be stamped from the same material as base 260, creating holes 269, as shown in FIG. 60A. When fully inserted into opening 262, beam end 128' is inhibited by arm 256, flange 264 of arm 256, base 260 of strut 254, projections 267 and edges of opening 262. Opening 262 may additionally have a flange such as a peripheral flange (not shown) for abutting cross beam 66.

To abut a greater portion of beam end 128', base 260 of strut 254 may be widened at a mid-section 268 of strut 254. Mid-section 268 may widened in a direction generally away from arm 256 or away from arm 258, or in both directions. While strut 254 maintains its U-shaped cross-section in this configuration, arms 256 and 258 are closer to one another at the ends 270 of strut 254 and become gradually further apart to a maximum when adjacent mid-section 268. If mid-section 268 is widened in a direction away from arm 258 only, beam connection member 122' then projects from the plane of legs 98 and 100 in a similar direction as an attached shelf 70. This may enable a support member such as support member 64 having a shelf 70 and a beam connection member 122' to occupy a smaller volume when placed in a container such as a shipping box (not shown) than if mid-section 268 projected in an opposite direction.

The widening of mid-section 268 is preferably sufficient to permit a base rim cavity 248' for receiving at least a portion of a tank base rim 246 to be defined in mid-section 268. To reduce the amount of material used, mid-section 268 may be configured to permit a base rim cavity 248' which receives a segment, for example half, of the base rim 246 of propane tank 90. If base rim cavity 248' is defined to receive a segment of base rim 246, the cavity 248' is partially defined by an arcuate wall 272 having a similar radius to base rim 246. Arcuate wall 272 may be curved in the general direction of opening 262, or it may curve in some other direction, such as away from opening 262.

Figure 15:
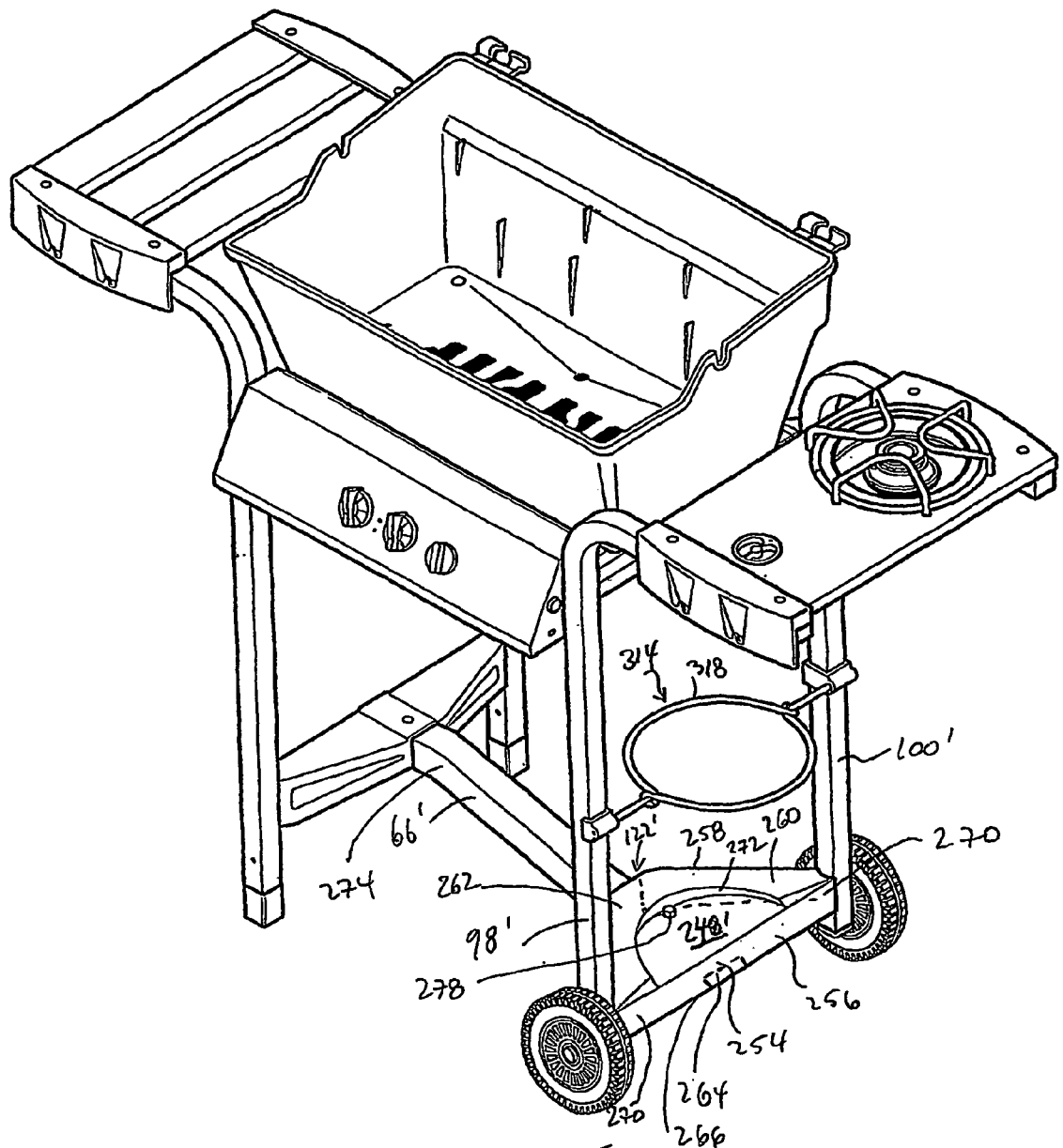
FIG. 15 is a perspective view of a partially assembled barbeque of FIG. 2.

Similarly, to save materials, the dimensions of a tank cavity analogous to tank cavity 252 may be reduced so that it encompasses a smaller portion of tank 90 (not shown). Alternatively, the tank cavity may be eliminated, as shown in FIGS. 9 and 15.

As a result of the reduction or elimination of tank cavity 252, the central axes of openings 142 and 262 are not collinear when barbeque 60 is assembled as in other embodiments. As a result, an alternative non-linear cross beam 66' having a curve or bends 274 and 276 therein orients beam ends 92' for insertion into openings 142 and 262 and attachment to beam connection members 116' and 122'.

Beam end 128' may be attached to strut 254 using at least one fastener, such as bolt 278, which is inserted through a hole 280 in base 260 and a corresponding bore 282 in beam end 128'. Hole 280 is preferably located to pass through portions of base 260 defining base rim cavity 248'. When beam end 128' is inserted into opening 262 and abuts arm 256, hole 280 and bore 282 are preferably aligned to receive bolt 278. Once bolt 278 is inserted therethrough, it may be manually secured with a wing nut 284 or some other manually tightenable fastener. Before bolt 278 is inserted, hole 280 and bore 282 are aligned and preferably generally vertically oriented to permit insertion of bolt 278 in a downward direction. This arrangement permits bolt 278 to rest within hole 280 and bore 282, while partially securing beam connection member 122' to beam end 128'. Wing nut 284 may then be conveniently attached and tightened.

Figure 48:
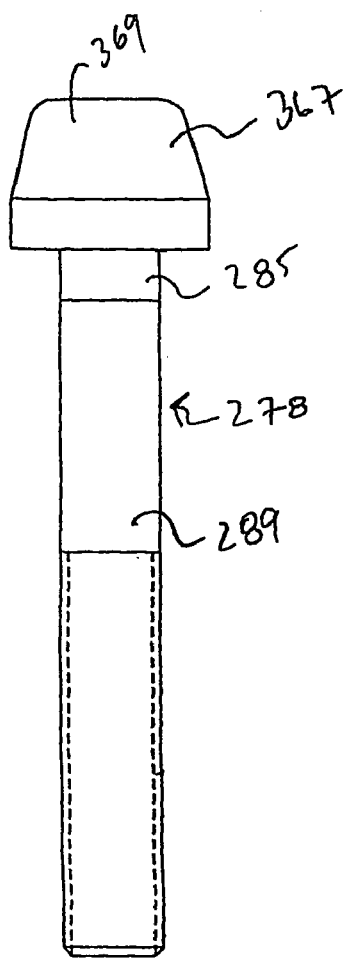
FIG. 48A is a side view of a fuel tank retaining bolt of the barbeque of FIG. 2.
FIG. 48B is an end view of the fuel tank retaining bolt of FIG. 48A.
Figure 48:
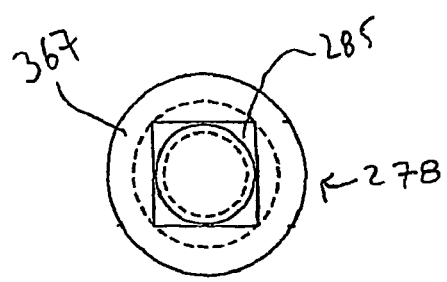

Referring to FIGS. 48A, 48B and 51, in a manner similar to that described above for bolt 154, rotational movement of bolt 278 may be inhibited by a portion 285 of bolt shaft 289 defining a non-round shape. Shaft portion 285 may be located adjacent bolt head 367. At least hole 280 (shown in FIG. 9) may be configured to have substantially the same cross-sectional shape as defined by a periphery of shaft portion 285 to permit shaft portion 285 to be located therein. Because shaft portion 285 is non-round, and may be located within a similarly sized hole 280, shaft 289 may be inhibited from rotating, for example, when nut 284 is threaded and tightened thereon. This may permit additional manual tightening of nut 284 to bolt 278 to further inhibit movement of connected beam end 128' relative to beam connection member 122'.

Nut 284 may be configured in a similar manner as described for nut 160, and it may likewise co-operate with a corresponding rebate 291, in a similar manner that nut 160 co-operates with rebate 169 to form a friction fit when nut 284 is threaded onto shaft 289.

Figure 16:
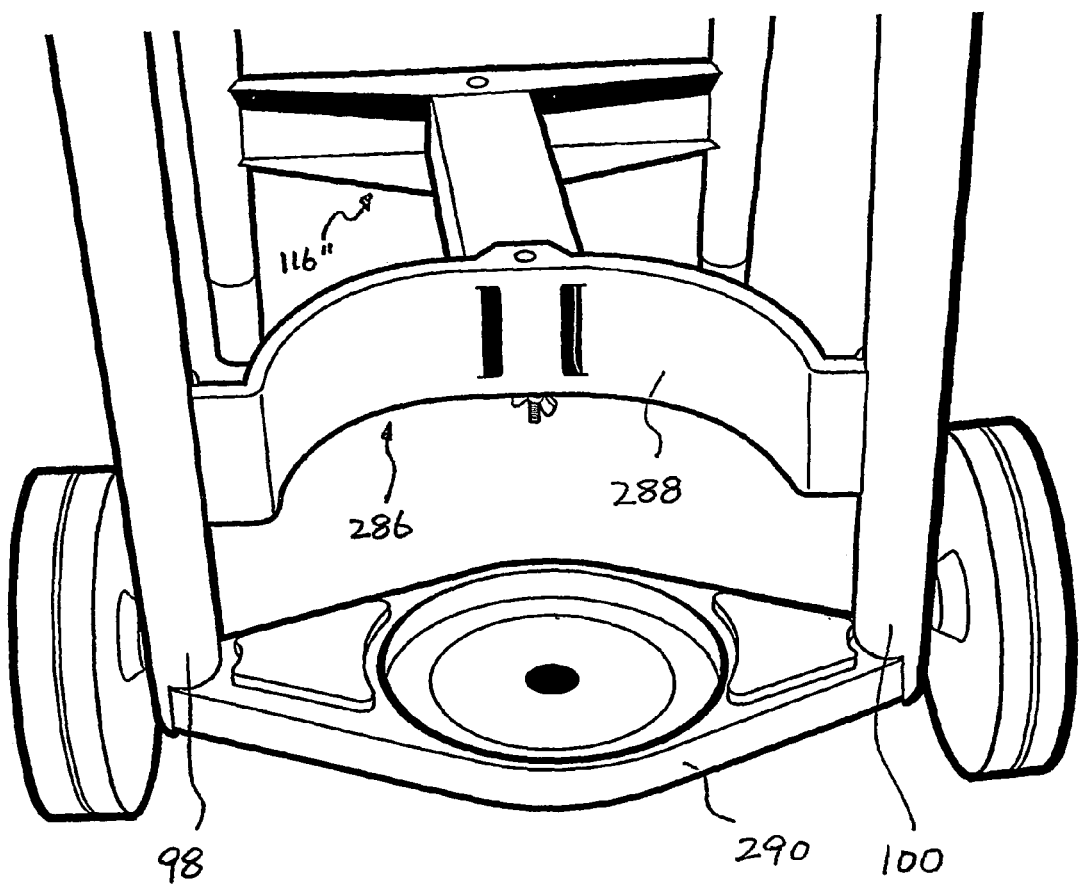
FIG. 16 is a perspective view of an alternative embodiment of the beam connection member and tank base of FIG. 2.

Referring to FIG. 16, an alternative configuration for supporting a tank 90 is shown. In the illustrated configuration, a beam connection member 286 having substantially the same structure as beam connection member 116" is attached between legs 98 and 100 in a similar manner as described for connection member 116". Beam connection member 286 differs from connection member 116" in that it has an arcuate portion 288 having generally the same radius as tank 90. When tank 90 is supported by a strut 290 spanning legs 98 and 100, a portion of curved tank body 292 (shown in FIG. 1) is received by arcuate portion 288, and lateral movement of tank 90 in the direction of beam connection member 286 may be inhibited. Movement of tank 90 may additionally be inhibited by one or more of the embodiments of a fuel source retainer described below. To further inhibit movement of tank 90, strut 290 may have a base rim cavity 248" which conforms to and receives at least a portion of a tank base rim 246, and preferably the full circumference of base rim 246.

Figure 17:
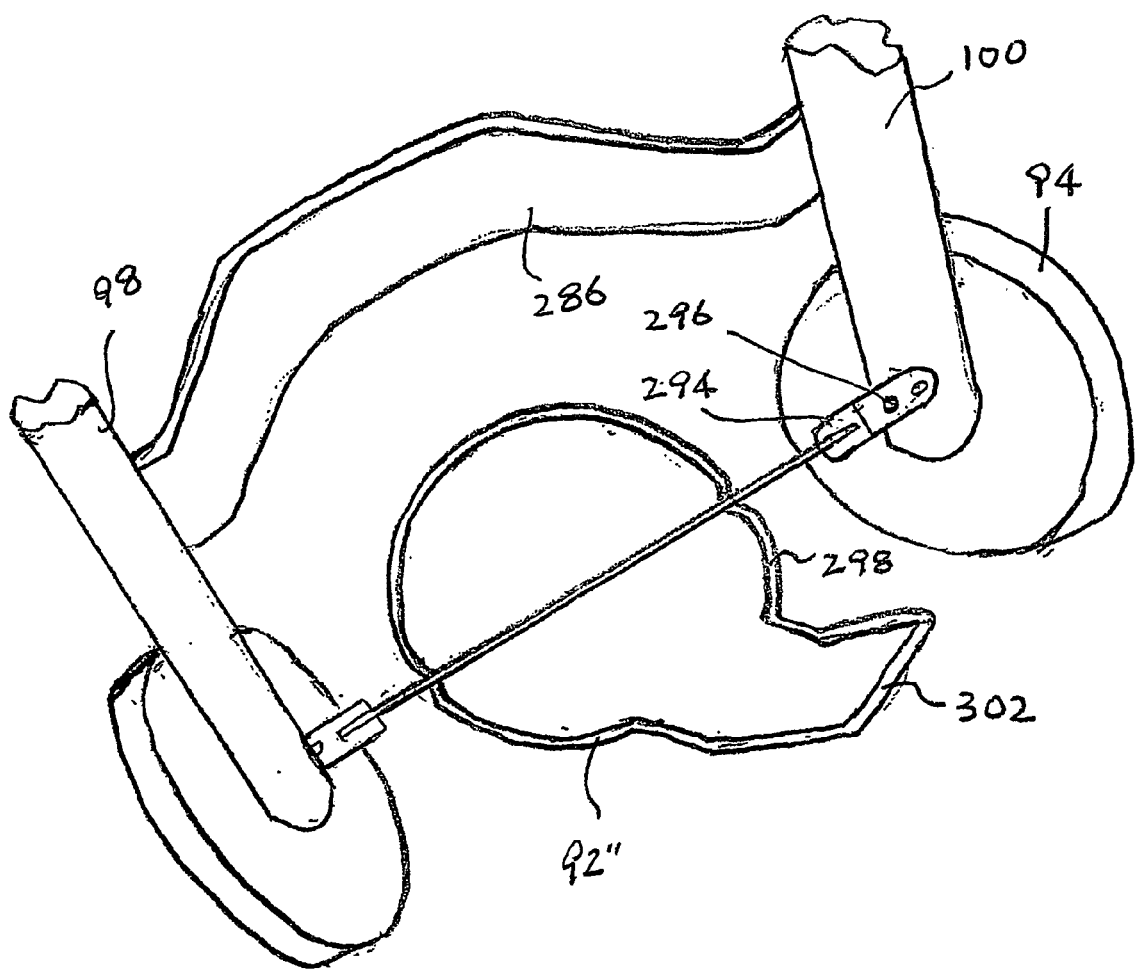
FIG. 17 is a perspective view of an alternative embodiment of the tank base of FIG. 16.

Referring to FIG. 17, an alternative embodiment of a tank support base which is separate from beam connection member 286 is shown. In this embodiment, tank support base 92" may be made from injection moulded plastic having a similar form as base 92, or it may be made of wire as shown in FIG. 17. Tank support base 92" may also be pivotally attached to legs 98, 100. Pivotal attachment may be achieved using collinear posts 294 protruding from each leg member 98 and 100. Posts 294 reside in aligned holes 296 located in support base 92". Aligned holes 296 are preferably generally located at either end of the longitudinal axis of base 92". If wheels 94 are added to barbeque 60, posts 296 may be extensions of the wheel axle pins described below. Pivotal attachment of base 92" permits base 92" to be angled to receive tank base rim 246. This may make it easier to place tank 90 into base 92". Once tank base rim 246 is placed within base 92", both base 92" and tank 90 may be rotated to a generally upright position. Movement of tank 90 may then be limited by beam connection member 286 and by adding a fuel source retainer, described below.

Figure 18:
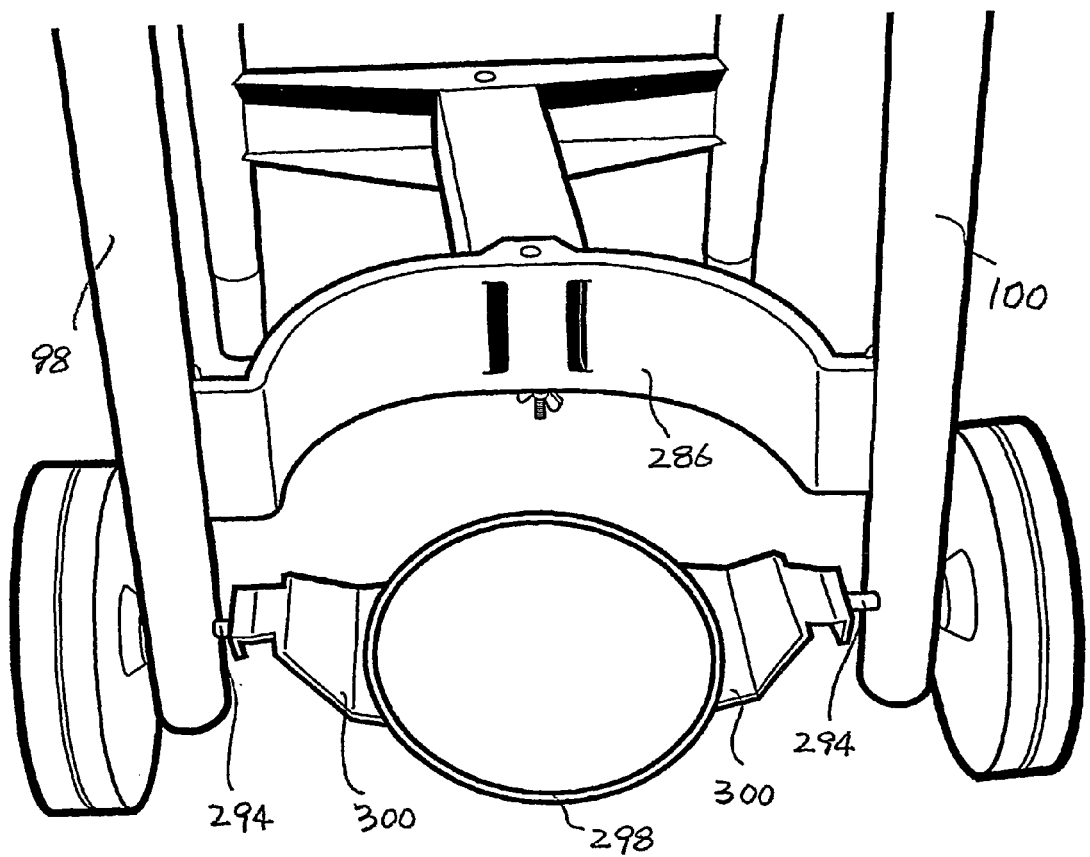
FIG. 18 is a perspective view of the tank base of FIG. 17 having strengtheners.

Base 92" may also have a base rim collar 298 for receiving tank base rim 246. For added support, base 92" may have one or more sections 300 (see FIG. 18) which conform to a portion of tank 90 to resist movement of tank 90 and to strengthen collar 298. Sections 300 may be located adjacent posts 294 to limit movement of tank 90 in a direction along the pivotal axis of base 92". Referring again to FIG. 17, additional retention of tank 90 may be achieved by addition of a tank support 302 which extends from and substantially normal to base rim collar 298, and is positioned to abut a side of tank 90 when tank 90 is placed in base 92".

Fuel Source Retainer

Referring to FIG. 1, for increased retention of tank 90 within support base 92, a fuel source retainer such as tank wire 304 may be added to base 92. Tank wire 304 may have an arcuate portion 306 that substantially conforms to a portion of the circumference of tank 90, such as tank body 292, to provide lateral support to tank 90 in a direction generally opposite to the support provided by portions of tank cavity 252 adjacent beam receptacle 124. Tank wire 304 may be attached to base 92 with two tank wire supports 308 formed at ends 310 of tank wire 304. Tank wire supports 308 may be oriented substantially normal to the plane arcuate portion 306 and may be inserted in tank wire retaining holes 312 located adjacent to conduits 170.

Figure 19:
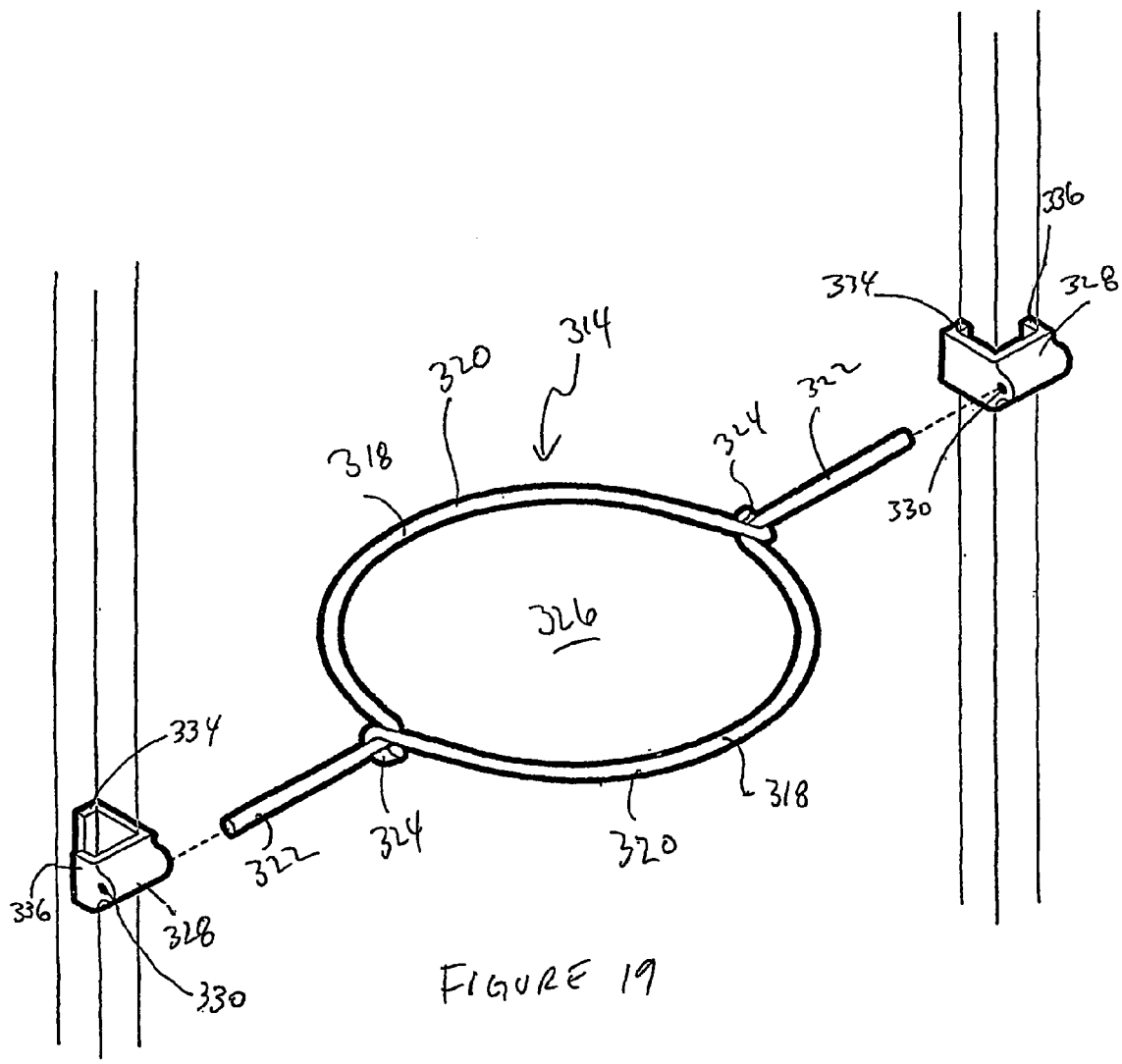
FIG. 19 is an exploded perspective view of a fuel source retainer of the barbeque of FIG. 2.

Referring to FIGS. 15 and 19, an alternative fuel source retainer such as a collar 314 may be used to inhibit movement of tank 90. Collar 314 has two substantially identical curved wire members 318. Each wire member 318 has a curved portion 320 having a generally uniform radius which is preferably less than the radius of tank body 292 but greater than the radius of a standard valve protecting sleeve 316 attached to tank 90. A mounting portion 322 is formed at an end of wire member 318. Mounting portion 322 may be linear and substantially perpendicular to semi-circular portion 320. The remaining end of wire member 318 may have a loop 324 defining a generally circular opening, the centroid of which is located on a line co-axial with a longitudinal axis of mounting portion 322. When the respective mounting portions 322 of each wire member 318 are inserted through the respective loops 324 of the other wire member 318, and semi-circular portions 320 are oriented to lie in substantially the same plane, a circular opening 326 is formed by the two semi-circular members 320. Collar 314 may be attached to support member 64 so that the collar 314 spans, and is preferably centered, between legs 98 and 100. Each mounting portion 322 may be attached to a respective leg member 98, 100 using a mounting clip 328 wherein each mounting portion 322 is inserted into a respective mounting hole 330 in each mounting clip 328 for rotational movement therein. Each mounting clip 328 is attached to a leg member 98 or 100 for sliding movement along a longitudinal axis of the leg member.

The mounting clips 328 are substantially identical to one another and may be mirror configurations of one another. The description of one mounting clip 328 therefore substantially applies to the other. Mounting clip 328 conforms to a portion of leg member 98 or 100. If leg member 98, 100 is has a round or oval lateral cross-section, then mounting clip 328 preferably encompasses greater than half of the circumference of a portion of the leg member so that the leg is retained by clip 328. Similarly, if leg member 98, 100 has a rectangular lateral cross-section then mounting clip 328 preferably encompasses at least two sides and at least part of both a third side and a fourth side of a portion of the leg member. Mounting clip 328 may be likewise configured to accommodate leg members having other cross sections. Mounting clip 328 preferably conforms to the attached leg member 98, 100 to the extent that the clip 328 is held in place by friction at the interface between the mounting clip 328 and the leg member 98, 100. However, the friction is preferably not sufficient resist manual positioning of clip 328 by sliding it longitudinally along leg member 98, 100.

To retain fuel tank 90, mounting clips 328 of collar 314 may be slidingly moved along leg members 98 and 100 to a position adjacent shelf 70. This positioning provides clearance for tank 90 to be placed within base 92. Once tank 90 is placed into base 92, mounting clips 328 of collar 314 are slidingly moved along legs 98 and 100 towards tank 90, valve sleeve 316 passes through collar opening 326, and curved members 320 may abut a shoulder portion 332 of tank 90. Any lateral movement of tank 90 within base 92 causes collar 314 to come into contact with valve sleeve 316 thus inhibiting further lateral movement of tank 90. To replace tank 90, one curved member 320 may be rotated toward and over valve sleeve 316 to permit removal of tank 90.

Mounting clips 328 may be attached to each leg member 98, 100 by simultaneously manually applying generally opposite forces to the ends 334 and 336 of clip 328 to increase the linear distance between them. This permits passage of a leg member 98 or 100. Since mounting clips 328 are preferably made of a generally resilient material, such as a plastic, when a force is no longer applied, the ends 334 and 336 return to their initial position to retain a portion of the leg member therein. The respective mounting portions 322 of each curved wire member 318 may then be inserted into the respective mounting holes 330. In the illustrative embodiment, at least the curved wire member 318 is sufficiently resilient to permit mounting ends 322 to be moved axially closer to one another as they are aligned with their respective mounting holes 330. Once aligned, the resilient curved portions 320 encourage the respective mounting members 322 to enter the mounting holes 330.

Curved portions 320 of collar 314 may alternatively have radii marginally larger than the radius of tank body 292. In this configuration (not shown) curved portions 320 are aligned with body 292 and combine to surround tank body 292 to inhibit lateral movement thereof.

Figure 20:
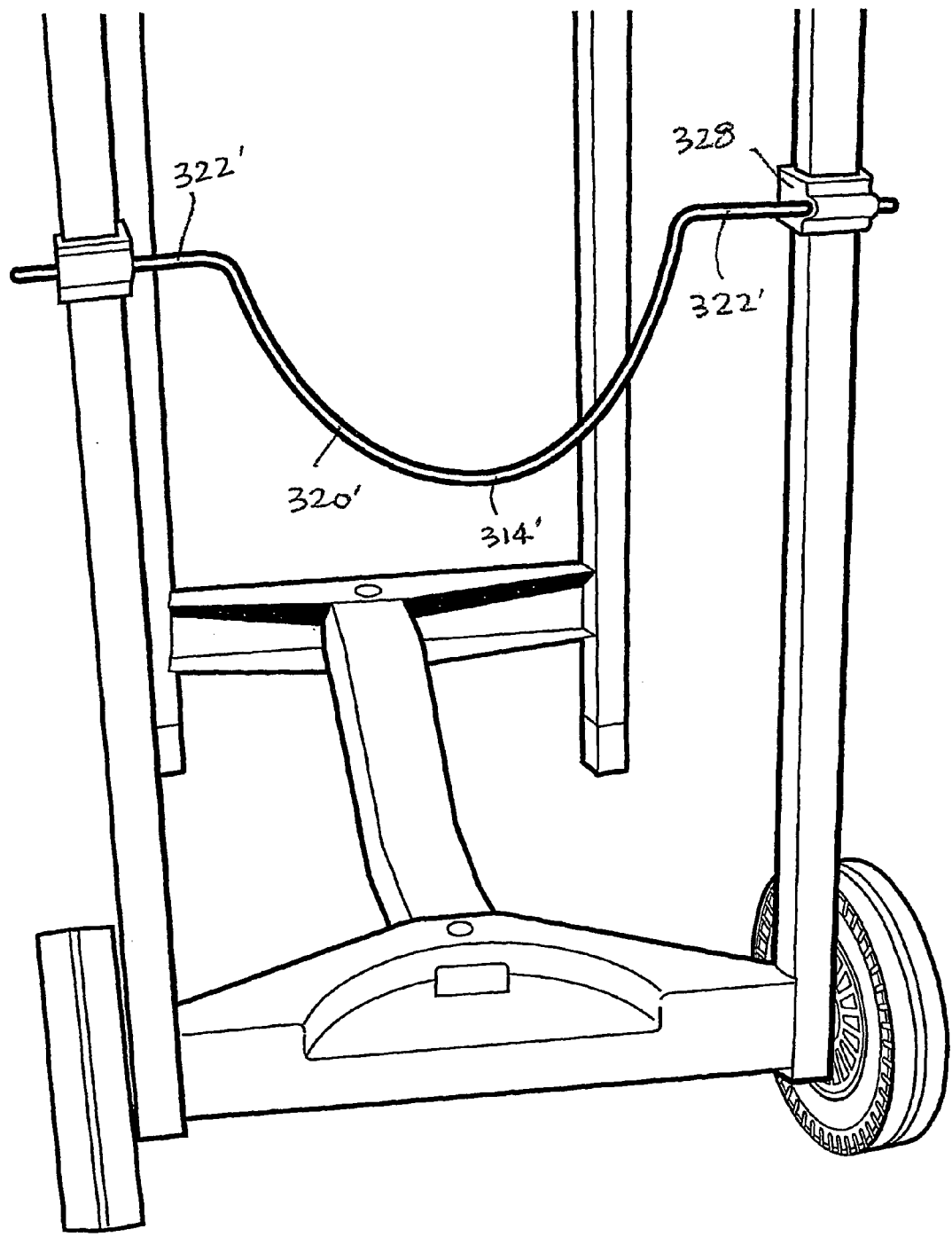
FIG. 20 is a perspective view of an alternative embodiment of the fuel source retainer of FIG. 19.

Referring to FIG. 20, a yet further alternative fuel source retainer such as a collar 314' may be used to inhibit movement of tank 90. Collar 314' may include a single piece of wire having a curved, and preferably semi-circular, portion 320' formed therein to define two mounting portions 322'. The configuration of both curved portion 320' and mounting portions 322' is substantially the same as described for curved wire member 318 and mounting portion 322 of the embodiment described above. Collar 314' is attached to mounting clips 328, and permits the installation, retention and removal of a tank 90 in a similar manner as described above for collar 314.

Referring to FIGS. 21A and 21B, curved portion 320" may be additionally configured to capture an edge of valve protecting sleeve 316. For example, curved portion 320" may have a clip 338 formed therein for engaging a portion of sleeve 316. In order to engage sleeve 316 the radius of curved portion 320" is preferably substantially the same as sleeve 316 so that clip 338 may be aligned with sleeve 316.

In a yet further alternative embodiment (not shown), mounting clips 328 may be eliminated and the mounting portions of the various embodiments, for example mounting portions 322, may be inserted directly into mounting holes located in each leg member 98 and 100 for rotational movement therein.

Referring to FIGS. 44 to 47F, an alternate fuel source retainer 341 is shown. Unlike the above-described fuel source retainers, retainer 341 may depend from bridging member 104 and engage valve protecting sleeve 316 to inhibit movement of tank 90 when placed on a support such as beam connection member 122', having base rim cavity 248'. Retainer 341 may be used in conjunction with other supports such as fuel source support base 92. In the present description, retainer 341 will be described in the context of a tank 90 supported by beam connection member 122'.

Figure 44:
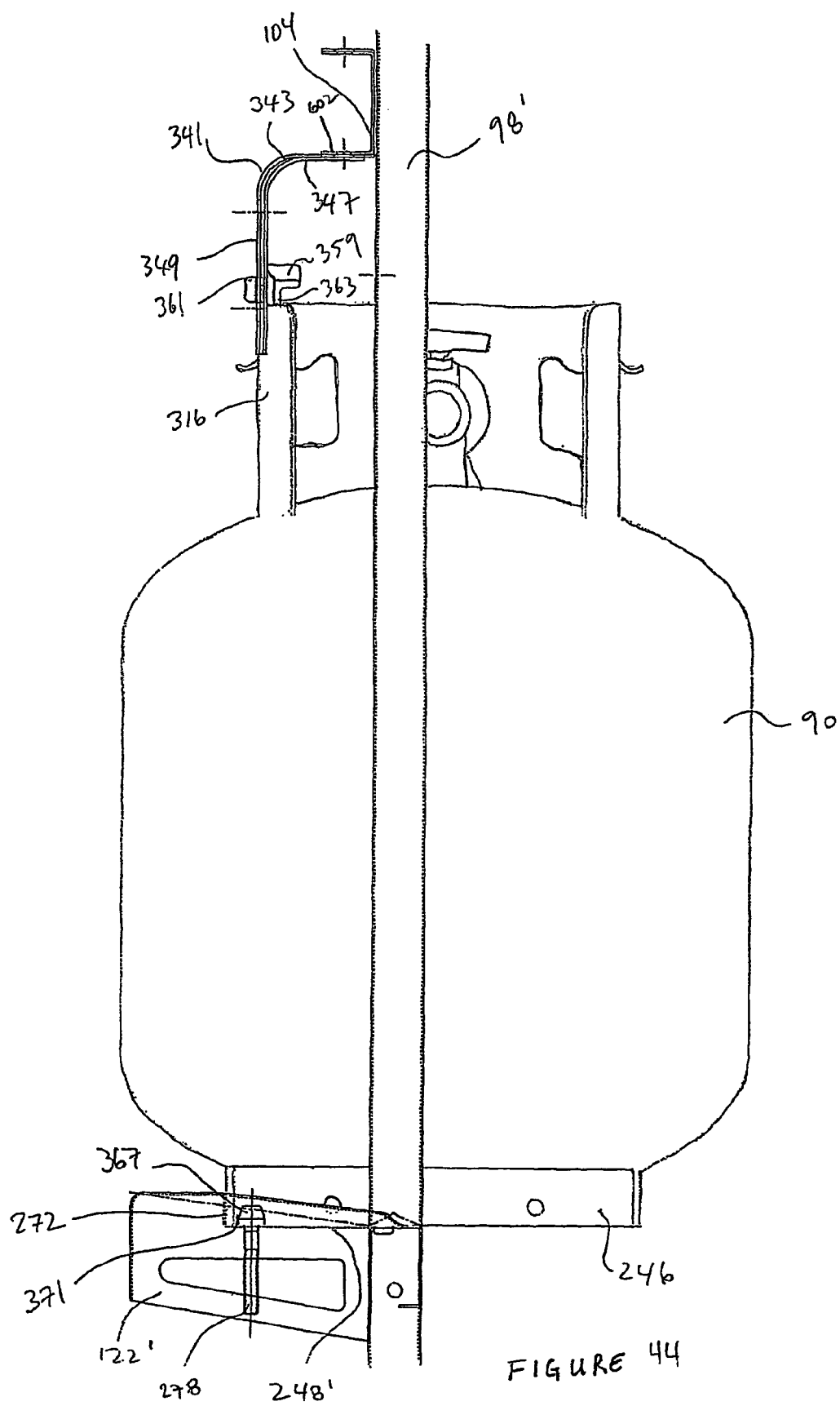
FIG. 44 is a partial side view of the barbeque of FIG. 2 showing an alternative fuel source retainer, and showing the beam connection member outlined and transparent.
Figure 45:
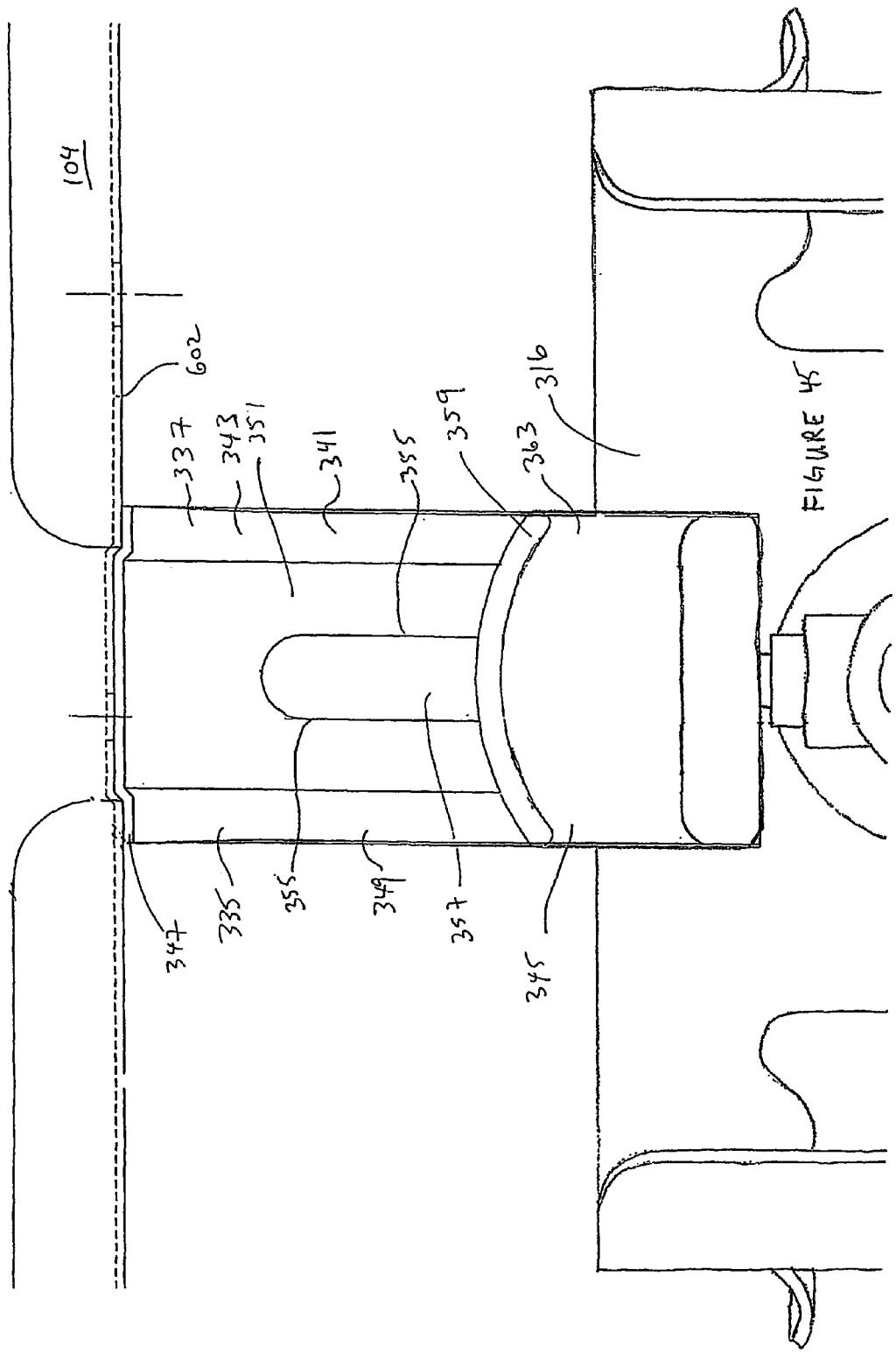
FIG. 45 is a partial end view of the barbeque of FIG. 2 showing the alternative fuel source retainer of FIG. 44.
Figure 46A:
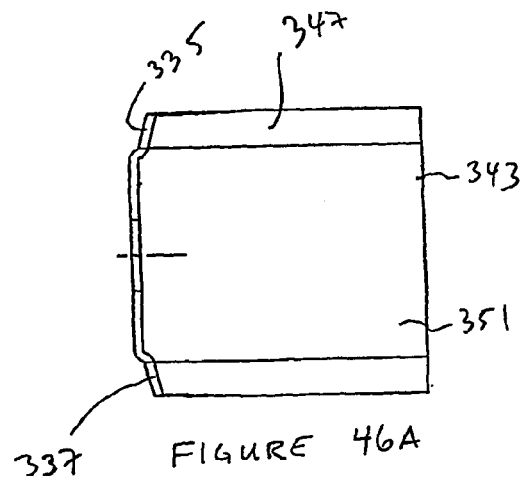
FIG. 46A is an isolated bottom view of a mounting bracket of the alternative fuel source retainer of FIG. 44.
Figure 46B:
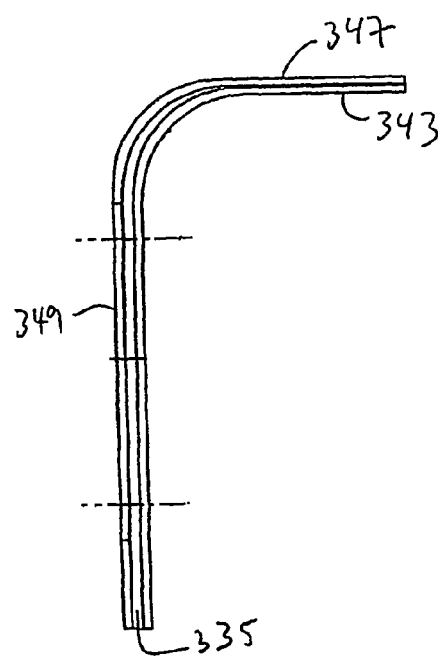
FIG. 46B is a side view of the mounting bracket of FIG. 46A.
Figure 46C:
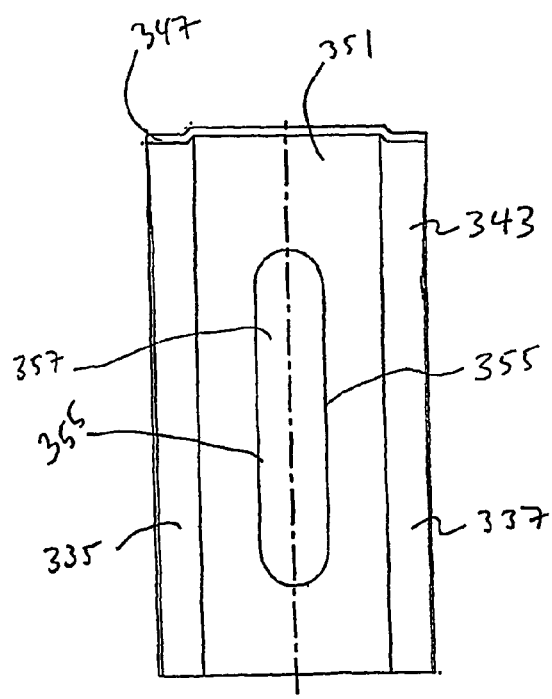
FIG. 46C is an end view of the mounting bracket of FIG. 46A.
Figure 47G:
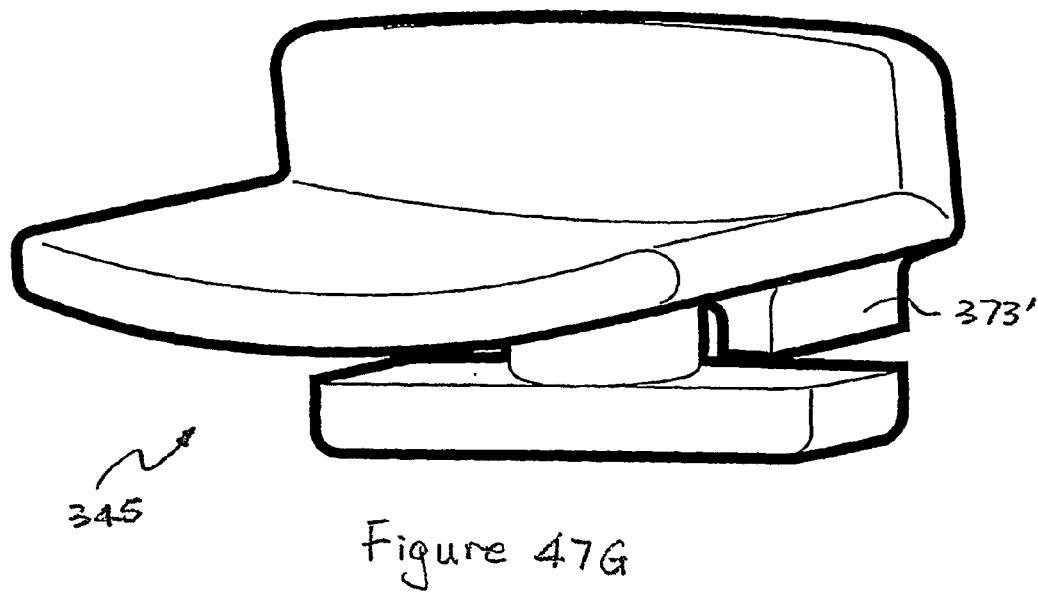
FIG. 47G is a perspective view of the engaging member of FIG. 47A with an elongated shim.
Figure 47H:
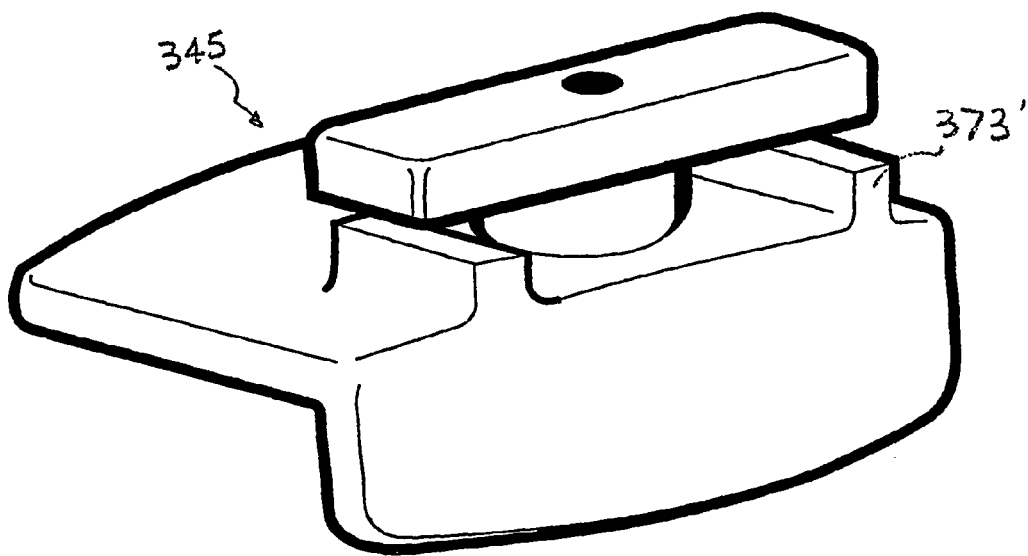
FIG. 47H is another perspective view of the engaging member of FIG. 47G viewed from a direction opposite to the perspective view of FIG. 47G.

As illustrated in FIGS. 44 and 45, retainer 341 includes a mounting member in the nature of mounting bracket 343 and an engaging member 345. Mounting bracket 343 and engaging member 345 abut opposite sides of tank collar 316 to inhibit movement of collar 316 and, by connection, tank 90. Bracket 343 may be secured at an end to another component of barbeque 60 so that movement of bracket 343 is minimized. For example, bracket 343 may be attached to bridging member 104. If bracket 343 is attached to bridging member 104 it may be welded or otherwise connected to a flange 602 thereof. While bracket 343 may be attached to a side of flange 602, it may also be attached to an edge of flange 602.

In an illustrative configuration, bracket 343 may be generally L-shaped, having a first arm 347 for attachment to flange 602 and a second arm 349 which, when installed, projects away from bridging member 104 so that it may abut tank collar 316 when tank 90 is placed in base rim cavity 248'. One or more protrusions in the nature of longitudinal flanges 335 and 337 may be added to or integrally formed in bracket 343. Flanges 335 and 337 are preferably angled from bracket 343 so that they are positioned to contact tank collar 316. This configuration encourages at least two points of contact between bracket 343 and tank collar 316. If flanges 335 and 337 are not included then there might be only one point of contact between bracket 343 and tank collar 316. In addition to, or instead of, flanges 335 and 337, bracket 343 could have a generally arcuate shape (not shown) to conform to arcuate tank collar 316. In any embodiment, bracket 343 is preferably constructed of a substantially rigid material such as a metal, and may additionally be strengthened by forming a longitudinal indent 351 therein.

Referring in particular to FIGS. 46A–47F, engaging member 345 co-operates with bracket 343 to engage and retain tank collar 316 therebetween. Engaging member 345 includes at least one slot 353, and preferably a pair of slots 353, which receive edges 355 of an opening 357 in bracket 343. Opening 357 may be oriented generally co-axially with a longitudinal axis of second arm 349, with edges 355 running generally parallel to the longitudinal axis. Slots 353 are preferably parallel to one another, and may slidingly engage edges 355 to permit movement of engaging member 345 along edges 355 from an engaged position (see FIGS. 44 and 45), where tank collar 316 is retained, to a disengaged position (not shown) where tank collar 316 is not retained. Slots 353 may define in engaging member 345 a head portion 361 and a body portion 363, having a stem 365 therebetween. To reduce play in collar 316, when retained by fuel source retainer 341, body 363 may be curved to correspond to the curvature of collar 316. Head 361 preferably has a shape that is generally similar to, but smaller than, that of opening 357, and slots 353 run generally transverse to a longitudinal axis of head 361. This configuration permits head 361 to be inserted into opening 357. Further insertion may be inhibited by configuring body 363 to be larger than opening 357. As engaging member 345 is rotated about stem 365, with head 361 inserted in opening 357, edges 355 enter slots 353. When engaging member 345 is rotated in this manner by approximately 90 degrees, portions of edges 355 are retained within slots 353, inhibiting movement of engaging member 345 in a direction transverse to opening 357, but permitting sliding movement along a longitudinal axis of opening 357. Sliding movement permits engaging member 345 to be moved from an engaged position to a disengaged position. To facilitate this sliding movement, slots 353 preferably have a width that is at least the same as the combined thickness of mounting bracket 343 and tank collar 316. This permits collar 316 to be retained, having body 363 on one side and mounting bracket 343 on the other. However, this width of slot 353 may permit play between engaging member 345 and mounting bracket 343. Addition of a shim 373, projecting into slot 353 to narrow at least a portion of slot 353, may reduce this play. FIGS. 47G and 47H show engaging member 345 with an elongated shim 373' which may further reduce play in engaging member 345.

Engaging member 345 may additionally be provided with a protrusion in the nature of a tab 359 for grasping and moving engaging member 345 between engaged and disengaged positions. Tab 359 preferably projects from a side of body 363, and may have a generally arcuate shape to facilitate grasping and moving of body 363 by hand.

Engaging member 345 is preferably moulded from a plastic, and may include a hole 375 to encourage cooling during the moulding process.

To retain tank collar 316, tank 90 is first placed onto beam connection member 122', but held with collar 316 tilted away from fuel source retainer 341. Engaging member 345 may then be moved to a disengaged position to permit placement of collar 316 adjacent or abutting mounting bracket 343. Once tank 90 is tilted toward fuel source retainer 341 to locate collar 316 adjacent or abutting mounting bracket 343, engaging member 345 may be slid into an engaged position by grasping tab 359 and moving the engaging member 345 to retain collar 316.

Referring to FIG. 44, movement of tank 90 may be further inhibited by using bolt 278 as a fuel tank retaining bolt to retain tank rim 246 within cavity 248'. To retain tank rim 246, a head 367 of bolt 278 may be located adjacent arcuate wall 272 with substantially the thickness of tank rim 246 therebetween. In this configuration, lateral movement of tank rim 246 when placed between head 367 and arcuate wall 272, may be inhibited by arcuate wall 272 and bolt head 367. If bolt head 367 is tapered, being narrower at its free end 369, a generally V-shaped opening 371 is formed between head 367 and arcuate wall 272. As tank rim 246 is placed between head 367 and arcuate wall 272, it may be guided into position by the narrowing V-shape.

Shelves

Figure 22:
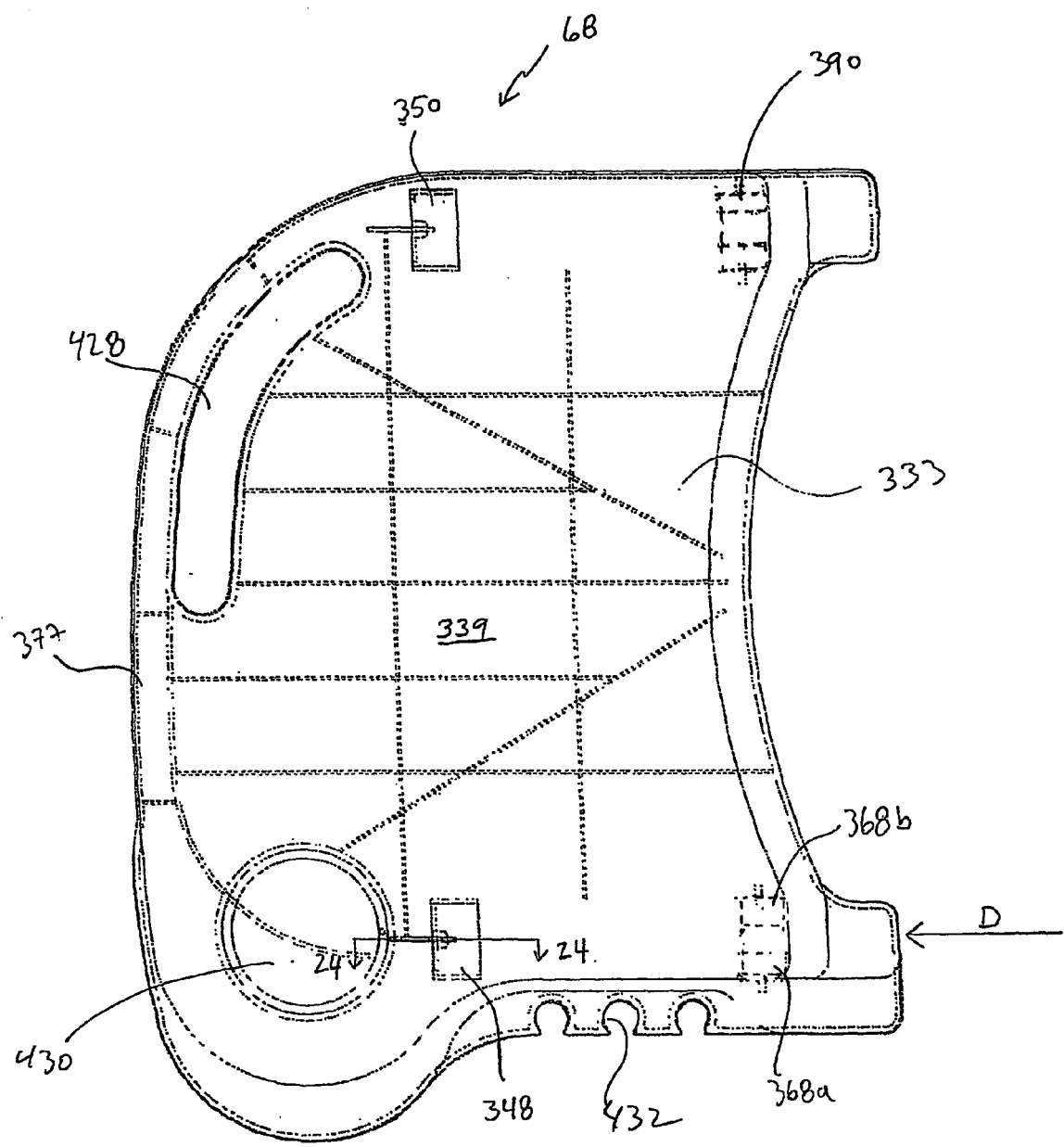
FIG. 22 is a top view of an alternative embodiment of a shelf of the barbeque of FIG. 1, with hidden features shown in phantom.
Figure 23:
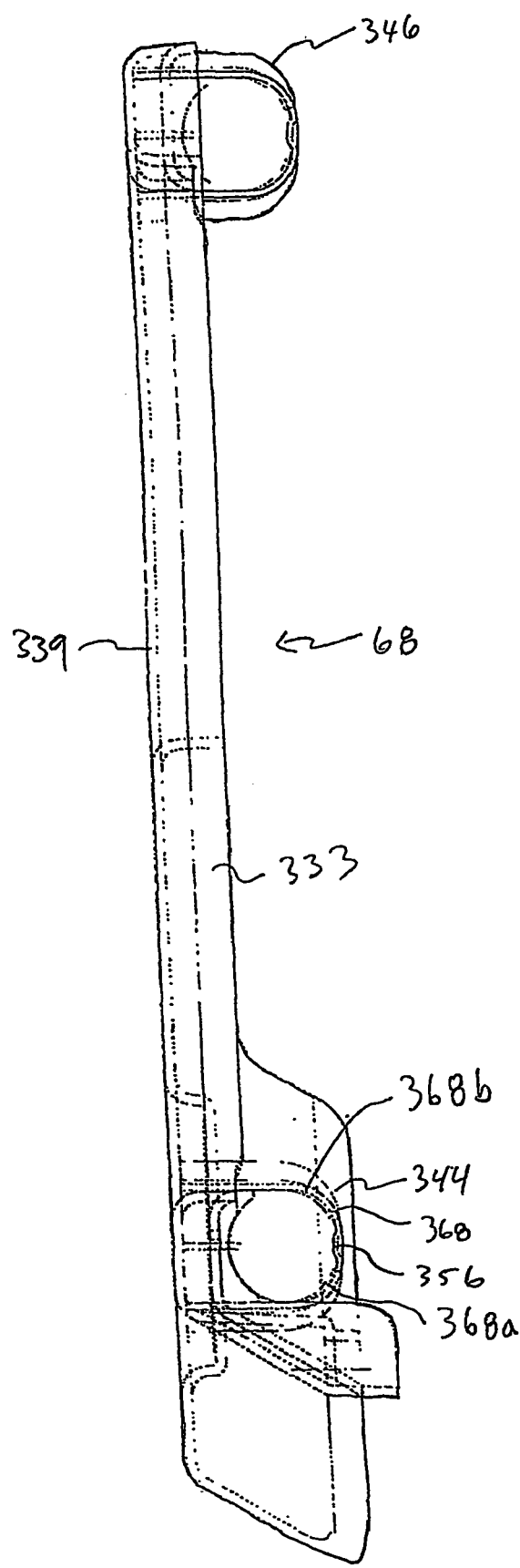
FIG. 23 is an end view of the shelf of FIG. 22, with hidden features shown in phantom.
Figure 24:
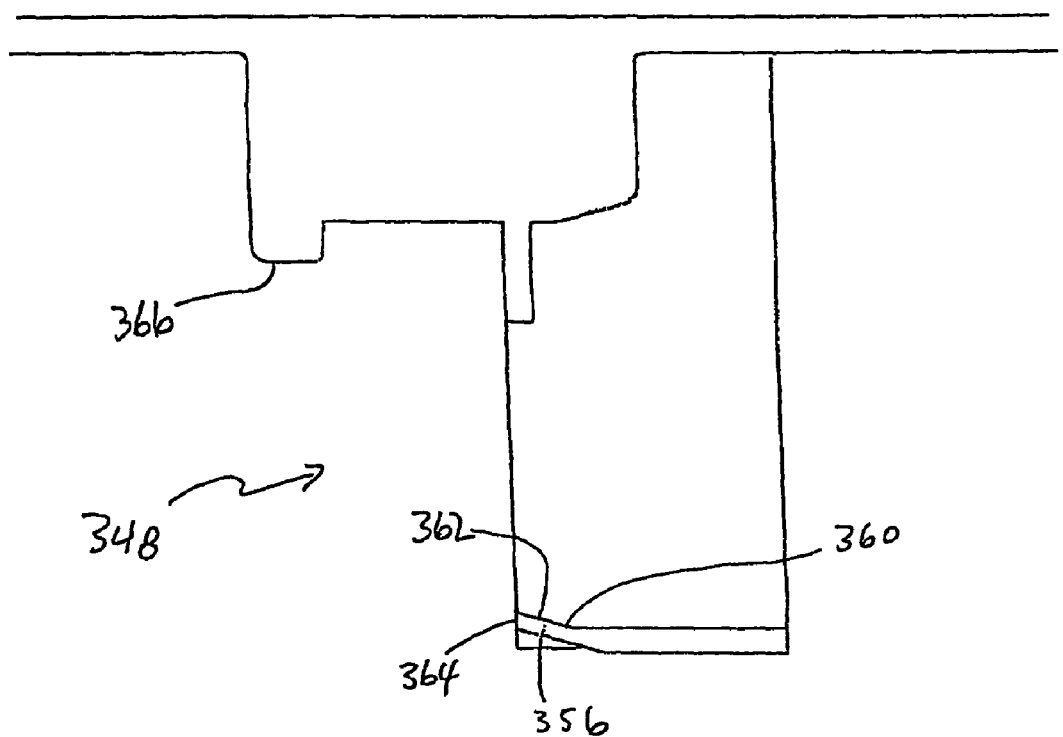
FIG. 24 is a cross-sectional view of a receptacle the shelf of FIG. 23 taken along the line 24—24.

Referring to FIGS. 22, 23 and 24, barbeque 60 may have a shelf 68 or two shelves (second shelf not shown) to provide a surface 339 which may be used for food preparation, or for supporting items such as cooking utensils. Shelves 68 may be configured identically, or configured as a mirror image of one another.

In the illustrative embodiment, the second shelf has a configuration that mirrors shelf 68. The description of shelf 68 that follows therefore substantially applies to the second shelf, as well. Shelf 68 includes a body 333 having a generally planar surface 339. Body 333 may be supported by at least one arm in the nature of a shelf supporting portion 340. Shelf supporting portion 340 may be formed from leg member 98, and a second shelf supporting portion 342 may be formed from leg member 100. Legs 98, 100 are preferably each bent in a similar manner to form a substantially 90 degree angle therein, creating supporting portions 340, 342 of sufficient length to support shelf 68. In the illustrative embodiment, each supporting portion 340, 342 is approximately 15.5 inches long, oriented in substantially the same direction, and generally parallel to the another. Shelf 68 may be secured to each of the supporting portions 340, 342 of respective leg members 98, 100 by shelf retainers 344 and 346 having receptacles 348 and 350, which receptacles each receive a respective free end 352 and 354 of supporting portions 340 and 342. At least free ends 352 and 354 may be frictionally retained within shelf retainers 344 and 346. Each receptacle 348 and 202 may be attached to, or integral with, shelf 68. In the illustrative embodiment, receptacles 348, 350 are integral with shelf 68. Because shelf retainers 344 and 346 are substantially similar to one another, only shelf retainer 344, which attaches supporting portion 340 to shelf 68, will be described.

To attach shelf 68 to supporting portion 340, free end 352 of supporting portion 340 may be inserted into receptacle 348 in a direction of insertion D. Receptacle 348 preferably has a cross-section which, when taken lateral to direction of insertion D, is substantially equal to or larger than the size and shape of the lateral cross-section of supporting portion 340. The relatively larger cross-section permits supporting portion 340 to be inserted into the receptacle 348. If the cross-section of the receptacle 348 and corresponding supporting portion 340 is substantially the same size, then a friction fit may be formed between receptacle 348 and corresponding supporting portion 340. While generally maintaining its lateral cross-sectional shape and size, receptacle 348 may also be elongated to receive a greater portion of free end 352.

Referring additionally to FIG. 24, to secure supporting portion 340 within receptacle 348, receptacle 348 may be provided with a shelf retainer such as a protrusion in the shape of a ramp 356 located within receptacle 348. Ramp 356 generally increases along the direction of insertion D. A corresponding hole or void 358 (shown in FIG. 25) located in supporting portion 340, receives ramp 356 to inhibit movement of shelf 68 relative to supporting portion 340. Ramp 356 is installed as follows. When inserting free end 352 into receptacle 348, free end 352 encounters a base 360 of a sloping side 362 of ramp 356. Ramp 356 is preferably made of a resilient material such as a plastic to permit it to deform before entering void 358. As free end 352 is forced along ramp 356, ramp 356 deforms to permit passage of free end 352 into receptacle 348. When void 358 of supporting portion 340 is positioned to correspond with the location of ramp 356, resilient ramp 356 extends therein. Removal of free end 352 in an opposite direction is inhibited by a sheer side 364 of ramp 356 which abuts an edge of void 358. Further insertion of free end 352 into receptacle 348 is prevented by a stop such as tab 366 attached to shelf 68. Alternatively, receptacle 348 may have a closed end (not shown) for preventing further insertion of free end 352. In either configuration, when assembling shelf 68 and supporting portion 340, the stop provides feedback that the free end 352 is fully inserted and assembly of the two parts is complete.

Shelf retainer 344 may additionally have a conduit 368, which is similar in configuration to receptacle 348 and has an axis which is collinear to the axis of receptacle 348. Conduit 368 differs from receptacle 348 in at least that it does not have a stop, such as tab 366. This permits free end 352 to be inserted through conduit 368 in the general direction of insertion D so that it may be subsequently inserted into receptacle 348. Conduit 368 thus generally guides free end 352 toward receptacle 348. Once free end 352 is received by receptacle 348, conduit 368 inhibits the movement of supporting portion 340 relative to shelf 68. Conduit 368 may be attached to, or be formed integrally with (for example, by moulding), shelf 68.

In the illustrative embodiment, conduit 368 may have a slot which separates conduit 368 into two conduit portions 368*a* and 368*b*. Conduit portions 368*a* and 368*b* are preferably the same size but may be unequal. By using conduit portions 368*a* and 368*b* instead of a contiguous conduit, the conduit portions 368*a* and 368*b* may have greater flexibility at their free ends to facilitate insertion of free end 352 and passage of supporting portion 340.

Figure 55:
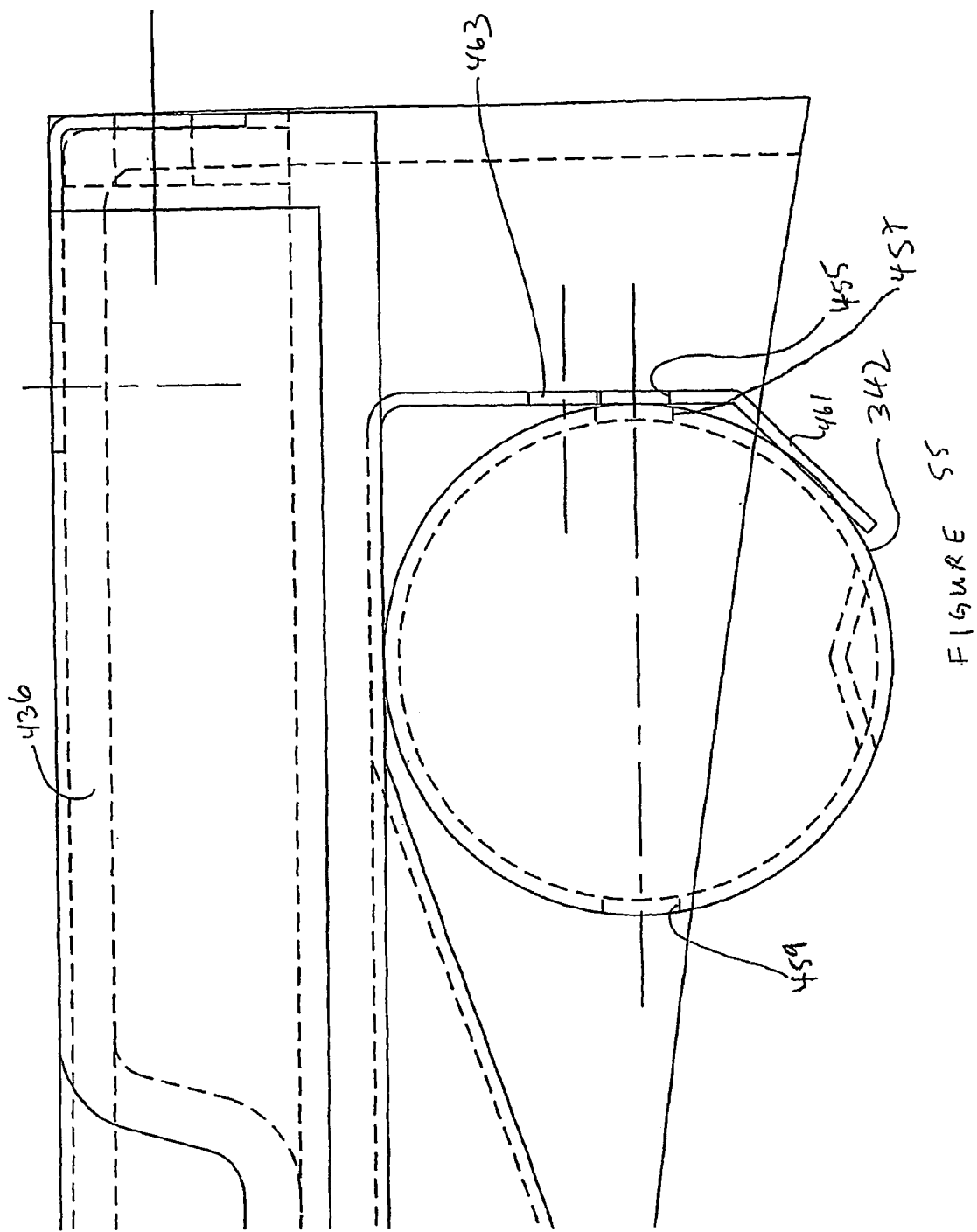
FIG. 55 is a detailed view of the burner tray of FIG. 53A identified by the reference numeral 55 in FIG. 53C
Figure 55A:
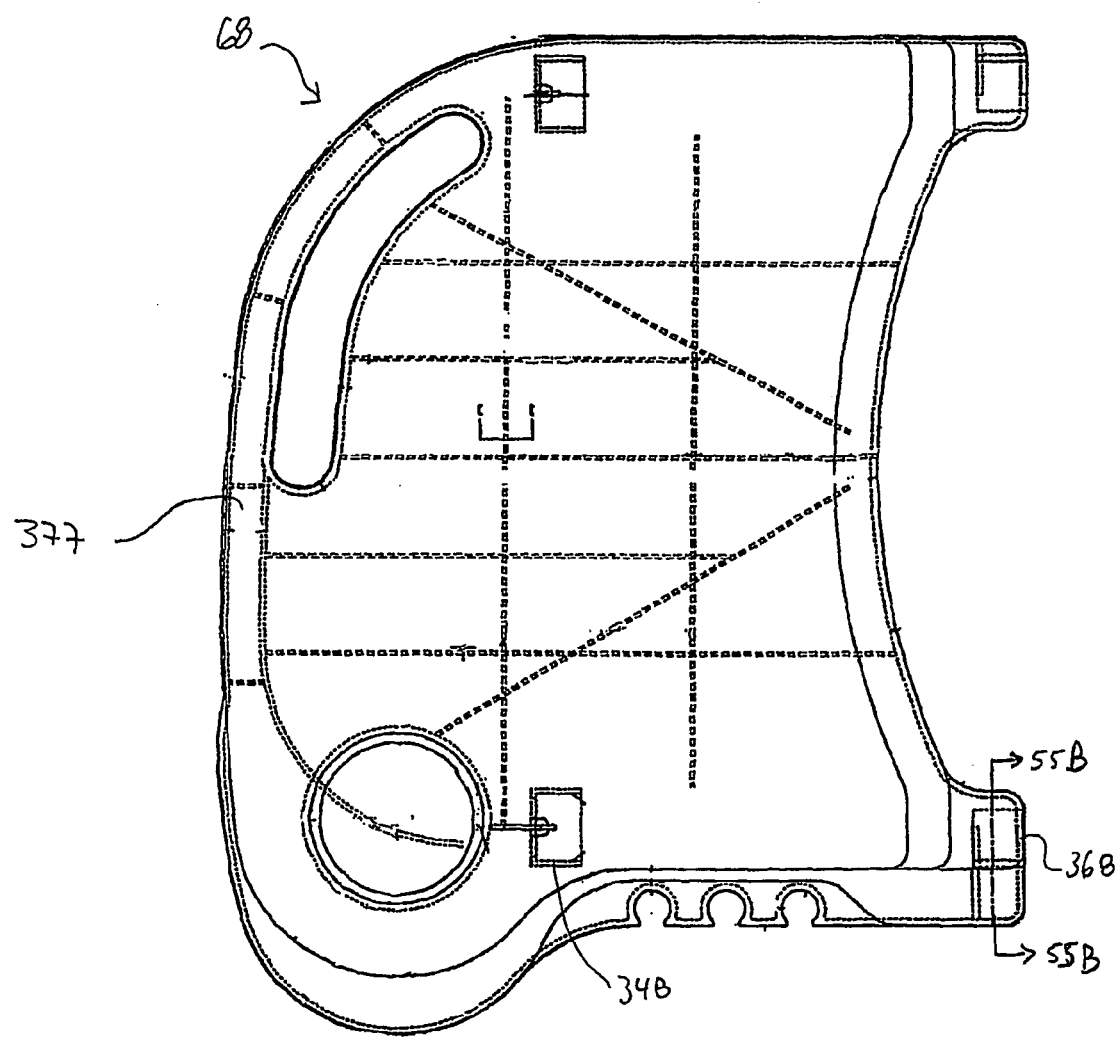
FIG. 55A is a top view of the shelf of FIG. 22 showing an alternative conduit of the shelf in phantom.
Figure 55B:
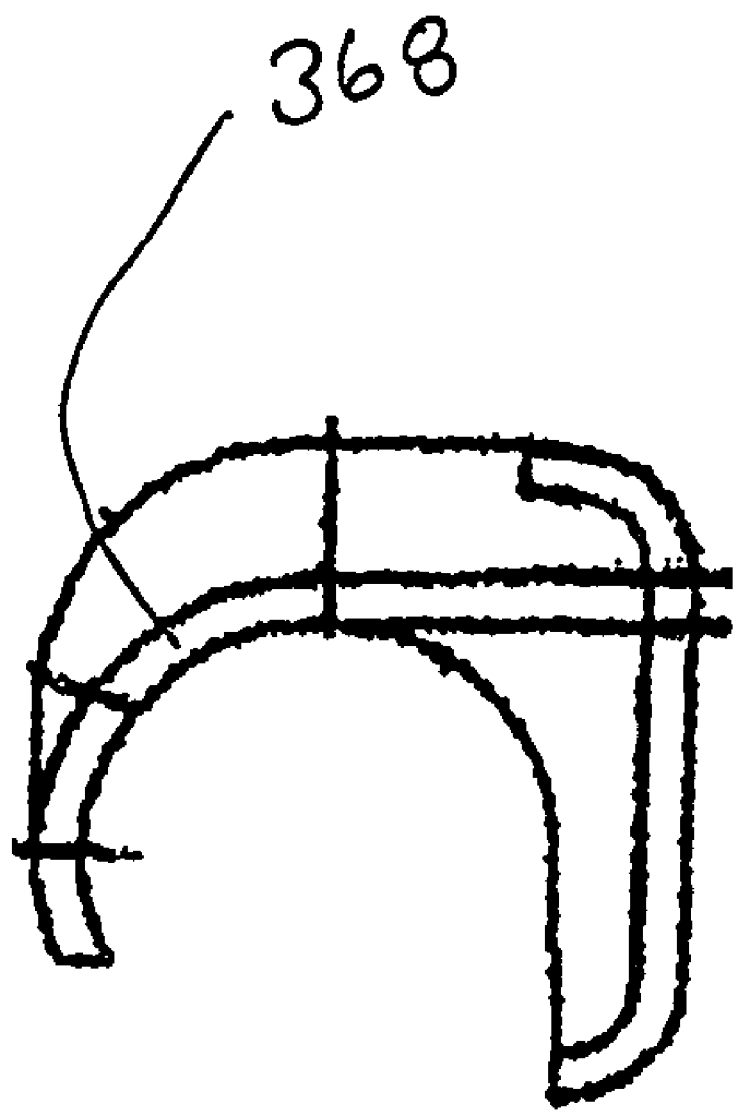
FIG. 55B is an isolated cross-sectional view of the conduit of the shelf of FIG. 55A taken along the line 55B—55B.

Referring to FIGS. 55A and 55B, conduit 368 alternatively may be generally J-shaped. Furthermore, as shown in FIG. 55A, conduit 368 may be displaced from receptacle 348 by a greater distance than is shown in FIG. 22. This increased spacing may provide greater resistance to a release of an attached leg member 98 from conduit 368 when shelf 68 is in an operative position and a generally downward force is applied to a free end 377 of shelf 68. Alternatively, to provide a greater area of contact for retention of supporting portion 340, conduit 368 may be lengthened to meet receptacle 348 to form a single continuous passage (not shown).

Shelf 68 could alternatively be attached to supporting portions 340 and 342 by bolting, welding, or some other attachment means. While shelf supporting portions 340 and 342 are integral with legs 98 and 100 in the illustrative embodiment, they may alternatively be made of a separate member or members attached to support member 62.

In the illustrative embodiment, shelf 68 is made of moulded plastic but could be made from some other material such as steel. If shelf 68 is made of plastic, then strengthening ribs 220 may be added to increase the rigidity of shelf 68, potentially reducing the amount of material required to mould shelf 68.

Referring to FIGS. 25 and 26, in an alternative embodiment of shelf 68, labelled 68', either a portion or the entirety of shelf surface 339' may be manually removable. This removable portion, or member, 370 may be removed to be used as a tray, to be cleaned, for example in a dishwasher, or it may be put to some other use appropriate for such a member having a substantially flat an rigid surface. A suitable weather resistant material such as plastic, porcelain, steel, ceramic, wood or a combination thereof may be used to construct removable member 370. Removable member 370 may also have a ridge (not shown) about the perimeter of its surface 339', and a drain (not shown) to permit removal of a liquid such as rain water by gravity.

To accommodate removable member 370, shelf 68' may have a generally U-shaped shelf frame 372. An inner perimeter 374 of shelf frame 372 substantially conforms to a portion of the periphery of removable member to preferably form a friction fit therebetween. Removable member 370 may alternatively or additionally be fastened to frame 372 with a fastener (not shown), or held in place by gravity. While frame 372 may define a closed opening, for example a four-sided opening, the partial removal of a portion of frame 372, such as a fourth side of a rectangular frame, permits an edge 376 of removable member 370 to be grasped for removal and installation. Movement of removable member 370 in the direction of the open end of U-shaped frame 372 may be inhibited by tabs 378 and 380 projecting generally toward each other from respective free ends 382 and 384 of arms 386 and 388 of U-shaped frame 372. Tabs 378 and 380 further encourage a friction fit between frame 372 and removable member 370. In an alternative embodiment (not shown), the periphery of removable member 370 may be bevelled or provided with a rib (not shown) for engagement with a corresponding feature of the frame 372 to permit a snap fit therebetween. Other variations to the configuration of the interface between frame 372 and removable member 370 may be defined to retain member 370 within frame 372 while permitting unassisted installation and removal of member 370 therein. Removable member 370 may be any generally planar shape suitable for use as a tray as long as frame 372 is configured to receive that particular shape.

When installed, removable member 370 is supported by receptacles 348 and 350, and corresponding conduits 368' and 390'. Receptacle 350' and conduit 368' may be configured as described for the illustrative embodiment, or they may be formed together as a continuous channel member 392' for slidingly receiving and frictionally retaining supporting portion 340 of leg member 98. A second continuous channel member 394', having a substantially similar configuration as channel member 392', is provided for retaining supporting portion 342 of leg member 100. Because channel members 392' and 394' are similar, a description of channel member 394' will be provided. This description applies equally to channel member 392' with necessary modifications for receiving supporting portion 340.

Channel member 394' may be attached to arm 388 of U-shaped shelf frame 372 along a closed side 396 of the channel member 394'. Channel member 394' may alternatively be integrally formed with shelf frame 372. A ramp 356', which has a configuration that is similar to ramp 356 and which operates in a similar manner, is provided along an interior surface 398 of conduit 390' for entering void 358 to retain supporting portion 342. The procedure required to manually attach shelf frame 372 to supporting portions 340 and 342 is similar to that described above for attaching shelf 68 to supporting portions 340 and 342. In encouraging proper alignment and installation of frame 372, channel member 392' performs a similar function to that of conduits 368, 390 and receptacles 348, 350. Bends 400 and 402 of U-shaped frame 372 may be used as stops to prevent further insertion of supporting portions 340, 342 instead of a tab such as tab 366, or closing an end of channel member 392'.

Channel member 392' may have a generally circular or rectangular cross-section for frictionally receiving and retaining supporting portions having a variety of cross-sections. For example, if channel member 392' has a generally rectangular cross-section, it may receive and retain supporting members having cross-sections of a similar size and shape. An advantage of some cross-sectional shapes is that they may accommodate supporting members having different cross-sections as long as there is sufficient frictional contact between the supporting members and the inner surface of the channel. A channel having a generally square cross-section, for example, may also receive and retain a supporting member having a circular cross-section with a diameter that is substantially the same magnitude as the length of the sides of the channel's square cross-section. In this configuration, the circular supporting member contacts the inner surface of the conduit along lines defining the mid-points of the channel's sides, and is retained by the channel. In combination with the various configurations of channel and support member, ramp 356' serves to further retain the support member within the channel.

Figure 27:
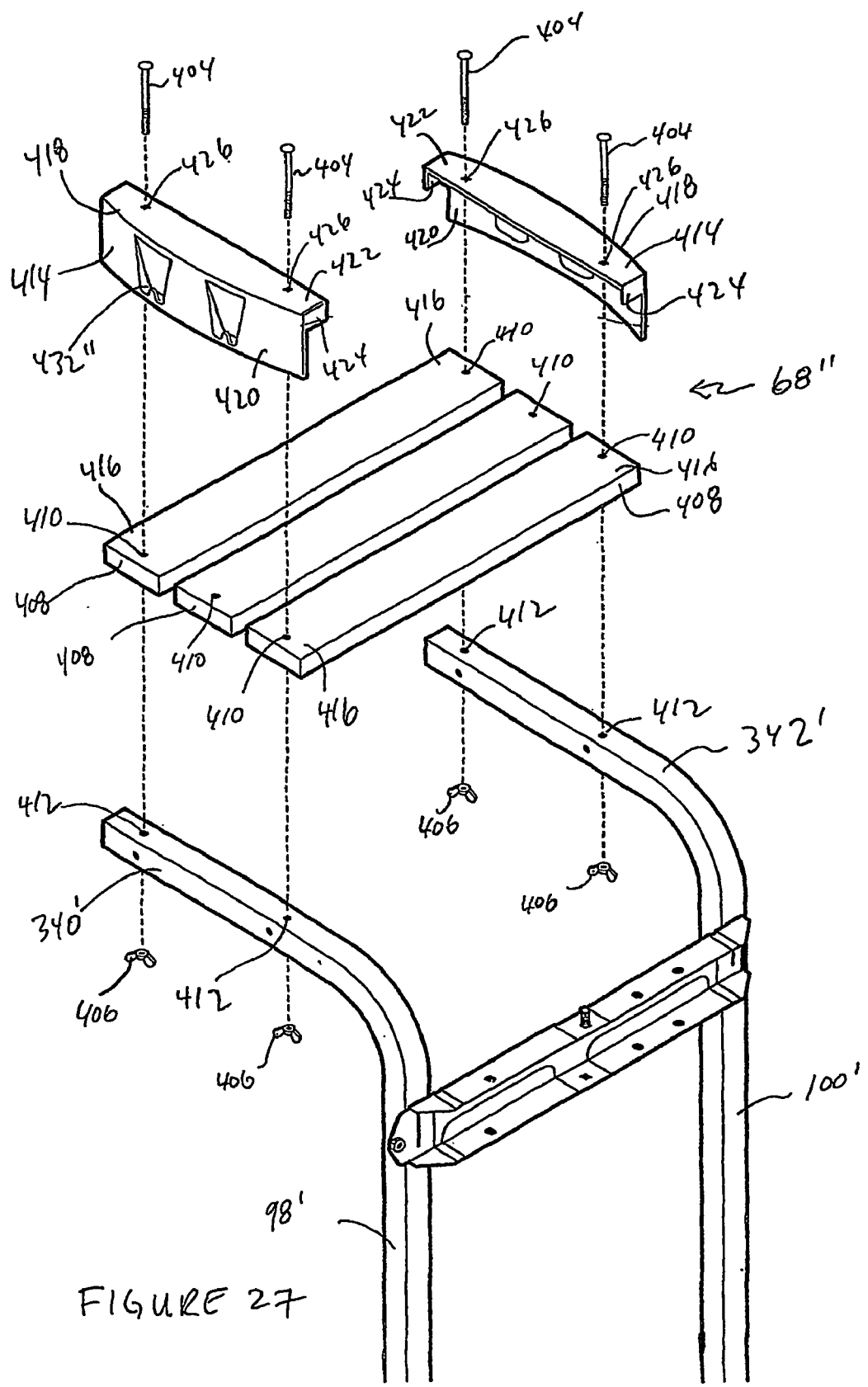
FIG. 27 is an exploded partial perspective view of a shelf and support of the barbeque of FIG. 2.

Referring to FIG. 27, in a yet further alternative embodiment of shelf 68, labelled 68", a fastener in the nature of at least two bolts 404 and wing nuts 406 may be used to attach shelf 68" to supporting portions 340 and 342. Shelf 68" has at least one slat 408 for spanning the distance between supporting portions 340 and 342. Slats 408 may be bolted directly to supporting portions 340 and 342 using bolts 404 inserted through slat holes 410 and through holes 412 in supporting portions 340 and 342, which bolts 404 are secured by wing nuts 406. Slats 408 may also be retained by a shelf bracket 414 at each slat end 416. Each shelf bracket 414 is substantially identical to the other. The description of one therefore applies to the other.

Shelf bracket 414 retains and secures slat ends 416 to a supporting portion, such as supporting portion 340. The shelf bracket 414 has a narrow body with a longitudinal bend 418 therein to form to arms 420 and 422 extending from bend 418 substantially normal to one another. One of the arms, such as arm 420, may have protrusions, such as flanges 424 to inhibit lateral movement of slat ends 416. Flanges 424 may be generally normal to both arms 420 and 422, and may be located at least at either end of bracket 414. Movement of slats 408 may also be inhibited by additional protrusions (not shown) extending from either arm 420 or arm 422, which additional protrusions are located to abut slats 408 that are not adjacent the ends of bracket 414. These additional protrusions may also be used to evenly space slats 408 from one another. The other arm, arm 422, has at least one, and preferably two holes 426, there through for receiving a bolt 404.

Shelf 68" may be installed by placing slats 408 on support portions 340' and 342' so that each end 416 of each slat 408 is supported by one of support portions 340' and 342'. Each bracket 414 is placed over the slat ends 416 with slat ends 416 located between flanges 424. Holes 426 of arm 422 are then aligned with both the hole 410 in the adjacent slat 408 and hole 412 in the associated support portion 340 or 198. Bolt 404 may then be inserted through the three holes 426, 410 and 412 and manually secured with a wing nut 406. Once bracket 414 is installed, lateral movement of slat ends 416 is inhibited by protrusions such as flanges 424.

Lifting or otherwise moving barbeque 60 may be facilitated by providing a handle hole 428 (shown in FIG. 22) defined in shelf 68 for gripping shelf 68. Shelf 68 may also have an indentation defining a cup holder 430. Similarly, at least one utensil rebate 432 for holding utensils (not shown), may be provided along an edge of shelf 68. A handle hole (not shown), cup holder (not shown) and utensil rebate (labelled 432' on shelf 68' and 432" on shelf 68") may also be added to shelves 68' or 68".

Side Burner

Figure 28:
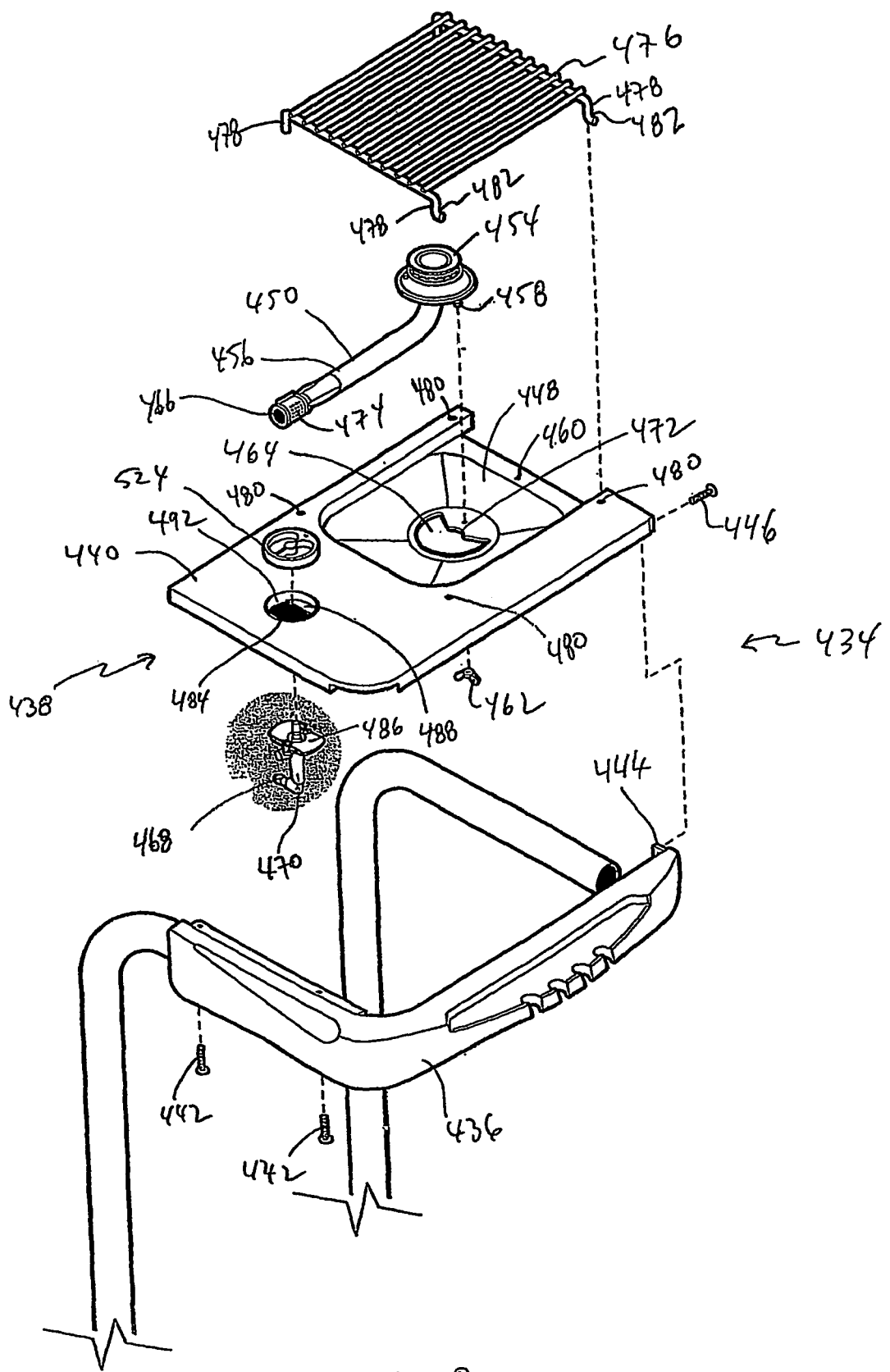
FIG. 28 is an exploded perspective view of a side burner of the barbeque of FIG. 1.

Referring to FIG. 28, one or both of the shelves may be substituted with a side burner 434. Side burner 434 may have a burner frame member 436 which has substantially the same configuration as shelf frame 372, and a burner apparatus 438 which may include a burner tray 440 having a similar configuration to removable member 370. Burner tray 440 may also be installed and retained within burner frame 436 in a manner similar to that described for removable member 370. Similarly, burner frame 436 may be installed and retained in substantially the same manner as described for shelf frame 372.

In the illustrative embodiment, burner frame member 436 is generally L-shaped having just one arm 386' which has a configuration similar to arm 386 of shelf frame 372. In place of a second arm, burner frame 436 has a flange 444 for receiving a fastener such as bolt 446 for fastening burner frame 436 to burner tray 440.

Figure 54:
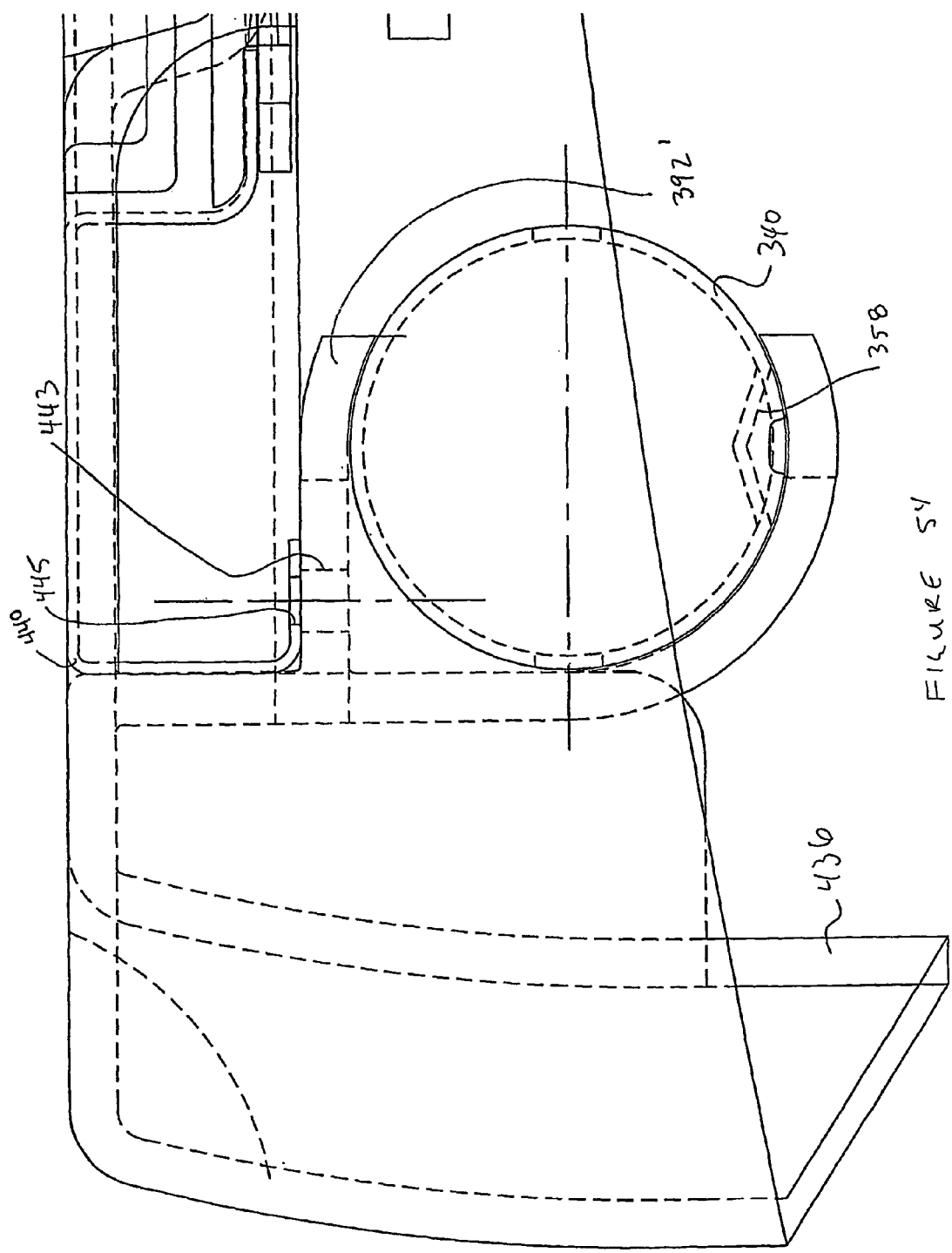
FIG. 54 is a detailed view of the burner tray of FIG. 53A identified by the reference numeral 54 in FIG. 53C.

Referring additionally to FIG. 54, to inhibit movement of burner tray 440 relative to burner frame 436, at least one fastener in the nature a bolt 442 may be inserted through a hole such as hole 443 in channel member 392' and into an aligned threaded bore 445 in burner tray 440. As described, flange 444 may also be used for fastening burner frame 436 to burner tray 440. The combined burner tray 440 and frame 436 may then be attached to shelf supporting portion 340 in the manner described above, namely by inserting shelf supporting portion 340 into channel member 392'. While a head 447 of bolt 442 may protrude into the channel defined by channel member 392', it is preferably located or otherwise configured to clear supporting portion 340. Referring to FIG. 53A, a projection in the nature of a stop 449 may be located adjacent channel member 392' to inhibit further insertion of supporting portion 340 therein.

Figure 29:
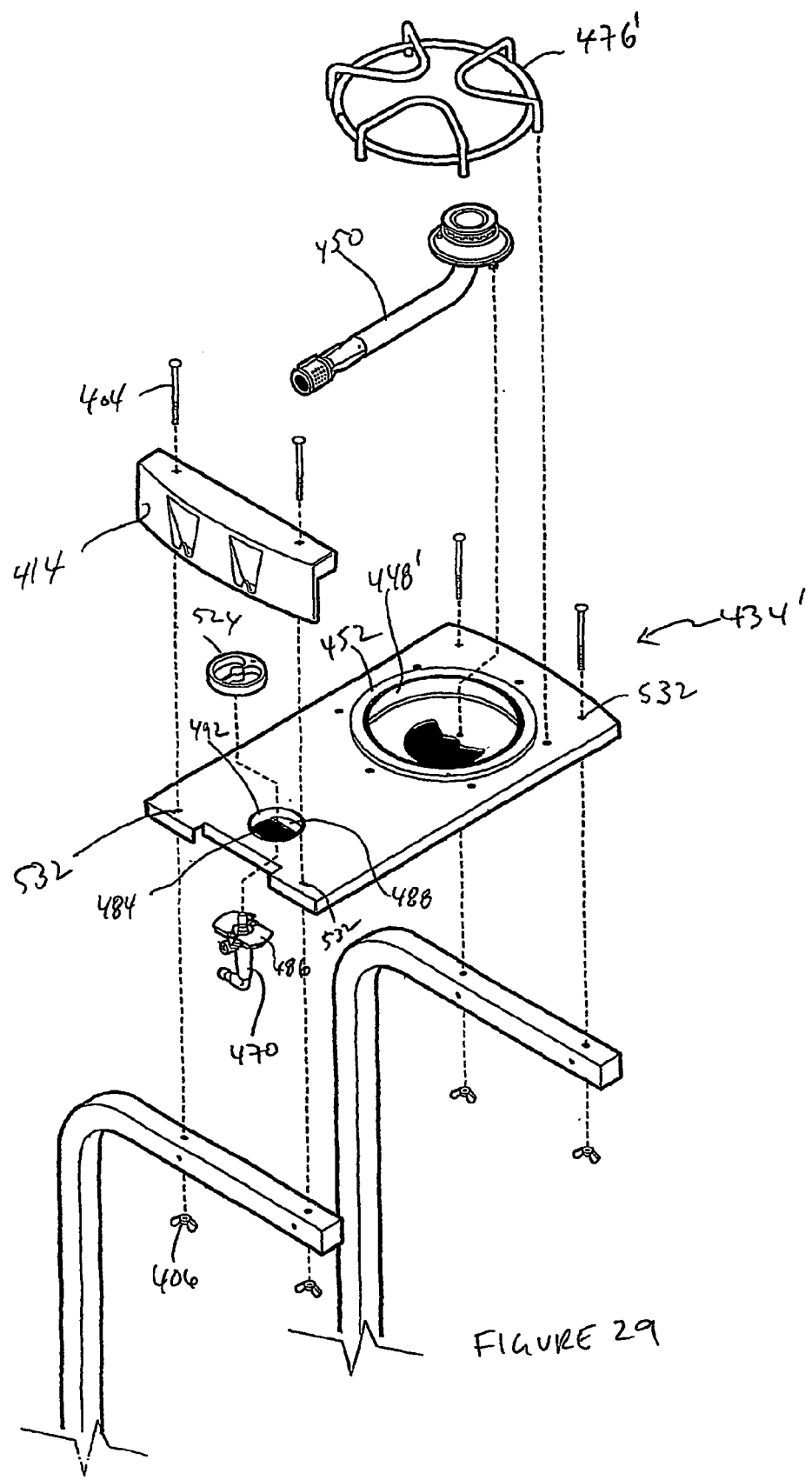
FIG. 29 is an exploded perspective view of a side burner of the barbeque of FIG. 2.

Burner tray 440 has a burner pan 448 in which a standard burner, such as burner 450 may reside. For example, a burner manufactured by Lincoln Brass Works of Waynesboro, Tenn. may be used. Burner pan 448 may be formed from the same piece of material as burner tray 440 to form one integral piece. For example, burner pan 448 and tray 440 may be stamped from a single piece of sheet metal. As shown in FIG. 29, a variation of burner pan 448, labelled 448', is illustrated. Burner pan 448' may be manufactured as a separate part that rests within a burner pan opening (not shown) and that is supported by a peripheral flange 452.

Referring to FIGS. 53A–55, burner tray 440, may additionally include an abutting member in the nature of a burner tray bracket 453 for attaching tray 440 to a leg member, such as cylindrical leg member 100 (attachment to leg shelf supporting portion 342 is shown in FIG. 55). Burner tray bracket 453 abuts shelf supporting portion 342 to inhibit movement of burner tray 440 relative to supporting portion 342.

Burner tray bracket 453 may be integrally formed with burner tray 440, and may project from tray 440 to abut shelf supporting portion 342. While bracket 453 may tangentially abut cylindrical shelf supporting portion 342, if a shelf supporting portion having a non-rounded profile is employed, such as shelf supporting portion 342', then bracket 453 may abut the supporting portion substantially flush, along a corresponding surface thereof (not shown).

A fastener, including a nut and bolt, or a bolt having a serrated neck (not shown) which is similar to bolt 612", may be used to connect burner tray bracket 453 to shelf supporting portion 342. The bolt may be inserted through a hole 455 in bracket 453, and into a corresponding pair of aligned holes 457 and 459, located in shelf supporting portion 342. Once inserted, the bolt may be secured by a manually tightenable retainer, such as a wing nut. If a shelf supporting portion having a non-rounded profile is employed, such as shelf supporting portion 342', then the fastener may be inserted through a hole 463 in bracket 453, and a corresponding hole in supporting portion 342', which is located to align with hole 463 (not shown).

Burner tray bracket 453 may include an additional member, in the nature of an angled flange 461, which may be configured to tangentially abut shelf supporting portion 342 to further inhibit movement of burner tray 436. Even if bracket 453 is not attached to supporting portion 342 using a fastener, flange 461 serves to inhibit removal of tray 448 from supporting portion 342 in at least a direction generally transverse to the plane of tray 448.

Referring again to FIG. 28, burner 450 has a burner element 454 that is attached to a fuel conduit 456. Burner element 454 may have a fastener in the nature of a threaded post 458 attached thereto. Threaded post 458 may be inserted through a post hole 460 in burner pan 448 and manually secured using a wing nut 462 or some other manually tightenable fastener. Fuel conduit 456 extends through a conduit hole 464 in pan 448 and may receive in its input end 466 a fuel output conduit 468 of a burner valve 470. Conduit hole 464 is preferably smaller than element 454 to inhibit passage of element 454 therethrough. Proper placement of conduit 456 within conduit hole 464 may be facilitated both by threaded post 458 and post hole 460, and by an arcuate rebate 472 at an edge of conduit hole 464 which may abut conduit 456. Arcuate rebate 472 preferably conforms to a portion of fuel conduit 456 and may have substantially the same radius of conduit 456. An optional spider guard 474 may be included at input end 466 to inhibit entry of spiders and other insects therein.

A burner grill 476 may be located adjacent burner element 454, and is preferably located to receive heat from burner 450 when burner 450 is operational. Burner grill 476 may have a protrusion such as a leg 478 to inhibit movement of burner grill 476 relative to burner tray 440. In the illustrative embodiment, burner grill 476 has four legs 478 which may be received by four leg holes 480 in burner tray 440. When legs 478 are inserted into leg holes 480, lateral movement of burner grill 476 is limited. At least one, and preferably two, of burner legs 478 have a curved end 482. Curved ends 482 are first inserted into respective leg holes 480 with burner grill 476 oriented substantially perpendicular to burner tray 440. Once curved ends 482 are inserted, burner grill 476 may be rotated about curved ends 482, which reside in leg holes 480, to a position generally parallel to burner tray 440. The remaining legs 478 may then be inserted into leg holes 480 in the manner described above. In this configuration movement of burner grill relative to burner tray 440 may be further inhibited.

Burner valve 470 may be inserted into valve opening 484 from a side of burner tray opposite to that of burner pan 448, and may be attached to burner tray 440 with a valve mounting apparatus, such as valve clip 486. Valve opening 484 may be generally circular and may have one or more engaging members in the nature of fins 488 which extend into valve opening 484. Fins 488 are preferably identical in shape and are located in a plane parallel to that of burner tray 440. Each fin 488 extends from an opposite side of valve opening 484 towards the other, and has a curved portion 490 which abuts and is connected to a corresponding portion of a wall 492 of valve opening 484. A free end 494 of each fin 488 is substantially linear and defines a generally straight edge 496. Free ends 494 may be parallel to each other.

Referring additionally to FIGS. 30A–30C, 58, 59 and 73A–73E, valve clip 486 includes a body 487 which may have a planar portion having curved ends 500 and generally linear parallel sides 502 which together define a shape which is substantially the same as valve clip opening 484 defined in part by fins 488. Planar portion 498 also has an opening, such as valve stem opening 504, passing therethrough. Valve stem opening 504 permits insertion of a valve stem 506 of burner valve 470.

Valve clip 486 may be attached to a standard burner valve, such as burner valve 470, which is manufactured by Lincoln Brass Works of Waynesboro, Tenn. Because valve clip 486 is preferably attached to burner valve 470 by a manufacturer, it may be fastened to burner valve 470 using screws 508 inserted through bores 509 of valve clip 486. Manually tightenable fasteners may also be used (not shown). The bores may additionally pass through posts 510 of valve clip 486. Posts 510 are preferably of a length to ensure that valve stem projects through valve stem opening 504 a sufficient distance to engage a valve knob 512 once burner valve 470 is attached to burner tray 440. Valve knob 512 facilitates turning of valve post 506 about its axis to control fuel flow through burner valve 470.

Figure 30A:
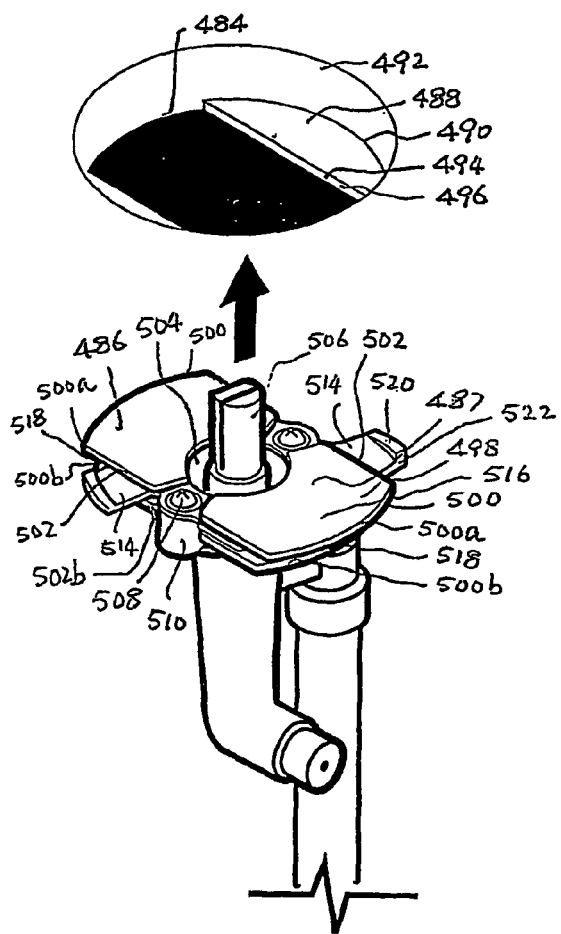
FIG. 30A is an exploded perspective view of a valve clip and valve opening of the barbeque of FIG. 1.
Figure 30B:
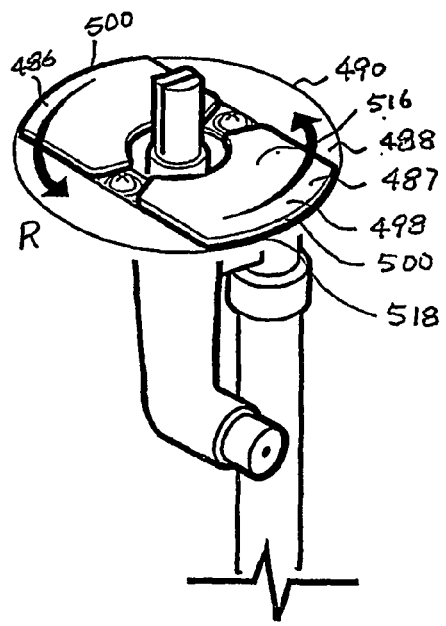
FIG. 30B is a perspective view of the valve clip and valve opening of FIG. 30A showing the valve clip inserted into the valve opening.
Figure 30C:
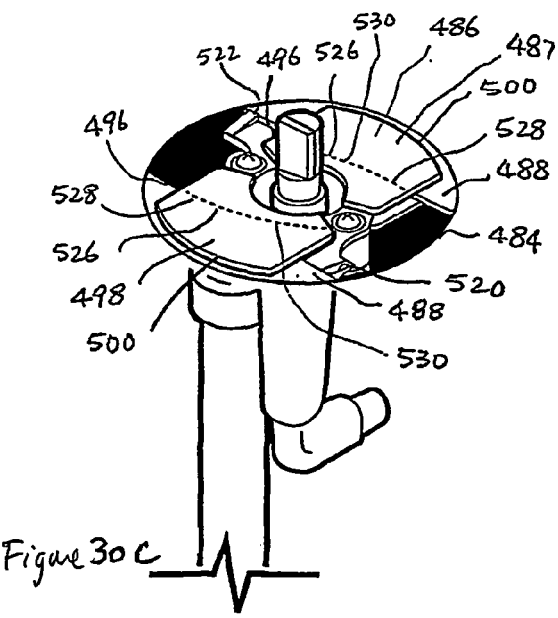
FIG. 30C is a perspective view of the valve clip and valve opening of FIG. 30A showing the valve clip retained within the valve opening.

Once burner valve 470 is attached to valve clip 486, the planar portion 498 of valve clip 486 may be inserted through valve clip opening 484, as shown progressively in FIGS. 30A and 30B. Further insertion of valve clip 486 may be inhibited by at least one, and preferably two, tabs 514, wherein each tab 514 extends from a linear edge 502 of valve clip 486. Tabs 514 may lie in a plane parallel to, but displaced from, the plane of the surface 516 planar member 498. Once valve clip 486 is inserted into valve clip opening 484 to the point that it is inhibited from further insertion by tabs 514, it may be rotated about its central axis by preferably 90 degrees (as shown in FIG. 30C). This rotation aligns the curved portions 490 of fins 488 and the curved ends 500 of valve clip 486 to inhibit removal of valve clip 486 from valve clip opening 484.

Valve clip 486 may be additionally configured to retain fins 488. Curved ends 500 of planar member 498 may be provided with a slot 518 which bisects the curved ends 500 to form two parallel wings or curved ends 500*a* and 500*b* for retaining fins 488. In this configuration, planar member 498 is installed by insertion into valve clip opening 496, as shown in FIGS. 30A and 30B. Tabs 514 extend from each linear side 502*b* to permit only curved end 500*a* to pass through valve clip opening 484. In this position, slots 518 are aligned with straight edges 496 of fins 488. Rotation of valve clip 486 by 90 degrees causes edges 496 of fins 488 to enter respective slots 518. Once fins 488 enter slots 518, curved ends 500*a* and 500*b* retain respective fins 488 therebetween (as shown in FIG. 30C). If one or both slots 518 is narrowed to substantially the same thickness as fins 488, fins 488 may be frictionally retained therein.

To secure valve clip 486 within valve clip opening 484, tabs 514, which are preferably is coplanar with linear sides 502*b*, may be provided with a retainer such as a protrusion in the shape of a ramp 520. Ramp 520 generally increases opposite to the direction of rotation R and projects into the plane of slot 518. When valve clip 486 is inserted into valve clip opening 484, ramps 520 abut fins 488. As valve clip 486 is forced marginally further into valve clip opening 484, tabs 514 deflect away from the plane of slot 518. This deflection permits rotation of valve clip 486 and fins 488 may enter slot 518. Once valve clip 486 is rotated 90 degrees, tabs 514, and ramps 520, enter valve clip opening 484 to clear fins 488 and return to their original position, as is best shown in FIG. 30C. Further rotation of valve clip 486 is inhibited by sheer side 522 of each ramp 520 which abuts straight edge 496 of fin 488. This inhibited rotation provides feedback that valve clip 486 is installed. Tabs 514 are preferably made of a resilient material such as a plastic to enable them to resiliently return to their initial positions after being deflected during installation. The thickness of each tab 514 may be reduced to facilitate temporary deflection of tab 514 from its initial position. Once burner valve 470 is installed, burner knob 524 may be attached to valve stem 506, and conduit 456 may be oriented to cause valve output 468 to be inserted into conduit input end 466. Valve clip 486 may be removed by manually deflecting tabs 514, for example by finger pressure, and concurrently rotating valve clip 486 in a direction opposite to direction D.

To permit a snug fit between valve clip 486 and fins 488, an apex 526 (shown in phantom in FIG. 30C) of slot 518 which is co-planar with slot 518, has a curved portion 528 and a tangent portion 530. When valve clip 486 is fully installed, as described above, tangent portion 530 abuts fin straight edge 496 to inhibit transverse movement of valve 470 relative to fin straight edge 496. Tangent portion 530 originates at a linear edge 502 of valve clip 486 and merges with curved portion 528 which gradually curves toward valve stem opening 504 and terminates at an opposite linear edge 502 of valve clip 486 adjacent tab 514. When valve clip 486 is installed, curved portion 528 first meets fin straight edge 496, and as valve clip 486 is rotated, curved portion 528 guides tangent portion 530 into alignment with fin linear edge 496. Once tangent portion 530 and linear edge 496 are aligned, ramped tabs 514 clear fin 488 and snap into place. To further facilitate alignment of fin 488 with slot 518, curved edges 500*a* and 500*b* may be rounded in a direction generally normal to the plane of the curves of curved edges 500*a* and 500*b*.

While the illustrative embodiment describes fins 488 having straight edges 496, edges defining other shapes may also be used as long as the configuration of valve clip 486 is adjusted accordingly.

Valve clip 486 may be made of any preferably weather resistant material such as a plastic or a metal. In the illustrative embodiment, valve clip 486 is injection moulded as a single piece using a plastic that enables tabs 514 to be resilient.

Referring to FIG. 29, a side burner 434' is configured for use with shelf bracket 414. The configuration and installation of valve clip 486 and the other elements of side burner 434 is substantially the same as described above for side burner 434, and are not described further.

One shelf bracket 414 may be used to secure burner tray 440. Shelf bracket 414 is installed in substantially the same manner as described above in the context of shelves 68" and 70". Bolts 404 are inserted into bracket holes 426, through holes 532 in burner tray 440, and then through holes 412 in support portion 340' or 342' (side burner 434' may also be attached to support portions 340 and 342 in a similar manner). Bolts 404 may then be secured with wing nuts 406. Burner tray 440 may be attached to the remaining support portion 340' or 198' with at least one bolt 404 inserted through holes 532 in tray 440 and holes 406 in the support member. Bolts 404 may then be secured with wing nuts 406.

Panel

Figure 31:
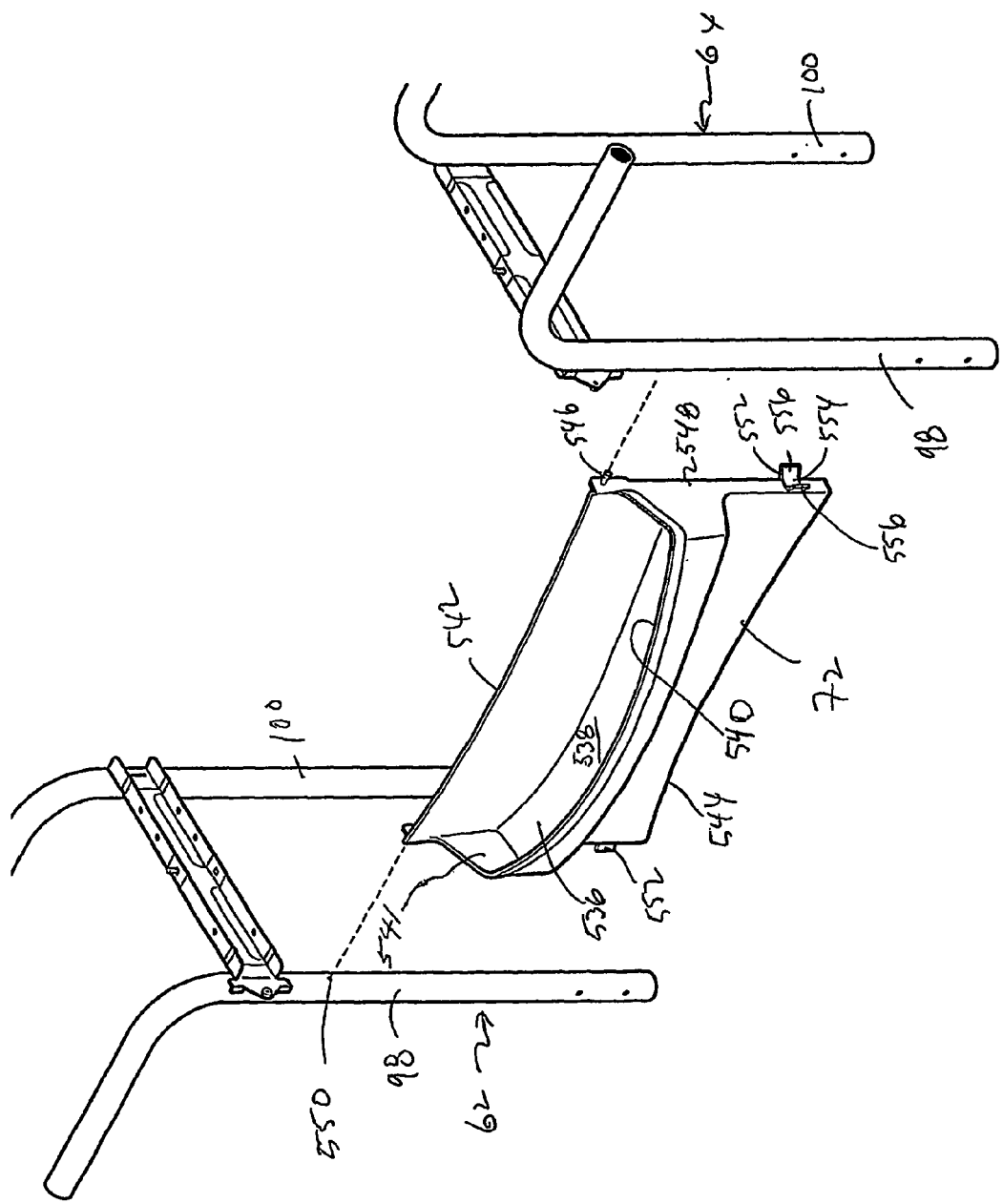
FIG. 31 is an exploded perspective view of the panel and leg members of the barbeque of FIG. 1.

Referring to FIG. 31, a cross piece, in the nature of a generally rectangular panel 72, is mounted between support members 62 and 64, and is preferably mounted between a leg member 98 or 100 of support member 62 and a leg member 98 or 100 of support member 64. The generally planar panel 72 substantially conforms to the shape of opening 534 (see FIG. 32) which is generally defined by the support members 62 and 64, cross beam 66 and console 86. Panel 72 may also be curved or bowed, or some other shape that substantially spans opening 534, and may have a flange or other protrusion (not shown) to at least partially obscure an adjacent leg member 98 or 100. Panel 72 is preferably mounted to be substantially parallel to cross beam 66.

A pocket 536 may be integrally formed in panel 72. Pocket 536 may be used for holding condiments or utensils (not shown). Pocket 536 may have a bottom 538 which projects from panel 72. Sides of pocket 536 may be defined by a portion of panel 72 and at least one wall 540 which traverses bottom 538. Additional walls such as wall 541 may be added to define a four-sided pocket 538 having a bottom 538. In the illustrative embodiment, pocket 536 extends along substantially the entire length of panel 72. To better retain items stored within pocket 536, at least one of pocket sides 540, 541 may be angled inwards, for example by three degrees relative to pocket bottom 538. Furthermore, placement of items into pocket 536 may be facilitated by tilting pocket 536 away from the plane of panel 72, for example by 12 degrees. The location of pocket 536 may be varied relative to longitudinal edges 542 and 544 of panel 72. For example, as shown in FIG. 2, pocket 536' may be located adjacent longitudinal edge 544' of an alternative panel 72', described below.

Panel 72 has at least one mounting member, and preferably two retaining or mounting members, in the nature of mounting posts or pins 546, each of which extends from an edge thereof. Each pin 546 extends from an edge 548 of panel 72 that is substantially perpendicular to the longitudinal axis of pocket 536. Pins 546 may be coaxial and are oriented for insertion into corresponding mounting holes 550 located in support members 62 and 64, and each pin 546 may rest, and may additionally be frictionally retained, therein. Mounting holes 550 are preferably located in one of legs 98 or 100 of each support member 62, 64. In the illustrative embodiment, each pin 546 projects from an edge of panel 72, adjacent a corner thereof, and each corresponding mounting hole 550 is located adjacent a respective bridging member 102 and 104. Pins 546 may also lie in substantially the same plane as panel 72.

Panel 72 may have an additional mounting member in the nature of a retaining clip 552. Retaining clip 552 may be located along edge 548 of panel 72, and located at a distance, for example ten inches, from pin 546. Additional retaining clips 552 may be added. Each retaining clip 552 is preferably located to correspond to the location of a leg member 98, 100 when the panel 72 is installed. Retaining clip 552 may be made of a resilient material, and may have a shape that conforms to a portion, and preferably at least a semicircular half, of the lateral perimeter of a corresponding leg member 98, 100. To conform to leg member 98 or 100, clips 552 may have a semicircular surface 554 corresponding to the shape of leg member 98, 100. Retaining clip 552 is attached to, or integrally formed with, panel 72 at a midpoint of the curved retaining clip 552. In this configuration, each clip 552 receives and retains a portion of a respective leg member 98 or 100, and limits movement of panel 72 in a direction substantially transverse to the plane of panel 72. If a leg member, such as leg 98', having a non-round cross-section is used, then retaining clip 552 may be configured accordingly.

In an alternative embodiment, each clip 552 may be attached to panel 72 at an end 556 of clip 552 instead of a mid-section (not shown). In this embodiment, surface 554 of clip 552 is preferably configured to conform to a greater portion of the circumference of leg member 98, 100 than in the embodiment described above. This permits a snap fit to be formed after resilient clip 552 is attached to a leg member 98, 100. For example, as clip 552 is attached, a resilient free end of clip 552 must be forced away from panel 72 to accommodate the wider diameter of leg member 98, 100. Once leg member 98, 100 is placed within clip 552 the free end resiliently returns to its initial position to engage a portion of leg member 98, 100 substantially corresponding to the shape of clip surface 554. The illustrative embodiment of clip 552 may be likewise configured to form a snap fit with leg member 98, 100 by extending free ends 556 to encompass a greater portion of the lateral perimeter of legs 98, 100.

In a preferred configuration, the mounting members, including pins 546 and clips 552, substantially secure panel 72 between support members 62 and 64 to provide at least some resistance to movement of support members 62 and 64 relative to one another. Pins 546 and clips 552 are both preferably integrally formed with panel 72, which may be made of a plastic or metal.

Figure 57:
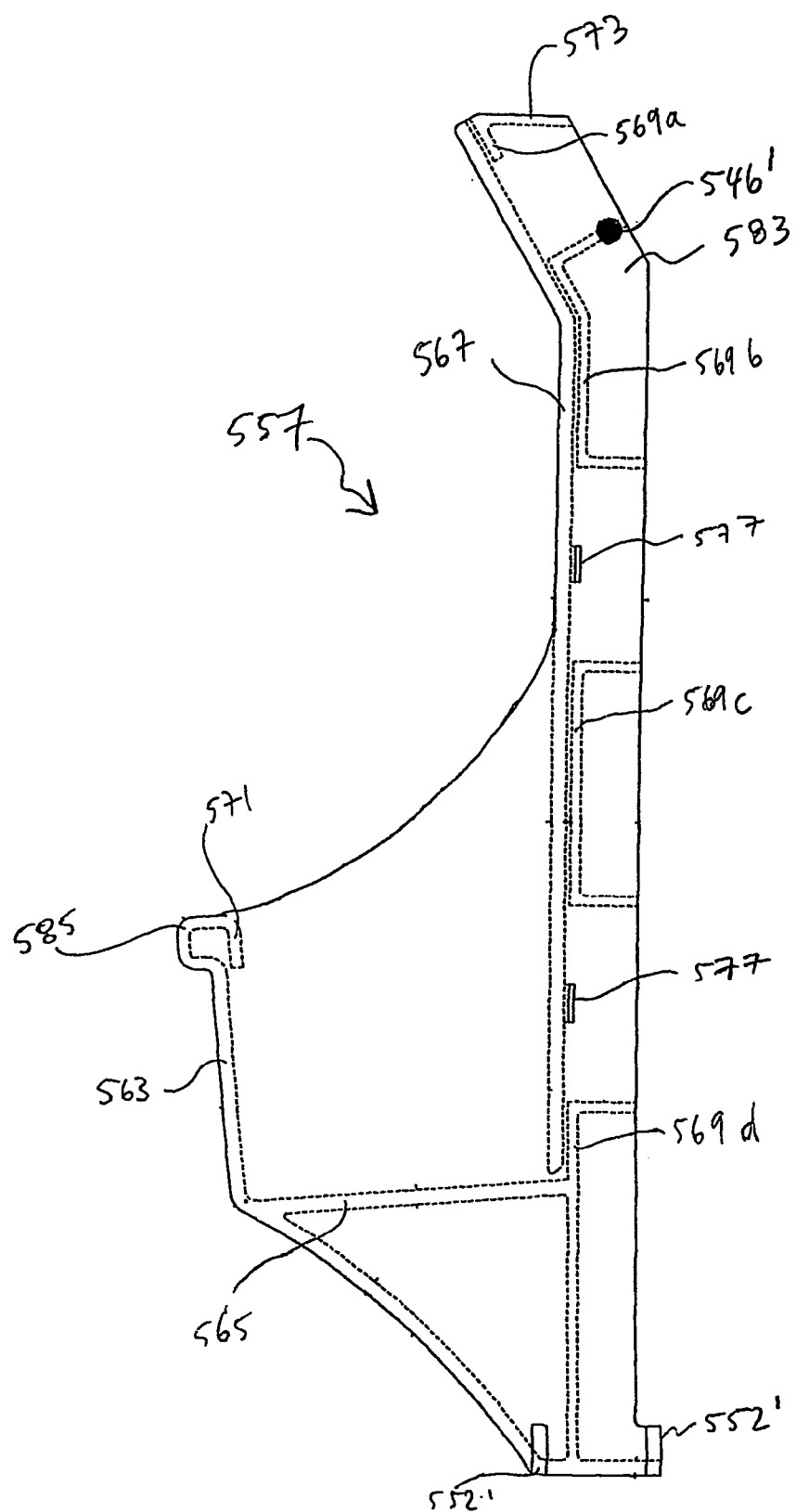
FIG. 57 is an end view of a bracket of the panel FIG. 56, with hidden features shown in phantom.
Figure 58:
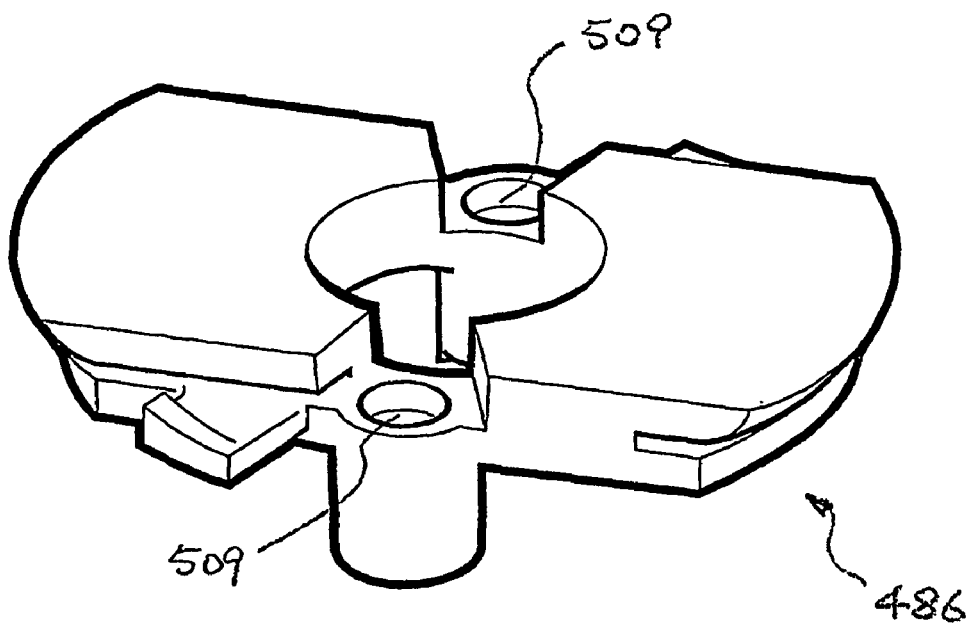
FIG. 58 is an isolated perspective view of the valve clip of FIG. 29.
Figure 59:
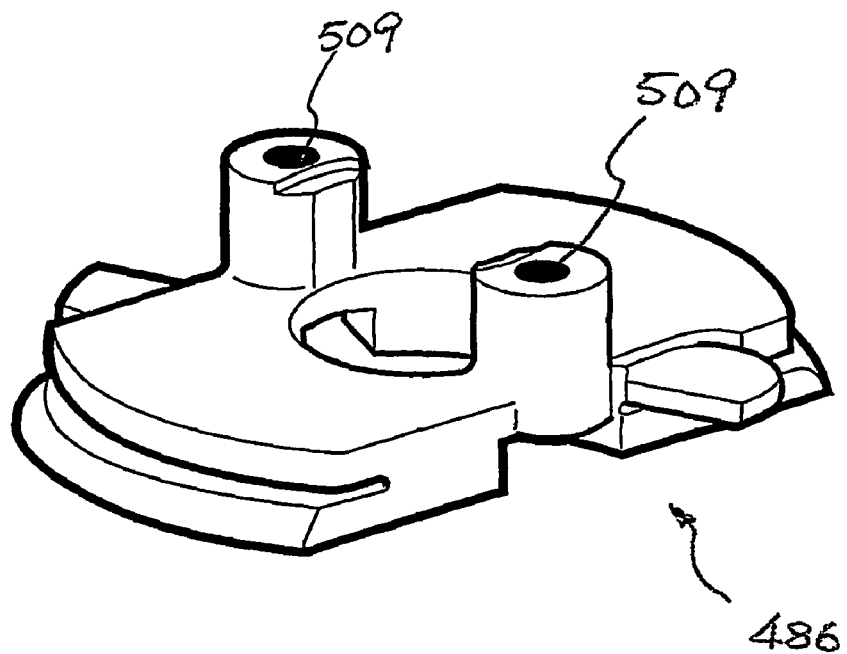
FIG. 59 is another perspective view of the valve clip of FIG. 58 viewed from a direction opposite to the perspective view of FIG. 58.
Figure 63:
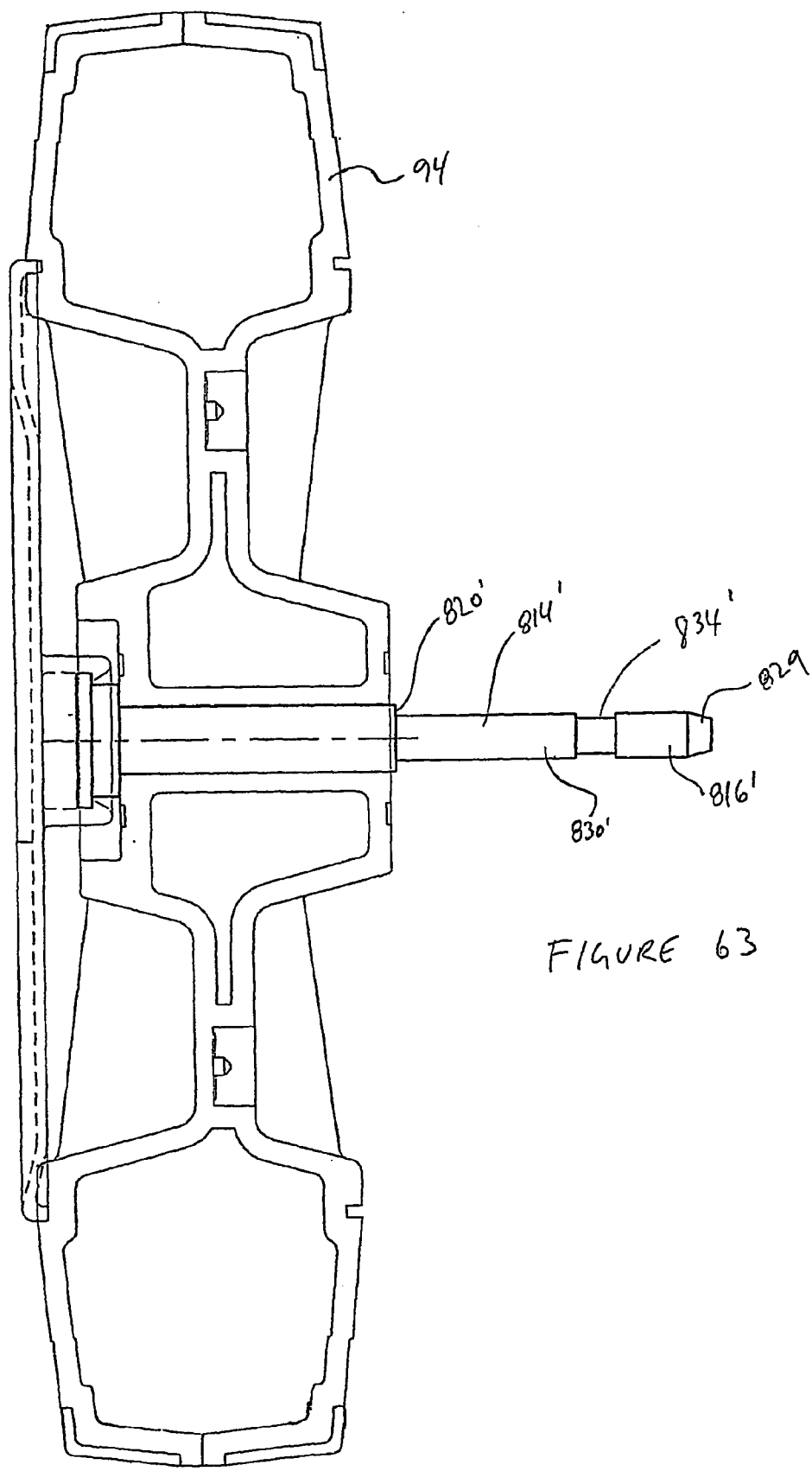
FIG. 63 is an isolated cross-sectional side view of a wheel and alternative axle pin of the barbeque of FIG. 1, with hidden features shown in phantom.

Referring to FIGS. 56 and 57, alternative panel 72' has a general configuration similar to that of panel 72. Panel 72' differs in that it may be disassembled permitting it to fit within a smaller volume than in its assembled state for storage or shipping. Panel 72' may be generally planar, and may be mounted to legs 98'', between support members 62' and 64', using panel mounting brackets 557. Brackets 557 may be identical, but are preferably mirror images of one another. Accordingly, the description of one bracket 557 applies to the other.

Bracket 557 has a mounting pin 546', which is configured and operates in a similar manner as described for mounting pin 546, for mounting the bracket 557 to leg member 98'. Similarly, a clip 552', which is configured and operates in a similar manner as described for clip 552, may be added to one or both brackets 557 for mounting the bracket 557 to leg member 98'. Bracket 557 may be injection moulded or otherwise formed from a plastic, or moulded from a metal.

Panel 72' may additionally have an integral pocket 536'. Pocket 536' may be defined on one side by panel 72', and on another side by a generally opposed side 540', which is joined to panel 72' by a bottom 538'. Bottom 538' may located at substantially right angles to both panel 72' and side 540' to form a three-sided pocket. Alternatively, bottom 538' may be angled to a greater or lesser degree relative to panel 72' and/or side 540' to change the orientation of an item contained within pocket 536', as described above for pocket 536. A single sheet, for example, of a metal such as steel, may be used to form panel 72' and pocket 536' by making two folds therein to define panel 72', bottom 538' and wall 540', respectively. The sheet thus formed may have a generally right angled J-shaped cross-section which cross-section terminates at opposed edges 559 and 561 which generally trace the J-shaped cross-section. Alternatively, panel 72' may be formed to have a rounded generally J- or U-shaped cross-section, or some other shape defining an integral pocket (not shown), by bending a single sheet of metal or other appropriate material, accordingly. In the present embodiment, bottom 538' may include one or more holes (not shown) to permit drainage of a liquid such as rain water from pocket 536'.

Pocket 536' may additionally be bounded by panel mounting brackets 557 adjacent respective opposed edges 559 and 561 to define a five-sided pocket including wall 540', panel 72', mounting brackets 557, and bottom 538'. Brackets 557 may be removably attached to wall 540', panel 72', and bottom 538' along edges thereof. Each bracket 557 abuts respective edges 559 or 561 to removably retain wall 540', panel 72', and bottom 538' therebetween. Brackets 557 may additionally include one or more flanges for abutting a surface of one or more of wall 540', panel 72', and bottom 538', to inhibit movement thereof. The flanges of bracket 557 preferably abut the respective wall 540', panel 72', or bottom 538', adjacent edge 559 (or 561, as the case may be).

In the illustrative embodiment, bracket 557 has a flange 563 for abutting a surface of wall 540' adjacent edge 559. Similarly, flanges 565 and 567 abut panel 72' and bottom 538', respectively. To further inhibit movement of wall 540', panel 72', and bottom 538', additional flanges may be added to bracket 557 to abut an opposite surface of wall 540', panel

72', and bottom 538'. For example, discontinuous flange 569, having flange portions 569a, 569b, 569c, and 569d, may abut a surface of panel 72' opposite to flange 567. In this configuration, a portion of edge 559 may rest between discontinuous flange 569 and flange 567. Similarly, a flange 571 may abut a surface of wall 540' opposite to flange 563. Flanges 571 and 563 may be joined at ends thereof by a rounded or angled flange 585, which may reinforce the connected flanges 571 and 563.

One or more of the flanges may also have reinforcements. For example, flange 569a may have a reinforcing flange 573. Reinforcements may also increase the overall rigidity of bracket 557.

Panel 72' may additionally include one or more holes 575 located adjacent one or both edges 559 and 561 for receiving one or more respective tabs 577 which project from a flange of bracket 557, such as flange 567. When tab 577 is inserted through hole 575, tab 575 inhibits movement of panel 72' in a direction generally transverse to the projection of tab 577 to inhibit removal of bracket 557 from panel 72'.

Panel 72' may additionally have an angle 579 formed therein for directing a free end 581 of panel 72' to locate adjacent console 86 when barbeque 60 is fully assembled. Angle 579 may traverse panel 72' between edges 559 and 561 causing free end 581 to be displaced from the plane of panel 72'. Free end 581 is preferably displaced to the same side of panel 72' that side 540' is located. Brackets 557 may be likewise angled to accommodate angle 579. For example, bracket 557 may have angle 583 formed therein.

To assemble brackets 557 with the integral wall 540', panel 72', and bottom 538', portions of edge 559 are inserted between opposed flanges 567 and 569, and between flanges 571 and 563, with a portion of bottom 538' abutting flange 565. Edge 561 is similarly inserted between the flanges of the remaining bracket 557. As each edge 559 and 561 is inserted, tab 577 enters and locates within hole 575. Tab 577 may additionally be ramped, to permit edge 559 (or 561) to be guided over tab 577 before tab enters hole 575. Ramped tab 577 preferably has a generally right-angle triangle cross-section so that a snap fit may be formed as ramped tab 577 enters hole 575. Brackets 557, including panel 72' held therebetween, may then be attached to support members 62' and 64' in a manner similar to that described for panel 72.

In an alternative embodiment (not shown), brackets 557 may have a slot or groove instead of, or in addition to, flanges, for receiving edge 559 or 561.

Casting

Referring to FIGS. 1, 3 and 4, grill housing 74 has opposed castings 76 and 78 that may enclose burner 80, grill plates 82, warming rack 84 and angled bars 88. In operation, the castings 76 and 78 may be aligned vertically so that casting 76 is located generally above casting 78. In the following description each respective casting will be referred to as an upper casting 76 and a lower casting 78.

Figure 32:
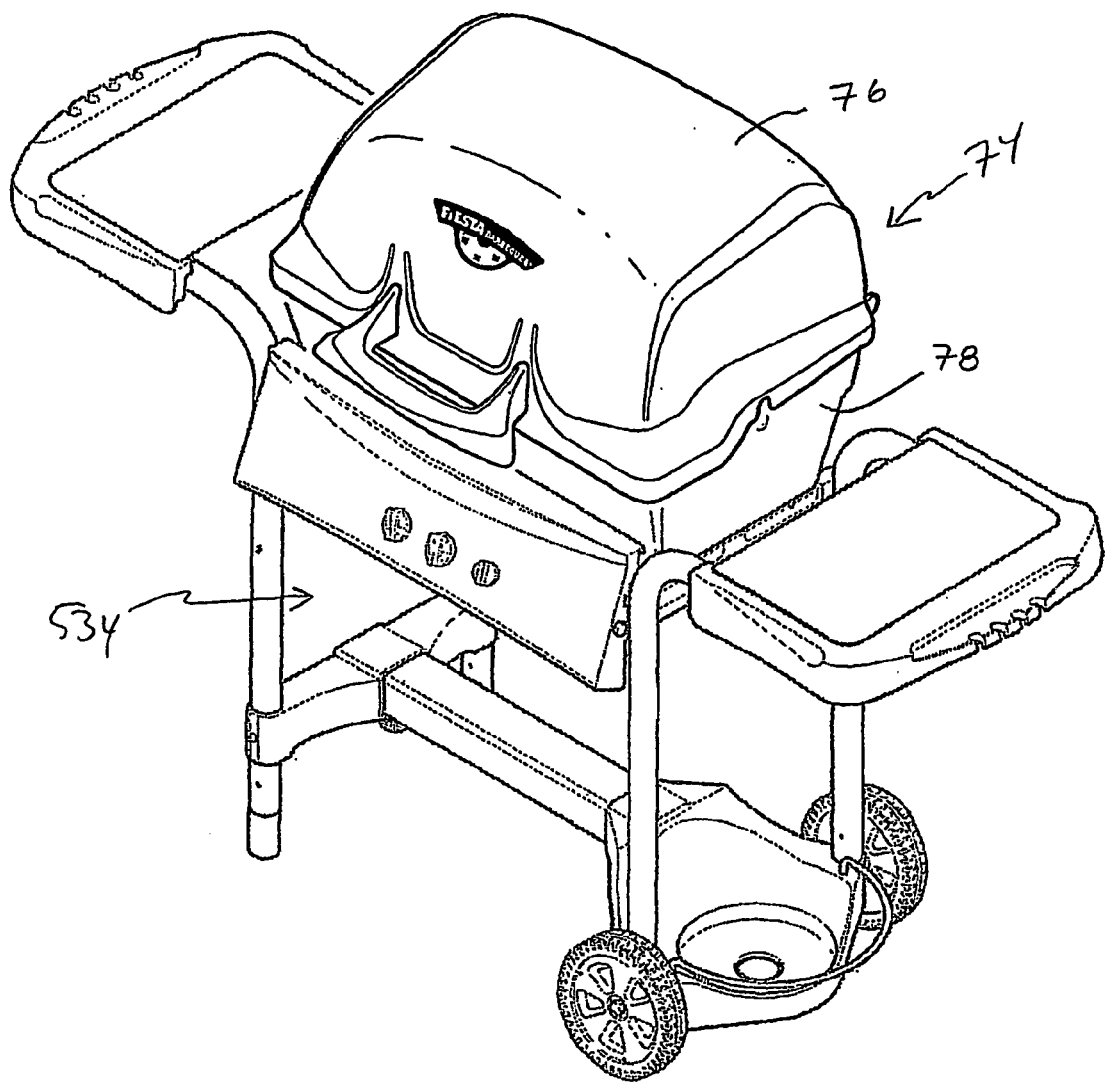
FIG. 32 is a perspective view of the barbeque of FIG. 1.

Lower casting 78 supports burner 80 and grill plate 82. Angled bars 88 for deflecting heat may also be supported by lower casting 78. The casting 78 preferably has an interior surface 558 that defines a volume, which volume may be generally box-shaped. The interior surface 558 terminates at an edge 560 defining an opening 562 which may be generally rectangular. A closure such as upper casting 76 may be provided to inhibit loss of the heat produced by burners 80. Upper casting 76 preferably has an interior surface (not shown) that defines a volume, which volume may be generally box-shaped. The interior surface terminates at an edge 564 which defines an opening 568. Opening 568 is preferably generally rectangular, with edge 564 substantially conforming to edge 560 of lower casting 78 to reduce spaces or gaps therebetween. This may reduce heat loss from within the grill housing 74 when castings 76 and 78 are in a closed position, as shown in FIG. 32, for example. Interior surface 558 of lower casting 78 and the interior surface of upper casting 76, and their respective edges 560, 564 may alternatively be configured to define other volumes and openings. For example, each of the interior surfaces could define a hemispherical volume and the edges could each define a generally circular opening.

As shown in FIG. 32, castings 76 and 78 combine in a closed position to enclose a generally box-shaped volume when they are oriented with their openings 562 and 568 facing each other, and their edges 560, 564 are aligned. In this closed position, the castings 76 and 78 inhibit heat transfer from within the grill housing 74 to the surrounding environment. Castings 76 and 78 are separable from one another to provide access to at least the grill plate 82. At least one hinge 570 preferably joins upper casting 76 to lower casting 78. Hinge 570 has a bolt 572 (shown in phantom) which is connected to upper casting 76, and semi-circular receiving members 574 and 576, which are connected to lower casting 78 and are configured to receive bolt 572. Bolt 572 may be slidingly inserted between semicircular receiving members 574 and 576, to form hinge 570. A free end of bolt 572 may receive a bolt clip 578 to inhibit removal of bolt 572 from its position between receiving members 574 and 576. An axial groove or head 580 may be included at the bolt free end to inhibit axial removal of bolt clip 578.

A handle 582, connected to upper casting 76, may be gripped to move upper casting 76 relative to lower casting 78. Handle 582 is preferably made of a heat resistant material such as wood or an appropriate plastic so that it remains relatively cool to the touch even when the castings 76 and 78 are hot. Heat resistant gaskets 584, sandwiched between handle 582 and casting 76, may be installed to inhibit heat transfer between casting 76 and handle 582. Handle 582 may be attached to casting 76 using at least one, and preferably two, fasteners in the nature of threaded posts 586 projecting from ends of handle 582' (shown in FIG. 2) or bolts 588 for insertion into handle 582 (as shown in FIG. 1). The installation of either handle 582 or 582' is similar. For example, to install handle 582', the generally parallel threaded posts 586 are inserted into handle holes 590 passing through upper casting 76. As noted above, a gasket or gaskets 584' may be placed between handle 582' and casting 76. Once inserted through handle holes 590, threaded posts 586 may be manually secured by either wing-nuts 592 or in some other manner to hold handle 582 fixed adjacent to casting 76. A temperature gauge 594 may also be attached to upper casting 252 in a similar manner as described for handle 582. In particular, temperature gauge 594 may be manually installed and fastened, for example, using wing nuts 592 or speed nuts (not shown).

To accommodate various internal components, such as burners 80, grill plate 82, warming rack 84 and angled bars 88, the shape of the castings 76 and 78 may be modified from a general box-shape, as described below.

Referring to FIG. 2, lower casting 78 may rest on support members 62 and 64. A fastener such as bolt 596 may be used to inhibit movement of lower casting 78 relative to support members 62 and 64. Bolt 596 may be inserted into a hole or casting bore 598 passing through lower casting 78, wherein bore 598 is substantially coaxial with a threaded bore 600 in bridging member 102 or 104 when lower casting 78 is aligned for assembly to member 62, 64. To connect lower casting 78 to bridging member 102 or 104, bolt 596 is inserted through casting bore 598, starting adjacent interior surface 558. Bolt 596 is then received by threaded bore 600 and tightened to attach lower casting 78 to bridging member 102 or 104.

As the bridging members 102 and 104 are preferably identical to one another, the description for one applies to the other. Bridging members 102 and 104 may also be symmetrical about their longitudinal centrelines. This configuration permits identical bridging member configurations to be used for both bridging member 102 and 104, which may reduce tooling and manufacturing costs. For example, to use a bridging member 102 as bridging member 104, the bridging member need only to be rotated 180 degrees about its longitudinal axis. To limit repetition, only one half of the symmetrical bridging members is described. It will be understood that the undescribed other half of the symmetrical bridging has as similar structure.

Each bridging member, for example member 102, may be provided with at least one flange 602 having the threaded bore 600. Flange 602 additionally provides a support surface 604 for supporting lower casting 78. In its operative position, support surface 604 is preferably generally horizontally oriented and located at about waist height. For example, support surface 604 may be located 26 inches from the base ends 110, 112 of leg members 98, 100. Increased rigidity of bridging member 102 may be achieved by including at least one, and preferably four, protuberances 606 formed therein. Protuberances 606 preferably protrude by a distance that is substantially the same as the thickness of the material from which bridging member 102 is made, and have a generally symmetrical shape such as a rectangle or oval. At least two protuberances 606 straddle each bend 608 (which is formed by flange 602) so that bend 608 lies along a longitudinal centerline of each protuberance 606. Instead of including protuberances 606, increased rigidity of bridging member 102 may be achieved by attaching at least one, and preferably four, gussets (not shown) thereto in locations similar to those described for protuberances 606.

Bolt 596 is preferably configured so that it may be manually installed and tightened. Bolt 596 includes a head 610 that may be gripped. Head 610 may be cylindrical, having an oval cross-section, wherein the minor axis of the oval cross-section is greater than the thickness of the head 610. A threaded shaft 612 extends from the center of the oval head 610 along the cylinder axis, and may be integrally formed with head 610. For enhanced gripping, a protrusion from head 610, such as posts 614, may be added. Posts 614 protrude from a side of head 610 opposite to threaded shaft 612. Posts 614 are preferably spaced apart and equidistant to the axis of shaft 612 to permit increased torsional leverage about the axis of shaft 612 when the bolt 596 is tightened or loosened. Due to the heat produced by the burners 80, bolt 596 is preferably made of a material, such as cold forged steel, that does not deform when subjected to high temperatures.

Referring to FIGS. 1 and 4, head 610 may alternatively be configured as a manually tightenable fastener in the nature of a nut 610' having a threaded bore 616 through its axis, instead of threaded shaft 612. A member in the nature of a post or a threaded post 612' may be partially threaded into the threaded bore 600 of flange 602 so that it protrudes from support surface 604. Threaded post 612' may alternatively be welded directly to flange 602. A free end of the threaded post 612' is inserted into the bore 598 passing through the lower casting 78. Threaded post 612', and therefore casting 78, may then be secured to support 62, 64 by threading and tightening nut 610' about the threaded post 612', whereby the casting 78 is sandwiched between nut 610' and flange 602. Because the threaded post 612' is preferably first connected to flange 602, it may further serve as a locator for positioning the lower casting 78 relative to the bridging members 102 and 104. Threaded post 612' may additionally have a head to form a bolt 618 which may be threaded through threaded bore 600, with its free end protruding from support surface 604.

Figure 71B:
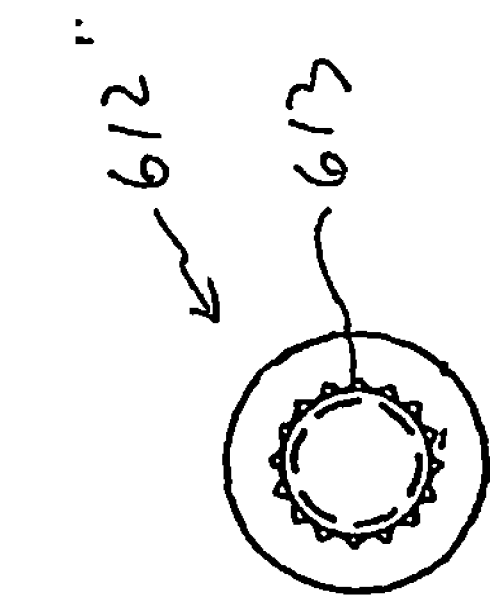
FIG. 71B is an isolated end view of the threaded post of FIG. 71A.
Figure 71A:
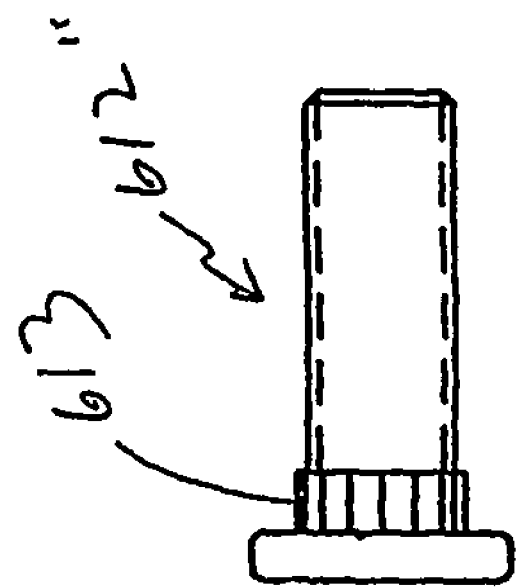
FIG. 71A is an isolated side view of an alternative embodiment of a threaded post of the barbeque of FIG. 1.
Figure 72:
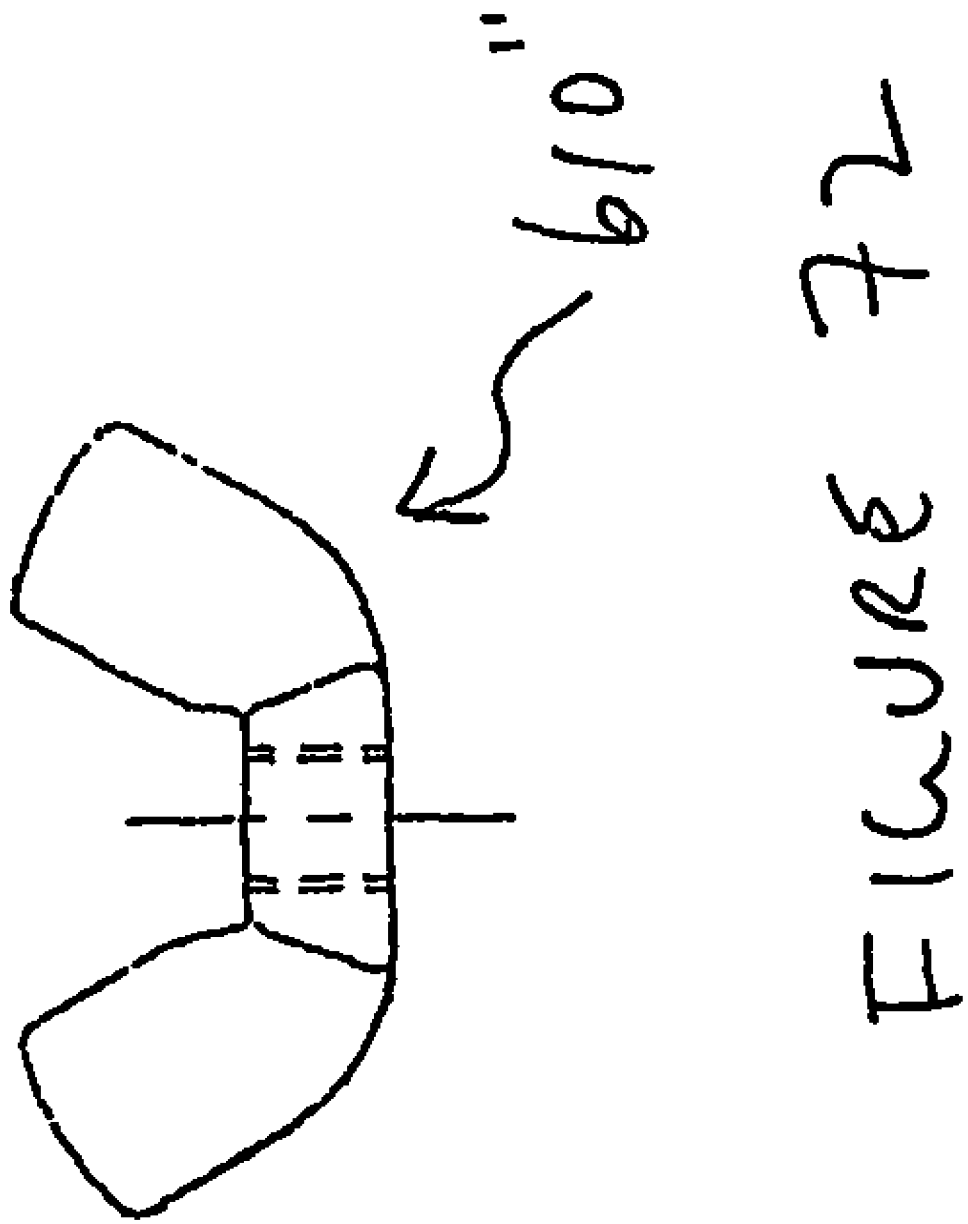
Figure 73E:
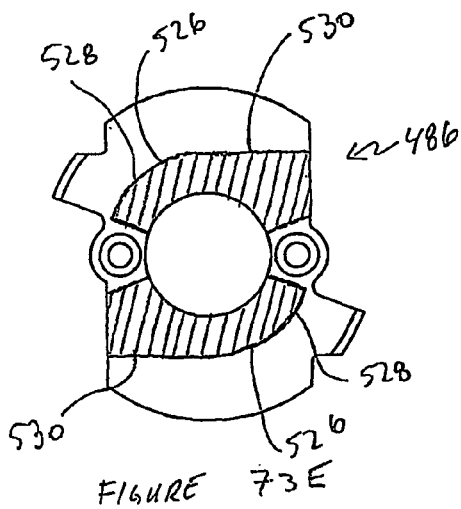
Figure 73A:
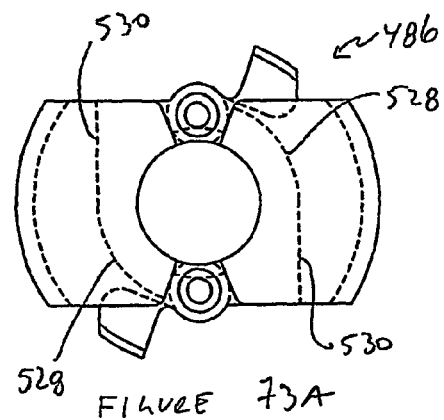
Figure 73B:
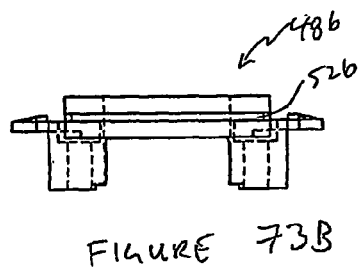
Figure 73C:
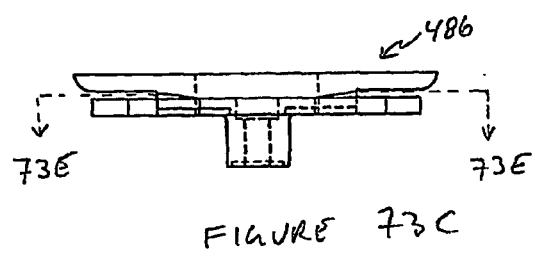
Figure 73D:
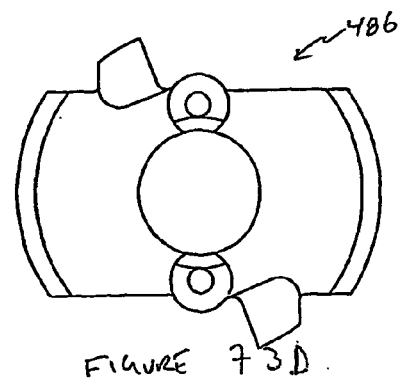

Referring additionally to FIGS. 71A–72, an alternative threaded post in the nature of a bolt 612" may be inserted into bore 600 of flange 602. Bolt 612" additionally has a serrated neck 613 for gripping edges of marginally smaller bore 600. Nut 610" may be threaded onto bolt 612" to retain lower casting 78 therebetween.

In the illustrative embodiment, the casting 78 may be guided to a preferred alignment relative to the support members 62 and 64, by employing an alignment device or structure in the nature of at least one, and preferably four, alignment or guide members such as guide posts 620. The alignment structure also encourages alignment of threaded bore 600 with casting bore 598 so that bolt 596 may be readily inserted and threaded therethrough. Guide posts 620 protrude from grill housing 74, and preferably protrude from lower casting 78, in a direction away from interior surface 558. Openings or holes in the nature of guide bores 622, located in flange 602 of bridging member 102, may receive the guide posts 620. The flanges 602 of each bridging member 102, 104 preferably each have two spaced-apart guide bores 622 for receiving the respective guide posts 620.

The guide posts 620 may protrude from a side, such as bottom 624, of lower casting 78, bottom 624 being located generally opposite to the opening 562 of the lower casting 78. Each post 620 may be located adjacent an extremity of bottom 624, such as at corners 626. The location of guide posts 620 and corresponding bores 622 orients lower casting 78 so that it straddles support members 62, 64 and is generally balanced, thus reducing the possibility of barbeque 60 tipping. Additional guide bores, such as guide bore 628, may be included to accommodate different spacings of guide posts 620 on castings of different size.

Guide posts 620 may be tapered, being narrower at their distal ends 630. The bases 634 of guide posts 620 are preferably larger than the guide bores 622. The narrower distal ends 630, being smaller than the guide bores 622, may fit more readily within the guide bores 622, reducing the need to precisely align the posts 620 with the bores 622. As the guide posts 620 are inserted into the bores 622, the casting 78 is aligned relative to the supports 62, 64, and the edges 632 of the guide bores come into contact with the respective bases 634 of guide posts 620 to preferably form a friction fit between the guide bore edges 632 and guide posts 620. This arrangement further inhibits movement of the lower casting 78 relative to the supports 62, 64. As noted above, the alignment structure also serves to align the threaded bores 600 and casting bores 598, to permit insertion and tightening of bolt 596. The guide posts may alternatively protrude from support surface 604 into bores in lower casting 78 (not shown).

A hollow 636 may be provided in support surface 604 to encourage edges 632 of guide bores 622 to grip guide posts 620. Hollow 636 is defined by adjacent protuberances 606 that are displaced from one another along support surface 604 with an exposed portion of support surface 604 therebetween. Hollow 636 is located adjacent threaded bore 600. In an alternative embodiment, hollow 636 is located with threaded post 612', passing therethrough. When lower casting 78 is placed onto protuberances 606, which overlap support surface 604, a gap (not shown) is formed at hollow 636 between support surface 604 and the bottom 624 of lower casting 78. As bolt 596 (or nut 610' in an alternative embodiment) is installed and tightened, bolt 596 is drawn into casting bore 598, and the gap narrows due to a partial deformation of support surface 604 (and flange 602) as it is moved towards lower casting 78 at hollow 636. This deformation of surface 604 may create longitudinal tension in support surface 604 causing portions of edges 632 of guide bores 622 to grip guide posts 620, thereby biasing flange 602 to lower casting 78.

The lower casting 78 may be provided with a plurality of holes in the nature of vents 286 that permit oxygen to be drawn for use by burners 80 to combust fuel. Air holes 286 are preferably located in the bottom 624 of lower casting 78, and may be arranged beneath burner 80. The lower casting 78 may further be provided with an ignition hole 287 therethrough for igniting fuel by external means, such as a lighted match (not shown) inserted therein. Burner 80 may alternatively be ignited using an ignition, described below.

To provide a drain for grease and other drippings from food cooked within the grill housing 74, lower casting 78 may have a drain in the nature of at least one drain opening 638. Drain opening 638 is preferably centrally located in the bottom 624, and passes therethrough. Bottom 624 may be sloped towards drain opening 638 to encourage draining from substantially the entire bottom 624 of lower casting 78. When in operative position, bottom 624 may be sloped downwards at between five and 15 degrees from the horizontal towards drain opening 638. A cup, tube or other means (not shown) for collecting the drippings may be located beneath drain opening 638. For example, as shown in Figure FIGS. 1 and 2, a cup holder 640 may be inserted into and retained by a hole 642 in lower casting 78 adjacent drain opening 638. Cup holder 640 may be made of a section of pliable wire configured to receive and support a cup below drain opening 638.

A pair of rotisserie rebates 644 may be provided in edges 560 of lower casting 78 for supporting a rotisserie (not shown). The rebates 644 are preferably generally located at the mid points of opposite sides of edges 560.

Burner Support Member

Referring to FIGS. 33 and 34, lower casting 78 contains at least one burner 80. Burner 80 may be an H-shaped burner 80, a bar-shaped burner 80' (see FIG. 2), or some other appropriate barbeque burner known in the art. To satisfy government standards, such as ANSI Z21-58 in the U.S. and CGA 1.6 in Canada, support members 646 are attached to burners to retain and maintain the burner in a preferred orientation within lower casting 78. The support members 646 of the illustrative embodiments described below permit the burner to be manually installed in and removed from barbeque 60 without tools. Support members 646 may be used in combination with many different burner configurations, including the H-shaped burner 80 and bar-shaped burner 80'. The attachment and use of the support members 646 is similar in each case. Accordingly, the following description of support members 646 as used in conjunction with an H-shaped burner 80 is an example and may apply in substantially the same manner to burners having different configurations.

H-shaped barbeque burners typically have four coplanar arms, such as arms 648 of burner 80. When in a preferred orientation, the four arms 648 of burner 80 are generally horizontal. At least one support member 646 is attached to each arm 648. Each support member 646 generally uniformly displaces the arms 648 of burner 80 from the lower casting bottom 624 and inhibits movement of burner 80 relative to lower casting 78. Each support member 646 has a generally planar strip portion 650. Strip portion 650 may be rectangular, and is preferably constructed from a resilient heat resistant material such as a metal. For example, aluminized steel may be used. Strip portion 650 is attached along an edge (not shown) to arm 648 to generally form a right angle with arm 648. Attachment may be by welding or some other securing means that is not significantly affected by high temperatures. Alternatively, strip 650 may have a bend therein to form a toe 652 protruding more or less normal to a longitudinal axis of strip 650. Toe 652 may be welded to arm 648, thereby providing a larger area for attachment to arm 648 than along an edge of strip 650. As shown in FIGS. 66–68, in an alternative embodiment of burner support, burner support member 646' (described below), a toe 652' may additionally include a attachment member 655 for attaching the support member 646' to burner 80. Attachment member 655 may also be applied to toe 652 in a similar manner.

Adjacent a free end 654 of strip 650 is a catch 656 for securing strip 650 (and by connection burner 80) when catch 656 is inserted into an opening 658 in the bottom 624 of lower casting 78. Catch 656 is preferably generally rectangular in shape, and may be formed from strip 650 by making three incisions in strip 650, or stamping strip 650, to define three sides of rectangular catch 656. A fourth side of catch 656 is defined by bending a free end 662 of three-sided catch 656 away from strip 650 to form a bend 660 where catch 656 meets strip 650. Bend 660 is preferably adjacent strip free end 654, and has an axis which is generally parallel to the plane of arms 648. As a result of bend 660, catch free end 662 is displaced from strip 650. Once bend 660 is formed, catch free end 662 is preferably displaced by greater than zero and less than 90 degrees from an opening 664 formed by the bending of catch 656 away from strip 650. An angle of about 30 degrees may be defined, for example. In the illustrative embodiment, the material used for strip 650 may be sufficiently pliable to permit the formation of bend 660, but is of sufficient resilience that when a force is applied to catch free end 662 to move it through an arc about the axis of bend 660 to move it towards opening 664 in support member 646, catch free end 662 returns substantially to its original position at about 30 degrees displacement from opening 664 of support member 664 when the force is no longer applied.

Support member 646 also has at least one protrusion, such as a shoulder 666 which contacts portions of interior surface 558 of lower casting 78 adjacent to casting opening 658 to prevent further insertion of support member 646 into casting opening 658. In the illustrative embodiment, support member 646 has two shoulders 666. Shoulders 666 define a neck 669 for insertion into casting opening 658. Shoulders 666 are located at a predetermined distance from arm 648 to provide a preferred displacement of burner arms 648 from lower casting interior surface 558. For example, shoulders 666 may be displaced from arm 648 by between 0.5 and 1 inch, and preferably by 0.65 inches. Shoulders 666 may be formed by bending portions of the free parallel sides 670 of strip 650 adjacent free end 654 to form tabs 668 which are preferably perpendicular to the plane of strip 650. The creation of tabs 668 forms shoulders 666 at portions of the free parallel sides 670, adjacent tabs 668. To facilitate bending of tabs 668, a transverse cut to define shoulder 666 may be made in each side 670, before tabs 668 are bent. Alternatively, shoulders 666 may be added to strip 650 by welding or by otherwise connecting one or more metal tabs or pieces to strip 650 to inhibit insertion of support member 646 into opening 658 beyond a desired threshold (not shown). In the above embodiments, the tabs 668, being located in planes generally perpendicular to the plane of strip 650, may also add rigidity to strip 650.

Burners, such as burner 80, typically have at least one, and frequently two, fuel input ducts 672. Free ends 674 of ducts 672 have guards, such as spider guards 474, to prevent insects from entering ducts 672. Guards 474 engage outlets of console 86 (described below) to receive a mediated flow of fuel which is supplied to the burner 80 via ducts 672.

To manually install burner 80 into lower casting 78, free ends 674 of each duct 672 are inserted through separate burner duct passages 676 and 678, located in lower casting 78. Passages 676 and 678 permit fuel to be delivered from an external source, such as propane tank 90, via ducts 672 to burner 80. Once duct free ends 674 are inserted through passages 676 and 678, support member free ends 654 are each inserted, preferably concurrently, into their respective lower casting openings 658. Because the manner in which each support 646 is installed and removed is similar, a description for the installation of just one support 646 is provided. Bend 660 enters opening 658 and is followed by catch 656 which angles away from strip 650, as described above. As support 646 is further inserted into opening 658, catch 656 encounters an edge of opening 658, and is deformed and caused to move closer to strip 650 to a depressed or deformed position (not shown) to permit further insertion of support 646. When catch free end 662 passes through opening 658, the resilient catch 656 returns to its initial angled displacement from strip 650, and is positioned adjacent to opening 658. In this configuration, a snap fit may be formed between catch 656 and lower casting 78. In this position, the free end 662 of catch 656 is adjacent to, and preferably abuts, lower casting 80 to hinder removal of support 646 from opening 658. Once catch 656 passes through opening 658, shoulders 666 abut portions of interior surface 558 of lower casting 78 adjacent to casting opening 658 to inhibit further insertion of support 646 into opening 658. To manually remove support 646 from opening 658, catch free end 662 is moved toward strip 650 to permit support 646 to clear the edges of opening 658 and be removed. The tabs 668 may additionally each have a hole 680 therethrough. Holes 680 are coaxial with one other, and may optionally receive a pin such as a cotter pin to further inhibit removal of support member 646 from opening 658.

In the illustrative embodiment, during installation of support 646, shoulders 666 abut the lower casting 78 immediately after catch free end 662 passes through opening 658. This configuration attempts to minimize movement of support 646 along an axis parallel to the direction of insertion, by retaining lower casting 78 between shoulders 666 on one side and catch free end 662 on the other.

Casting opening 658 is preferably made sufficiently large to permit insertion of support 646 with catch 656 in a depressed position, yet sufficiently small to prevent removal of support 646 with catch 656 in its initial position. The casting openings 658 which receive each support 646 are also preferably of a size and location to inhibit movement of burner 80 in a direction transverse to the direction of insertion. For example, transverse movement may be inhibited by configuring an edge of opening 658 to be located immediately adjacent strip 650. In this configuration, if a transverse force is applied to burner 80, movement of the burner 80 is hindered by strip 650 coming into contact with an edge of opening 658. Alternatively, the location of the edges of the openings relative to the inserted support members 646, may be made such that any two or more of the four support members 646 abut an edge of their corresponding opening 658 when subjected to a force transverse to the direction of insertion, which in turn hinders transverse movement of burner 450. Any transverse force applied to burner 80 causes at least two supports 646 to abut edges of their respective holes to limit transverse movement of the burner 80.

Figure 52B:
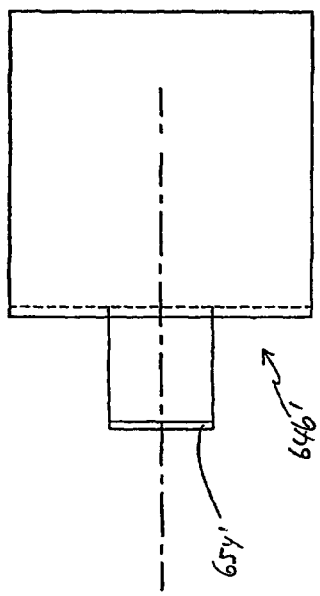
FIG. 52B is a side view of the burner support member of FIG. 52A.
Figure 52C:
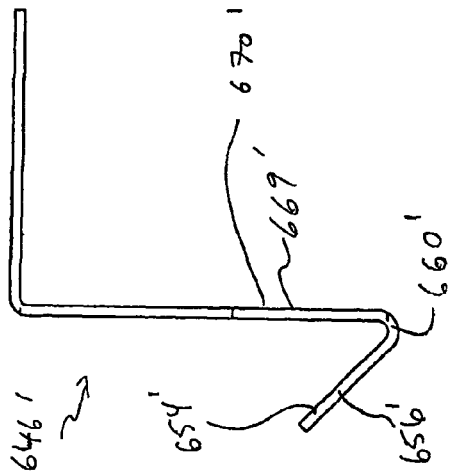
FIG. 52C is a top view of the burner support member of FIG. 52A.
Figure 52A:
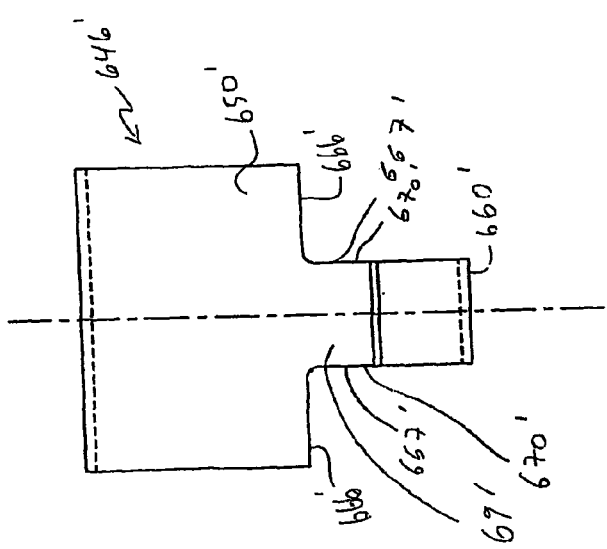
FIG. 52A is an isolated end view of a burner support member of the barbeque of FIG. 1.

Referring to FIGS. 52A–52C, in an alternative embodiment of burner support member 646, labelled 646', catch 656 may be formed by bending the free end 654' of strip 650' to form a catch 656' and a bend 660' with similar characteristics to those described above. Shoulders 666' may be formed by cut-outs or rebates 667' in strip 650'. Rebates 667' also define free parallel sides 670' of a neck 669' of strip 650', from which catch 656' depends.

Referring additionally to FIGS. 65–68, support member 646' is installed into casting opening 658, and operates, in a similar manner as described above for support member 646. In particular, bend 660' enters opening 658 and is followed by neck 669' and catch 656', which angles away from strip 650' and may guide neck 669' into proper alignment within opening 658. As catch 656' is inserted further into opening 658, it encounters an edge of opening 658 and is caused to move closer to neck 669' to a depressed position to permit further insertion. When catch 656' clears opening 658 it resiliently returns to its initial position and is positioned adjacent opening 658. In this position, catch 656' inhibits removal of neck 669' from opening 658.

Opening 658 may be generally rectangular in shape, having a length of approximately 0.45 inches and a width of approximately 0.3 inches, wherein its length runs generally parallel to an axis of bend 660' when neck 669' is installed therein. To limit movement of burner 80, neck 669' may have a width of marginally less than 0.45 inches so that free parallel sides 670' abut or are adjacent to opposed parallel edges of opening 658 when neck 669' is located within opening 658. Similarly, to limit movement of burner 80, supports 646' may be positioned to co-operate so that neck 669' of each support 646' abuts or is adjacent to another edge of opening 658. For example, if two supports 646' are used and one support 646' is positioned to abut a longitudinal edge of a first opening 658, then the second support 646' is preferably located to abut an opposite longitudinal edge of a second opening 658. In a similar manner as described for support member 646, support member 646' may additionally have a hole therethrough (not shown) for optionally receiving a removable pin such as a cotter pin which further inhibits removal of support member 646' from opening 658.

Figure 64B:
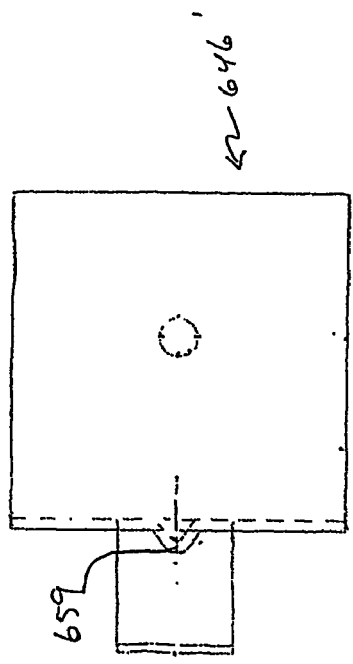
FIG. 64B is a top view of the burner support member of FIG. 64A.
Figure 64C:
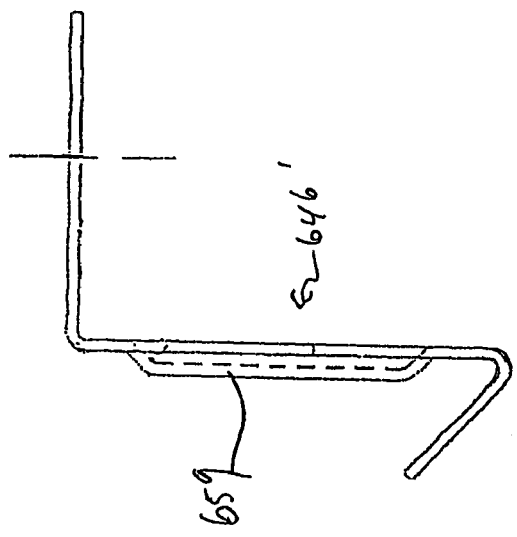
FIG. 64C is a side view of the burner support member of FIG. 64A.
Figure 64A:
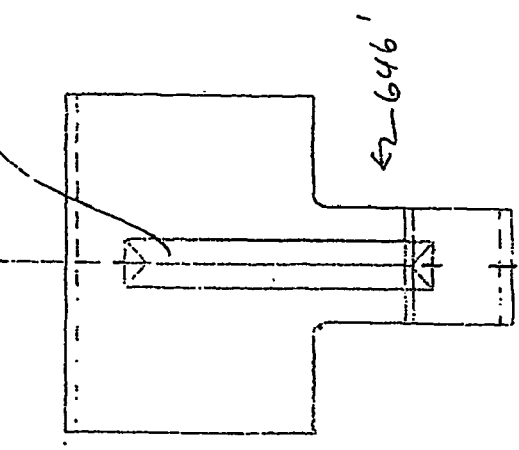
FIG. 64A is an isolated end view of a burner support member of the barbeque of FIG. 1.
Figure 65:
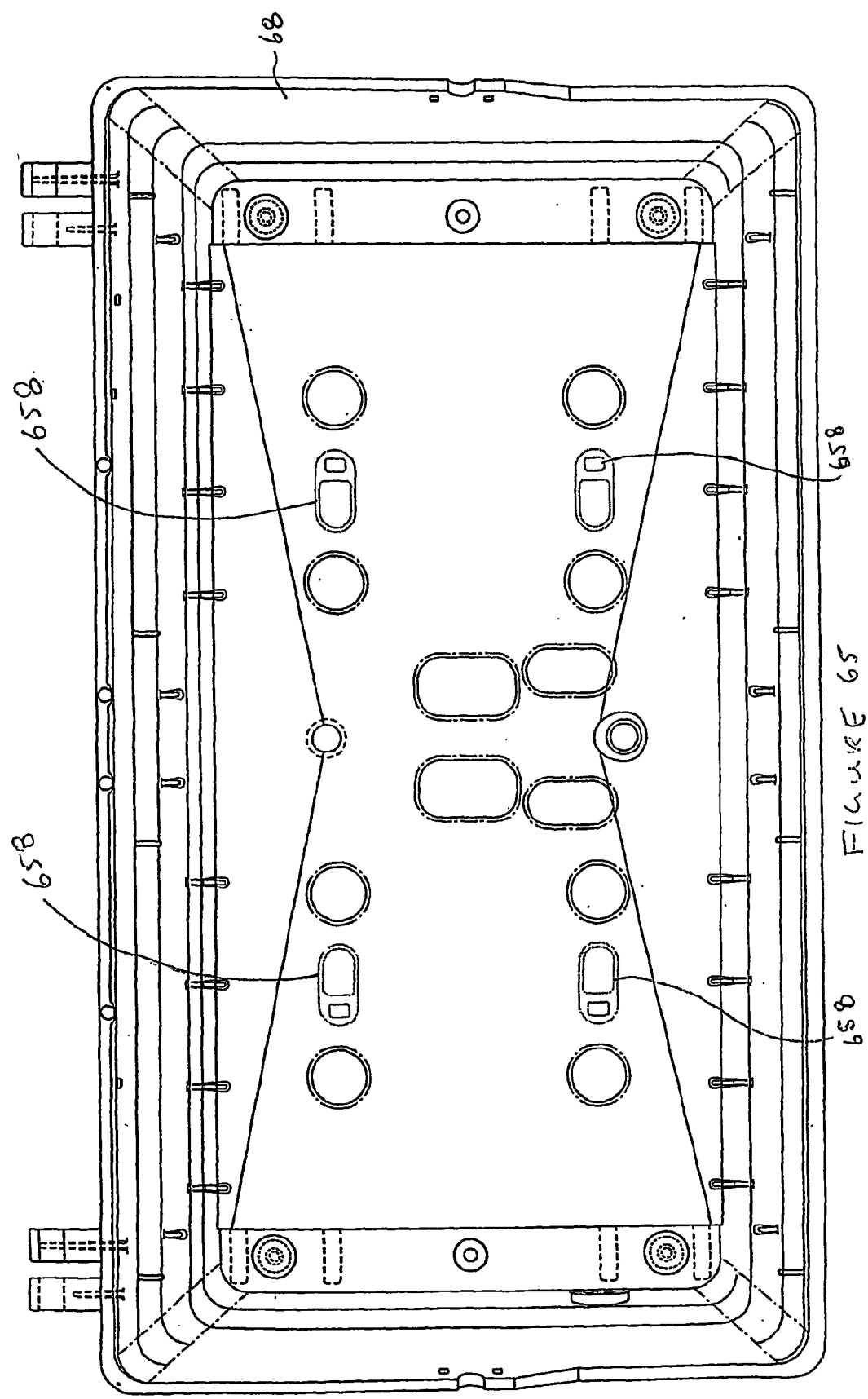
FIG. 65 is an isolated top view of a lower casting of the barbeque of FIG. 1, showing casting openings for receiving the burner support member of FIG. 52A.
Figure 69B:
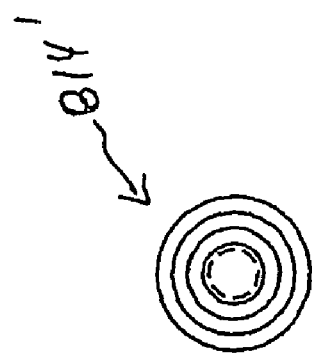
FIG. 69B is an end view of the axle pin of FIG. 69A.
Figure 69A:
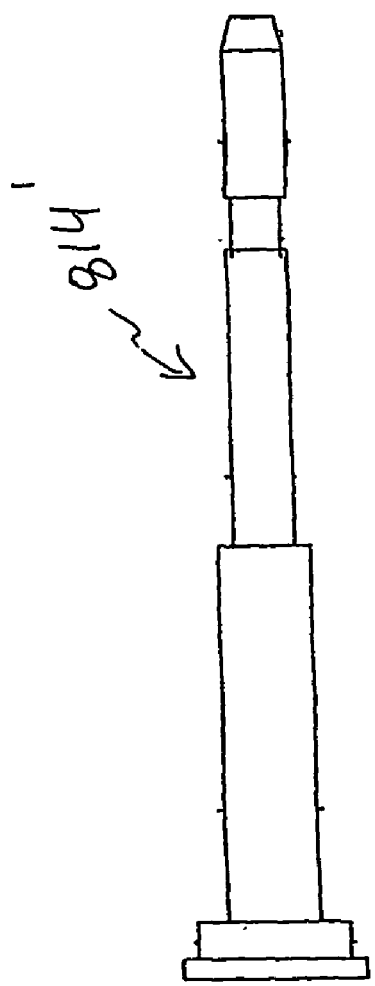
FIG. 69A is a side view of the alternative axle pin of FIG. 63.
Figure 70B:
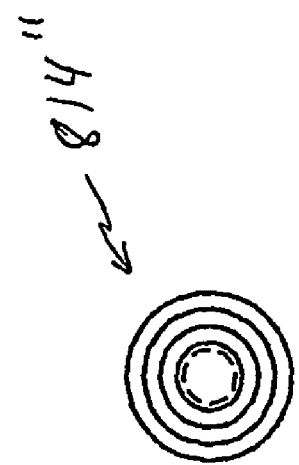
FIG. 70B is an end view of the axle pin of FIG. 70A.
Figure 70A:
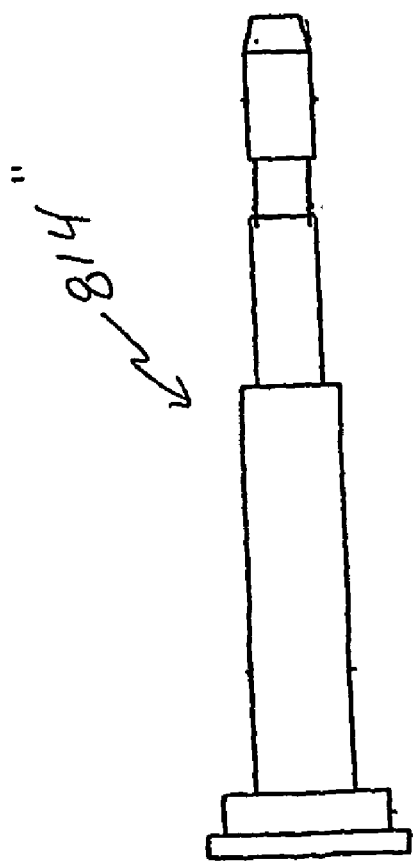
FIG. 70A is a side view of an alternative axle pin of the barbeque of FIG. 2.

Referring to FIGS. 64A–64C, burner support member 646' may additional include an indent or embossment 659 which may increase the rigidity of strip 650'. Embossment 659 may be substantially linear and may run along a longitudinal centerline of strip 650'. It may additionally traverse a portion of neck 669'.

In a further alternative embodiment (not shown), the rectangular catch may be fashioned from the strip by making two incisions in the strip at right angles to one another to define adjacent sides of the rectangular catch. A third side of the catch is a portion of an edge of the strip, and the fourth side of catch is defined by bending the three-sided catch away from strip to form a bend where the catch is attached to the strip. As with other embodiments, the axis of the bend is generally parallel to the plane of arms 648.

In a further yet alternative embodiment, the catch may be added to the strip by welding or other connection means to provide a catch with the preferred properties described above.

In any embodiment, the shape of the catch may differ from a rectangular shape as long as the catch is resilient and has a free end that may be moved to a depressed position to permit insertion of support 646 into opening 658, and that returns to its initial position to inhibit removal of support 646 from opening 658 once a free end of support 646 is inserted therein. Similarly, support 646 may be of any shape, having shoulders and a catch, that affords insertion of the support into an opening, the support being inhibited from further insertion by the shoulders, and removal of the support being inhibited by an attached or integral catch.

The fuel used by burner 80 is preferably a pressurized combustible gas, such as propane, that is appropriate for gas barbeques. Because the fuel is pressurized, it is forced into the burner 80 and may be released via a plurality of fuel openings 682 in the walls of the burner 80. The flow of fuel is mediated by console 86, described below. Fuel openings 682 permit fuel to be released into the interior 684 of lower casting 78. The fuel may then be ignited. The fuel openings 682 are preferably located adjacent to a plane that bisects all arms 648 of the H-shaped burner 80. A standard igniter, such as electronic ignition 686 is attached and retained by igniter clip 688 to burner 80 adjacent the fuel openings 682 of at least two arms 648 having a common longitudinal axis. Igniter activation assembly 690, which includes an igniter activation knob 692, is attached to console 86, and connected to igniter 686 via igniter wire 694 (see FIG. 1).

Heat Deflectors

Referring to FIG. 1, a heat deflector in the nature of angled bars 88 may be installed within casting 78, to encourage heat dissipation within barbeque 60. Burner 80 is sandwiched between casting bottom 624 and angled bars 88. Angled bars 88 may be formed from a single, substantially rectangular sheet of metal. Longitudinal peaks 696 and valleys 698 may be formed therein, to create angled sides 700 for dissipating heat within the grill housing 74. Grill plate 82 is preferably located above angled bars 88. In this arrangement, the angled sides 700 may also reduce the accumulation of grease and other drippings from food within the grill housing 74. When drippings from food supported by grill plate 82 encounter an angled side 700, they may be heated to a higher temperature and partially vapourized, which vapour may add flavour to food located within the grill housing 74. Openings 702 located adjacent to valleys 698 permit drippings that are not vapourized to drop to lower casting bottom 624, to be drawn by gravity to drain opening 638.

At least one and preferably two support struts 704 for supporting angled bars 88, traverse the interior 684 of lower casting 78, and are located between burners 80 and angled bars 88.

Support struts 704 may be uniformly displaced from casting bottom 624 by fins 706 which project from interior surface 558. Fins 706 are each located to support the respective ends 708 of each strut 704. Strut ends 708 preferably have a longitudinal groove 710 for receiving a fin 706 which inhibits movement of the strut 704 when the fin 706 is placed therein. The fins 706 may be integral with casting 78, or otherwise attached thereto, and may be located to orient support struts 704 in a plane parallel to the plane of the arms 648 of burner 80, and both are preferably horizontal when operational. At least one and preferably two locating tabs 712 projecting from each strut 704 may enter an opening 702 of angled bars 88 to encourage a preferred orientation of angled bars 88, and to inhibit movement of angled bars 88 relative to strut 704, once angled bars 88 are installed.

Referring to FIG. 2, in an alternative embodiment, a heat deflector such as lava rocks 714 or ceramic briquettes (not shown) may be provided instead of or in addition to angled bars 88. If these alternatives are used then an appropriate support structure, such as grate 716, for the lava rocks 714 or ceramic briquettes may be provided. Grate 716 may be supported directly by fins 706, and support struts 704 may be excluded.

Grill and Warming Rack

Referring again to FIG. 1, grill plate 82, of a configuration known in the art, is supported by a pair of substantially parallel ledges 718 that may be formed in casting 78 (only one ledge is shown). Ledges 718 may be located to orient grill plate 82 in a plane parallel to the plane of the arms 648 of burner 80. When in operative position, grill plate 82 is substantially horizontal and is located above angled bars 88.

Barbeque 60 may also be provided with a warming rack 84, that may be in the form of at least one cantilevered shelf 720 for supporting food at a greater distance from burners 80 than food located on grill plate 82. As a result of this greater distance, food supported by warming rack 84 receives less heat than food located on grill plate 82. Warming rack 84 may be installed by inserting mounting pins 722 into mounting pin holes 724 located in upper casting 76. Once the pins 722 are inserted, toes 726 of warming rack support legs 408 may be inserted into toe holes (not shown) or may rest in rebates 644 located in edges 560 of lower casting 78. Either, or both, grill plate 82 and warming rack 84 may be made from wire, chrome wire, heavy duty porcelain coated wire, porcelainized metal, cast iron or porcelainized cast iron.

Console

Referring to FIGS. 35, 36, 36A, 37 and 38, console 86 has a control valve 730 for stopping or varying the flow of fuel to burner 80. Alternatively, the flow of fuel to burner 80 may be controlled by separate valves 730 and 732. Appropriate valves for controlling the flow of a gaseous fuel as are known in the art may be used. Valves 730 and 732 are attached to console body 734 (or 734'). Console body 734 is preferably "drawn" from a single sheet of metal to form a substantially rectangular cavity (not shown) for receiving valves 730 and 732. The console body 734 is made using a die (not shown) which imparts shape to console body 734, by impressing the single sheet of metal into a corresponding mould to produce the desired form of console body 734. Holes 736 and 738 in console body 734 permit knob stems 740 and 742 to protrude therethrough. Knob stems 740 and 742 may then be inserted into respective receptacles in control knobs 744 and 746, forming a friction or mechanical fit.

Figure 36A:
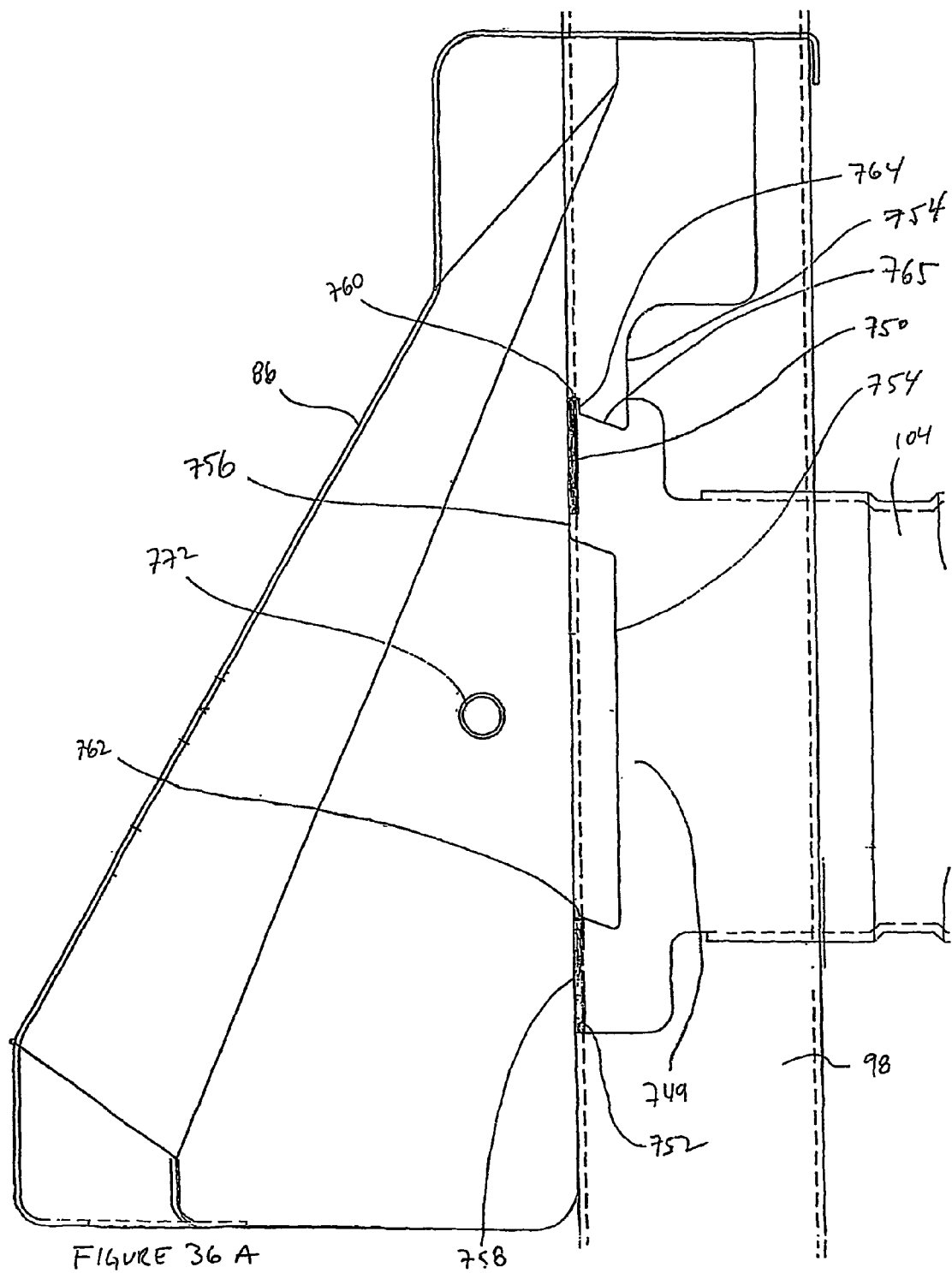
FIG. 36A is a detailed side view of the console of FIG. 36, showing the console and the bridging member, with the leg member shown outlined and transparent.

Referring in particular to FIGS. 36 and 36A, to aid in the proper attachment of console 86 to barbeque 60, ends 748 and 749 of bridging members 102 and 104 each have at least one, and preferably two, spaced-apart tabs 750 and 752 protruding in a similar direction from an edge thereof. Tabs 750 and 752 may both lie in a plane that is substantially perpendicular to the plane of bridging member support surface 604, and, when barbeque 60 is fully assembled, may lie in a plane that is parallel to cross beam 66. Lateral edges 754 of console 86 may have at least one rebate in the nature of a notch 756 and preferably two notches, including notch 758, for receiving tabs 750 and 752. Tab 750 preferably lies in a plane generally transverse to the plane of notch 756, and tab 752 preferably lies in a plane generally transverse to the plane of notch 758. Notches 756 and 758 receive edges 760 and 762 of tabs 750 and 752 to support console 86 thereon. One or both of notches 756 and 758 may additionally have a slot 764 therein for receiving an edge 760 or 762 of a corresponding tab, for example tab 750, when the tab is placed therein. Slot 764 preferably is substantially the same thickness as tab 750, and is sufficiently wide to permit entry of an edge 760 of tab 750 but is sufficiently narrow to limit movement of console 86 relative to tab 750. The remaining tab 752 when placed within notch 756 also inhibits movement of console 86. This arrangement permits console 86 to be placed upon and supported by tabs 750 and 752 to maintain console 86 in a preferred orientation before it is secured.

A side 765 of notch 758, which lies between slot 760 and edge 754, may be configured to form an angle of less than 90 degrees with adjacent edge 754 to guide tab 750 into slot 760. When side 765 is angled in this manner, and placed upon tab 750, tab edge 760 may come into sliding contact with side 765. Since side 765 terminates at slot 760, tab edge 760 is guided by side 765 into slot 760. Notch 756 may be similarly configured.

Each bridging member 102 and 104 has a securing protrusion 766 for securing console 86 thereto. Protrusion 766 may be perpendicular to both support surface 604 and tabs 750 and 752, and is parallel and adjacent to console side 768 when console 86 is placed on tabs 750 and 752. Protrusion 766 lies on the concave side of console 86 and has a threaded bore 770 for receiving a fastener inserted through a corresponding hole 772 in console side 768. The fastener may be a screw, and is preferably a bolt 774 (see FIGS. 39A and 39B) that may be installed and removed by hand. Once partially inserted into hole 772, bolt 774 is inserted into bore 770 and tightened to secure console 86 to bridging member 102. The same operation is completed to attach console 86 to bridging member 104. It should be noted that any form of protrusion may be used as long as receiving bore 770 is positioned to receive fastener 774 to secure console 86 to bridging members 102, 104.

Figures 39A, 39B:
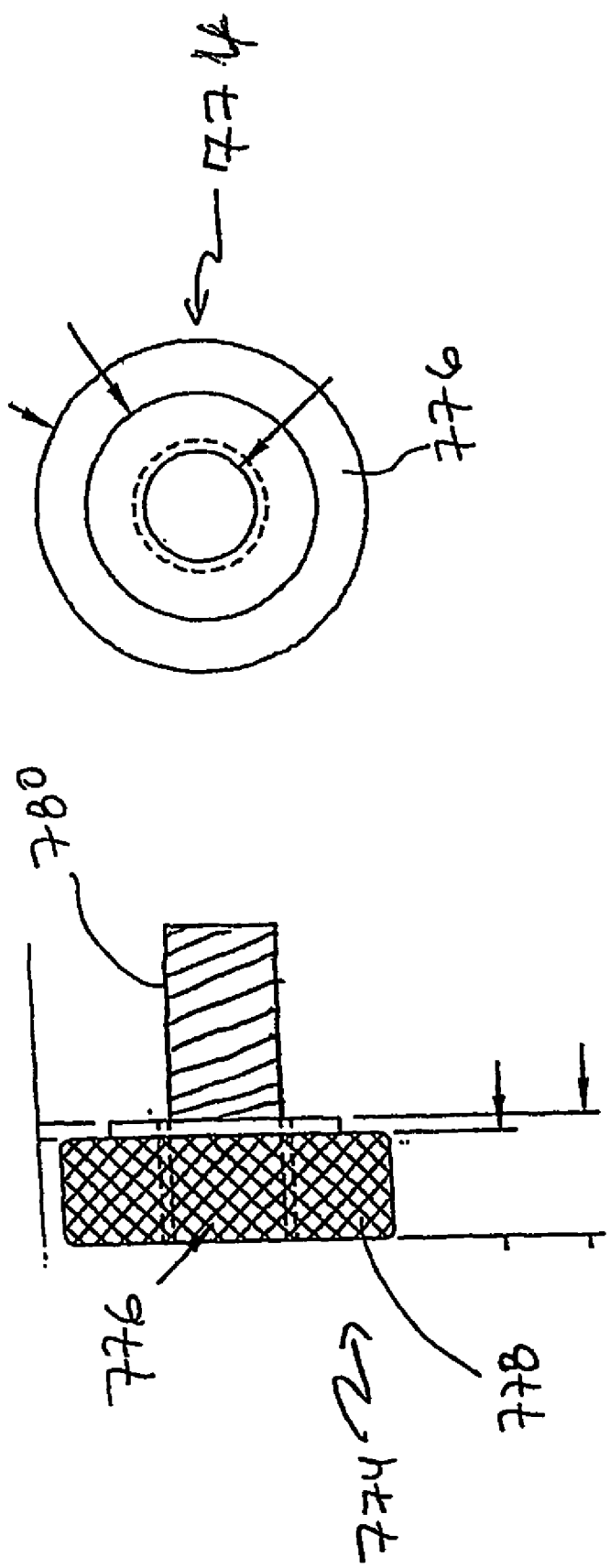
FIG. 39A is a side view of a console bolt of the barbeque of FIG. 1.
FIG. 39B is an end view of the bolt of FIG. 39A.

Referring to FIGS. 39A and 39B, a head 776 of bolt 774 may have external grips, such as knurls or cross hatches 778 to provide greater friction to facilitate unassisted installation of the bolt 774. In the illustrative embodiment, the head 776 is cylindrical, having a diameter of about ⅝ inches and a thickness of about 0.2 inches, or some other size and shape suitable for manual manipulation. A threaded end 780 protrudes substantially co-axially with the axis of the head 778. Turning of the bolt 774 about its longitudinal axis may also be improved by using a non-circular or non-uniform shaped head (not shown) with the threaded end 780 preferably protruding along an axis passing through a centroid of the head 778. The head 778 may be made of any rigid material, such as nylon plastic or a metal.

Figure 37:
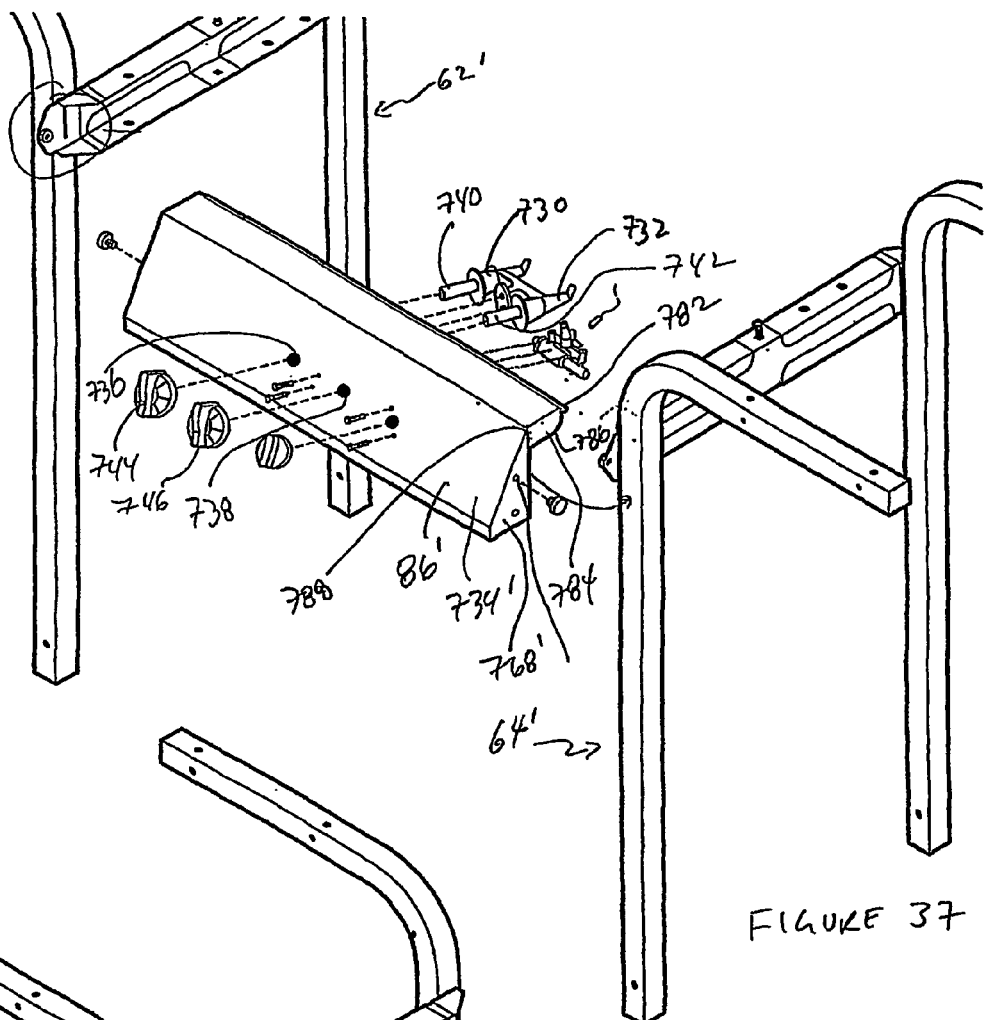
FIG. 37 is an exploded perspective view of the console and leg members of the barbeque of FIG. 2.
Figure 38:
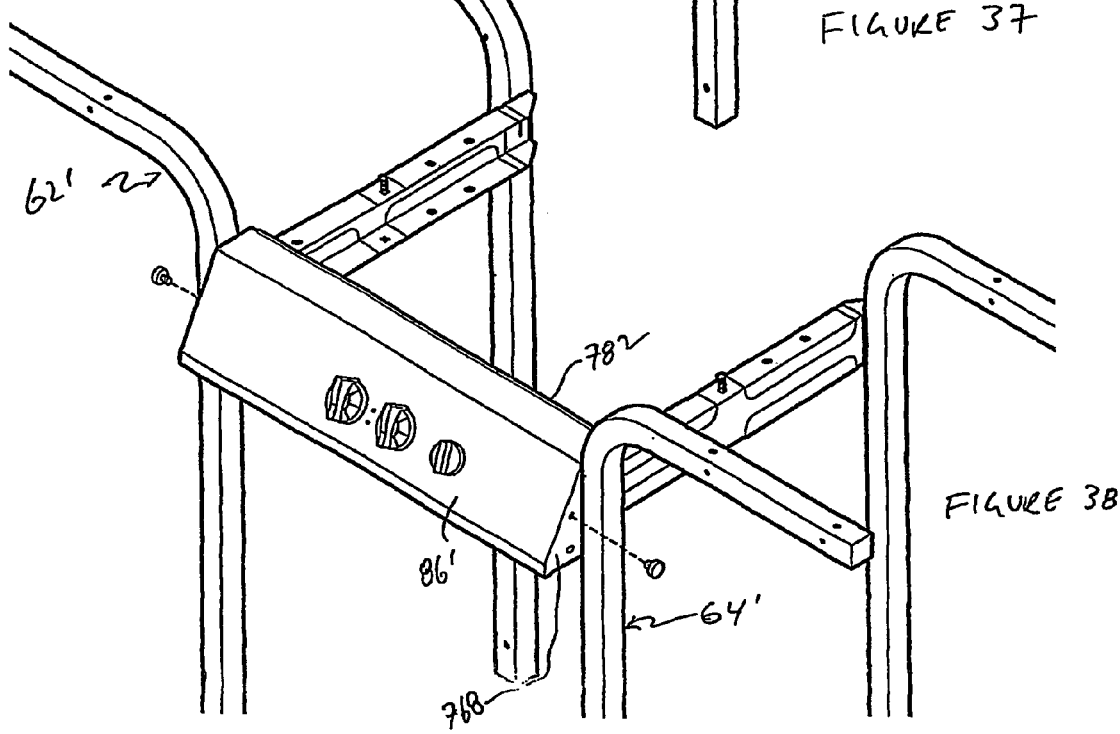
FIG. 38 is a perspective assembled view of the console and leg members of FIG. 37.

Referring to FIGS. 37 and 38 an alternative console 86' and bridging member ends 748' and 749' is illustrated. In the alternative embodiment, ends 748' and 749' do not have tabs 750 and 752 for supporting a console. Instead, console 86' has a longitudinal flange 782 which may be placed at either end onto the respective support surfaces 262 of bridging members 102 and 104. When installed, flange 780 preferably traverses the distance between support members 62 and 64.

Flange 780 may additionally have tabs 784 at either end thereof. In this configuration console 86' is supported on support surfaces 262 along edges 786 of tabs 784. Tabs 784 each extend generally perpendicularly from flange 780, and abut, or may be attached to, console sides 768'. While tabs 784 may be co-planar with sides 768', they preferably lie in a planes parallel to sides 768', and are marginally closer to one another than if they were co-planar with sides 768'. Because they are in marginally different parallel planes, each tab 784 meets a respective side 768' at a radiused boundary 788. The displacement of tab 784 from side 768' permits protrusion 766 to lie on the concave side of console 86', in a similar manner as described for console 86'.

To attach console 86' to bridging members 102' and 104', tabs 784 of console 86' may be placed upon support surface 604, with sides 768' each abutting an adjacent leg member, for example leg member 98, to maintain console 86 in a preferred orientation before it is secured. Threaded bore 770 of protrusion 766 may then receive a fastener inserted through a corresponding hole 772' in console side 768'. The fastener may be a screw, and is preferably bolt 774. Once partially inserted into hole 772', bolt 774 is tightened into bore 770 to secure console 86' to bridging member 102. The same operation is completed to attach console 86' to bridging member 104. It should be noted that any form of protrusion may be used as long as receiving bore 770 is positioned to receive fastener 382 to secure console 86' to bridging members 102, 104.

A fuel hose (not shown) may be connected to control valves 730, 732. The fuel hose has a connector, for example as manufactured by Marshall Gas of San Marcos, Tex., that may be hand tightened to tank 90, or some other fuel source.

In an alternative embodiment (not shown) console 86 may be attached to barbeque 60 by fasteners for attaching console 86 to corresponding ends of bridging members 102 and 104. The fasteners are preferably bolts 774. Openings, in the nature of holes, pass through the bridging member ends, and receive a threaded end 780 of bolt 774. The threaded end 780 may be further received by a corresponding bore in console 86, which may be a bushing, fixed in the console body, the bushing having internal threads for threaded engagement with the threaded end 780. The holes in the bridging member ends are smaller than the head 778 of bolt 774 to inhibit head 778 from passing therethrough. To attach console 86 to bridging members 102 and 104, bolts 774 may be inserted through the holes of the bridging members, into the console bushings, and tightened by hand. In this embodiment, to inhibit console 86 from pivoting about the bolted connections at the bridging member ends, each end may be provided with flanges. The flanges are preferably located to abut a side of console 86 that is substantially parallel to an axis of rotation that is coaxial with the console bolts 774 connecting console 86 to bridging members 102 and 104.

In a further alternative embodiment, bolt 774 may be a nut (not shown). A threaded post may be partially threaded into each of the bushings as described for the previous embodiment, to protrude from the console 86. Console 86 may then be secured by inserting the threaded posts into the bridging member holes, and then tightening the nuts about the threaded posts. Because the threaded post is preferably first connected to console 86, it may further serve as a locator for positioning the console 86 relative to the bridging members 102 and 104.

In the illustrative embodiments, console 86 and panel 72 may be configured and installed so that corresponding edges thereof abut each other to inhibit movement of one relative to the other.

Leg Extensions and Casters

Base ends 110 and 112 of leg members 98 and 100 respectively may include either wheels 94, casters 96 or leg extensions 114 to support barbeque 60. Base ends 110 and 112 of support member 64 preferably have wheels 94 attached thereto. If base ends 110 and 112 of support member 62 have casters 96 then barbeque 60 may be moved by applying a generally horizontal force to barbeque 60 to roll it in the direction of the force along wheels 94 and casters 96. If base ends 110 and 112 of support member 62 have leg extensions 74, then leg extensions 74 must be lifted from a surface supporting barbeque 60 before a generally horizontal force is applied to barbeque 60 to permit rolling motion with attached wheels 94. Movement of barbeque 60 may be discouraged by adding leg extensions 114 to all leg members 98 and 100. Wheels 94, casters 96 and leg extensions 114, regardless of which combination of them is used, are preferably attached so that grill plate 82 is substantially horizontal when barbeque 60 is assembled and in an operative position.

Referring to FIG. 12B, leg extensions 114 support barbeque 60 and protect base ends 110 and 112 of leg members 98 and 100. The height of grill plate 82, and the other components of barbeque 60 may be varied by attaching leg extensions 114 having a desired length to all legs 98, 100, and not attaching any wheels 94 or casters 96 to barbeque 60. Because leg extensions 114 are attached to legs 98 and 100 in the same manner, description for the attachment of one extension is provided.

A plug end 790 of leg extension 114 substantially conforms to the size and shape of a void (not shown) in base end 110 of leg member 98. The void is the internal space typically defined by a hollow leg member, such as leg member 98, having a generally tubular, rectangular or other cross-sectional shape. Plug end 790 terminates at a peripheral shoulder 792 defined by a support end 794 of leg extension 114. Varying the length of support end 794 affects the horizontal displacement of barbeque 60.

Leg extension 114 may be installed by inserting plug end 790 into the void of leg member 98 until shoulder 792 encounters leg member 98 to prevent further insertion of the extension 114. Because plug end 790 preferably substantially conforms to the void in leg member 98, it may be retained in place by friction. To permit easier insertion of plug end 790, plug end 790 may have longitudinal rebates 796, for example forming ribs 798, to reduce the frictional interface between plug end 790 and leg member 98. FIG. 2 shows leg extension 114' having an alternative configuration for insertion into a leg member 98' having a void with a rectangular cross-section. The cross-sectional shape of support end 794 may be varied and does not have to be similar to that of plug end 790.

Leg extension 114 may be secured to leg member 98 using a fastener, such as slotted pin 186 (see FIG. 12B). Leg member 98 has a hole 800 passing laterally therethrough for receiving slotted pin 186. Hole 800 has an entry 800a and an exit (not shown). Similarly, plug end 790 of leg extension 114, has a hole 802, passing laterally therethrough for receiving pin 186. Hole 802 has an entry 802a and an exit (not shown). To install pin 186, the respective entries 800a, 802a and the exits are aligned. Slotted pin 186 may then inserted therethrough to hinder movement of the leg extension 114 relative to the leg member 98.

The slotted pin 186 preferably has a head 188, which is larger than entry 800a to inhibit movement of pin 186 along its longitudinal axis within the holes 800, 802. Pin 186 may also have a catch 189 to inhibit longitudinal movement of the pin 186 within the holes 800, 802. Catch 189 is located at the insertion end 190 of pin 186. End 190 is located opposite to head 188. Catch 189 may be marginally larger than the exit of hole 800 of leg 98 to inhibit pin 186 from being removed once end 190 is fully inserted through the exit hole. To facilitate passage of marginally larger catch 189 through the exit hole, end 190 may be tapered. To further facilitate passage of catch 189, end 190 may have at least one and preferably three partially transverse slots 192 emanating from a central longitudinal axis of pin 186. Each slot 192 is preferably uniformly angularly displaced from the another. As marginally larger end 190 is inserted through the exit of hole 800, slots 192 permit end 190 to narrow facilitating passage of catch 189, therethrough. Slotted pin 186 may be made of a resilient material such as a plastic so that end 190 returns to its original shape once it passes through the exit of hole 800 and catch 189 inhibits removal of pin 186.

Caster plugs 804 receive casters 96 to permit rolling movement of barbeque 60 as described above. As with the description of leg extensions 114, a description for the attachment of one caster plug 804 is provided and applies to the attachment of all caster plugs 804.

The configuration and installation of caster plug 804 is similar to that of the plug end 790 of leg extension 114, and the description above for plug end 790 substantially applies to caster plug 804. As with leg extension 114, caster plug 804 has a shoulder 806 to inhibit further insertion of the caster plug 804 into the void (not shown) in base end 110 of leg member 98. Shoulder 806 is preferably of sufficient thickness to prevent deformation of shoulder when in use. For example, a shoulder thickness of 0.04 inches may be used. Unlike leg extension 114, caster plug 804 has an axial bore 808 for receiving a caster post 810 of a standard caster, for example caster 96. Axial bore 808 may have a circumferential rib (not shown) for engaging a corresponding circumferential groove 812 of caster post 810 to inhibit removal of caster post 810. Caster plug 804 may be further retained using a slotted pin 186 in substantially the same manner as described for retention of the leg extension 114. The general configuration of caster plug 804 may also be varied to accommodate leg members of different cross-sectional shapes. For example, a caster plug (not shown) may be configured for use with rectangular leg member 98'.

If casters 96 or leg extensions 114 are attached to the same leg members to which tank base 92 is attached (not shown), then slotted pins 186 may perform the additional function of securing tank base 92 to the adjacent leg members 98, 100. In this configuration, slotted pins 186 are installed in a similar manner as described above, except each pin 186 also engages a conduit 170 of tank base 92, as described below.

To attach tank base 92 to leg members 98, 100, each leg member 98, 100 is inserted through a respective conduit 170 attached to or, preferably, integrally formed with base 92. Conduits 170 preferably have a lateral cross-section substantially equal to or larger than the size and shape of the lateral cross-section of the respective leg members 98, 100. This permits the leg members to be inserted through the conduits 170. If the cross-sections of the conduits 170 and leg members 98, 100 are substantially the same size, then a friction fit may be formed between the each conduit 170 and leg member 98, 100. To position tank base 92, the conduits 170, may be moved along leg members 98, 100. Conduits 170 are attached to leg members 98, 100 using slotted pins 186 in substantially the same manner as described above for attaching strut 118 to leg members 98, 100, with the additional step of inserting leg extensions 114 or caster plugs 804 before inserting pin 186.

Wheels

Referring to FIGS. 40, 41, 42, 43A and 43B, wheels 94 may be attached to legs 98 and 100 of a support member, such as support member 64. Each wheel 94 is attached to a leg member 98 or 100 in substantially the same manner. The description of the attachment of wheel 94 to leg member 98 applies to the attachment of other wheels 94 to other leg members, such as leg member 100.

Wheel 94 may be attached to leg member 98 using an axle, such as axle pin 814, inserted through hole 800 in leg member 98. This may be the same hole used to retain caster plugs 804 and leg extensions 114. Once attached, wheel 94 may freely rotate about axle pin 814 to facilitate moving of barbeque 60, as described above.

Wheel 94 is attached to leg member by first inserting an end 816 of axle pin 814 into an axial bore 818 passing through wheel 94. Once inserted through bore 818, end 816 is received by entry 800a, passes through the void in the hollow leg member 98, and extends through the exit of hole 800 hole. Further insertion of axle pin 814 is inhibited by a circumferential shoulder 820 which has a larger diameter than entry hole 800a, and abuts leg 98 or 100. Wheel 94 is retained by axle pin 814 with an axle head 822 at an end of axle pin 814 opposite to insertion end 816. Head 822 is larger than hole 800. The displacement along axle 814 between shoulder 820 and head 822 is preferably marginally greater than the length of bore 818. This permits free movement of wheel 94 about axle 814, while discouraging binding of the walls of bore 818 on axle 814.

Figures 42A, 42B:
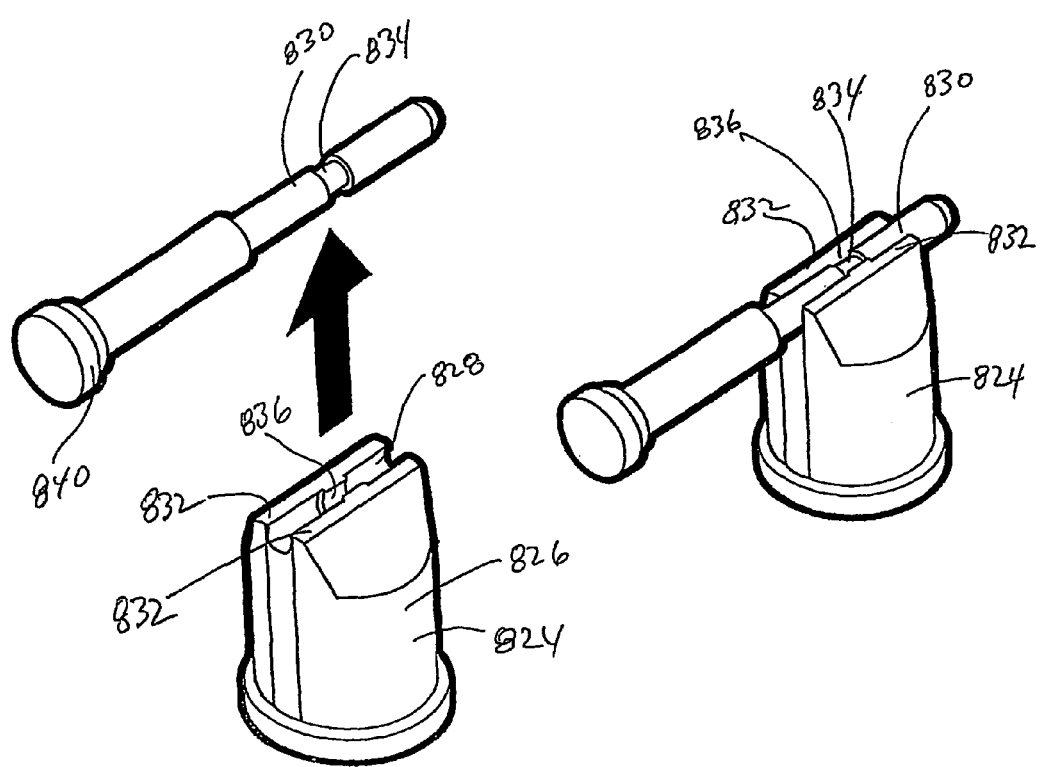
FIG. 42A is an exploded perspective view of a axle pin and axle lock of the barbeque of FIG. 1.
FIG. 42B is an assembled perspective view of an axle pin and axle lock of FIG. 42A.

Referring additionally to FIGS. 42A and 42B, axle 814 may be secured in place with an axle securing apparatus such as an axle lock 824. Axle lock 824 has a body 826 that is preferably similar in shape to caster plug 804 but has a transverse, generally C-shaped groove or channel 828 at an end thereof for engaging a securing portion 830 of axle pin 814. Securing portion 830 is located between end 816 and shoulder 820 of axle pin 814. Because channel 828 is C-shaped it preferably forms a snap fit with axle pin 814.

Axle lock 824 may be attached to barbeque 60 by first inserting axle pin 814 through hole 800 in leg member 98. Axle lock 824 may then be attached by inserting C-shaped channel 828 into the void of hollow leg member 98. C-shaped channel 828 may be aligned and brought into contact with securing portion 830 of axle 814. As increased force is applied to axle lock 824 to urge securing portion 830 into channel 828, resilient edges 832 of channel 828 deform and part to permit securing portion 830 to enter channel 828. Resilient edges 832 then return to their initial position to retain securing portion 830 within channel 828 (shown in FIG. 42B). To further inhibit movement of axle pin 814 along its longitudinal axis, securing portion 830 may be provided with a groove in the nature of a transverse or circumferential groove 834 that receives a stop in the nature of an transverse rib 836 of channel 828. Rib 836 may be arcuate, corresponding to the shape of channel 828 and may laterally traverse channel 828.

Axle lock 824 is preferably constructed from a resilient plastic or metal. If axle lock 824 is made of a plastic then body 826 may have a cross-section marginally larger than the cross-section of the void in leg member 98 so that axle lock 824 may be better retained therein. As the marginally larger axle lock 824 is inserted into the void of leg member 98, edges 832 of the void entrance preferably engage and peel back or otherwise remove peripheral portions of body 826 before it is able to enter the void. While this installation may require added force to be applied to axle lock 824, it may lead to a more precise mating of the axle lock 824 and the void.

Figure 43A:
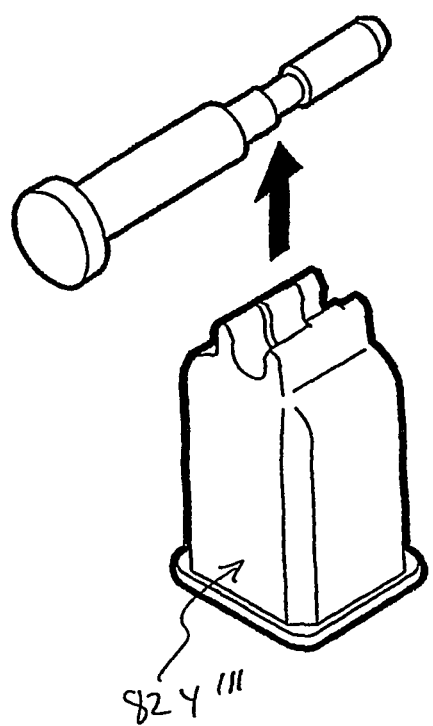
FIG. 43A is an exploded perspective view of an axle pin and axle lock of the barbeque of FIG. 2.
Figure 43B:
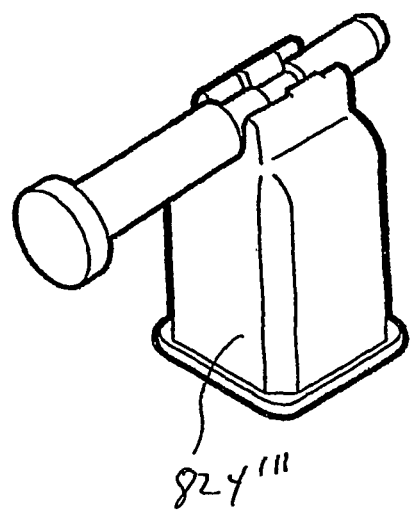
FIG. 43B is an assembled perspective view of an axle pin and axle lock of FIG. 43A.

As illustrated in FIGS. 43A and 43B, alternative axle locks, such as axle lock 824''', may be configured to fit voids in leg members such as leg members 98' and 100' having alternative cross-sections such as a rectangular cross-section.

Referring to FIGS. 61A–63 and 69A–70B, a further alternative axle and axle lock arrangement may be employed. Alternative axle 814' may be secured in place with an alternative axle lock 824'. Axle lock 824' has a body 826' that is preferably similar in shape to axle lock 824, but body 826' differs in that it has a transverse, bore 828' therethrough adjacent an end thereof for engaging a securing portion 830' of axle pin 814', instead of C-shaped channel 828. Securing portion 830' is located between end 816' and shoulder 820' of axle pin 814'.

Axle lock 824' may be attached to barbeque 60 by first inserting body 824' having bore 828' into the void of hollow leg member 98. Bore 828' may be aligned with hole 800 in leg member 98. Axle pin 814' may then be inserted into an entrance of hole 800 and into bore 828'. Pin 814' preferably has a tapered end 829 to guide pin 814' into bore 828'. Bore 828' may have a corresponding tapered opening 831 which co-operates with tapered end 829 to guide axle pin 814' into bore 828'. Pin end 829 may then exit bore 828' at a second opening 833' of bore 828', and may pass through an exit of hole 800 in leg 98 to inhibit removal of axle lock 824' from leg member 98.

Second opening 833 may be marginally smaller than a cross section of axle pin end 829. To facilitate passage of end 829 through marginally smaller second opening 833, end 829 may be tapered. Bore 828' may additionally have a co-operating taper 837, adjacent second opening 833, to direct pin 814' therethrough.

To further facilitate passage of end 829, portions of body 826' adjacent second opening 833 may be resilient. For example, second opening 833 may have at least one and preferably three slots 835 emanating from a central longitudinal axis of bore 828'. Each slot 835 is preferably uniformly angularly displaced from the other. As end 829 is inserted through the marginally smaller opening 833, slots 835 permit opening 833 to widen, facilitating passage of end 829 therethrough. Axle lock is preferably made of a resilient material such as a plastic so that second opening 833 returns to its original shape once axle pin end 829 passes therethrough, and so that significant manual force is not required to encourage pin end 829 through second opening 833.

To inhibit removal of axle pin 814' from bore 828', axle pin 814' may be provided with an indent or groove in the nature of circumferential groove 834' for receiving retaining portions 839 of body 826' which generally define second opening 833. Once axle pin end 816' passes through second opening 833, resilient retaining portions 839 enter groove 834' to inhibit removal of pin 814' from bore 828'.

As illustrated in FIGS. 62A–62E, alternative axle locks, such as axle lock 824'', may be configured to fit voids in leg members such as leg members 98' and 100' having alternative cross-sections such as a rectangular cross-section. Alternative axle lock 824'' may co-operate with alternative axle pin 814'' (shown in FIGS. 70A and 70B) to retain wheel 94.

If wheel 94 is attached to a leg member 98 or 100 which also supports tank base 92, then axle pin 814 is installed in a manner similar to that described above for attachment of the leg extension 114 and caster plug 804. In particular, axle pin 814 is inserted additionally through conduit entry hole 174a and exit hole 174b to also retain conduit 170 about leg member 98 or 100.

Wheel bore 818 may be protected to some degree from dirt and other matter that may interfere with the rotation of wheel 94 about axle pin 814. For example, a cover in the nature of a circular hub cap 838 may be attached to head 822 of axle pin 814 to inhibit passage of matter between axle 814 and bore 818. Head 822 may have a circumferential flange 840 for engagement by a hub cap clip 842 having two or more arms 844 which protrude from a side of hub cap 838. Arms 844 extend in the same general direction, normal to the plane of hub cap 838, and may have protrusions 846 at their distal or free ends 848 for engaging flange 840 of head 822. Arms 844 may be located to engage flange 840 while being generally equidistant from one another and generally equidistant from the axis of hub cap 838. Free ends 848 are preferably resilient to permit grasping of flange 840, as described below.

Hub cap 838 may be attached to head 822 by bringing free ends 848 into alignment with the periphery of pin head flange 840. The protrusions 846 extend from free ends 848 generally toward the axis of hub cap 838, and inhibit passage of flange 840 therebetween. In this orientation the axes of axle pin 814 and hub cap 838 are generally collinear. A force may be applied to hub cap 838 in the direction of axle pin 814 and along its axis to cause free ends 848 to bend away from each other as protrusions 846 pass over flange 840. Once protrusions 846 clear flange 840, resilient ends 848 return to their initial shape and protrusions 846 are adjacent to or abut a side of flange 840 to inhibit hub cap 838 from being separated from axle 814. To further inhibit passage of matter between axle pin 814 and bore 818, hub cap 838 may have at least one circumferential flange 850 for engagement by a corresponding circumferential groove 852 of wheel 94.

All components of barbeque 60, as described above, are preferably made of weather resistant material and/or heat resistant material, as appropriate.

Assembly

The following generally describes the preferred steps that a consumer would follow to assemble a barbeque 60. In many cases the order of these steps may be varied from that described, but to substantially the same effect as the preferred order. Particular details regarding the assembly of components may be found in the appropriate descriptions above. To minimize the skill required for assembly and to eliminate the need for any tools, a number of components may be pre-assembled before they are made available for purchase by consumers. For example, bridging members 102 and 104 may be welded to legs 98 and 100, and beam connection members, such as beam connection member 116, may also be pre-assembled to legs 98 and 100 to form ladder-like supports 62 and 64. Control valves 730 and 732 may be installed within console body 734, handle 582 may be attached to upper casting 76, and wheels 94 and casters 96 (or leg extensions 114) may be attached to legs 98 and 100. While a partially pre-assembled barbeque 60 may occupy a greater volume than a conventional unassembled barbeque, the potential corresponding increase in labour and shipping costs, may be nominal.

In the preferred method of assembly of barbeque 60, the ladder-like supports 62 and 64 are placed on a generally level surface with free ends 204 and 206 of supporting portion 340 and 198 pointing generally upwards. Shelves 68 and 70 may then be assembled thereon in the manner described above to form a snap fit. A snap fit may be achieved by manually exerting a force in a generally downward direction, opposite the direction of insertion D, at a free end 377 of shelf 68, 70. If applicable, shelf frame 372 and or burner frame 436 may be similarly installed. Alternatively, shelves 68 and 70, or shelf frame 372 or burner frame 436, may be attached after the combined supports 62 and 64 and a cross beam 66 are re-oriented so that the support members 62 and 64 rest on their base ends 110 and 112, as described below.

Support members 62 and 64 may then be oriented on the flat surface with base ends 110 and 112 pointing upwards with support members 62 and 64 supported by shelves 68 and 70. Accordingly, supports 62 and 64 are generally vertically oriented. Beam receptacles 120 and 124 may then be oriented towards each other. Ends 92 of cross beam 66 may be inserted into the respective receptacles 120 and 124 with the threaded bushings 102 of cross beam 66 aligned with holes 100. Holes 100 receive screws 96, which may be inserted in a generally downward direction, and which may be manually tightened to secure beam ends 92 to receptacles 120 and 124, in the manner described above. If not pre-assembled, wheels 94, casters 96, and/or leg extensions 114, may be installed either before or after cross beam 66 is attached to support members 62 and 64.

Once cross beam 66 is attached, the rigid three-sided barbeque grill housing support structure, having two ladder-like supports 62 and 64, and a cross beam 66, may be reoriented so that the support members 62 and 64 rest on their base ends 110 and 112 (or wheels 94, casters 96, and/or leg extensions 114, if previously assembled). The support members 62 and 64, and cross beam 66 combine to form a self-supported frame or barbeque support structure. Other components of the barbeque 60 may then be conveniently attached to the support structure.

As described, support members 62 and 64, and cross beam 66, are assembled by joining one side of the structure (support member 62) to the other side (support member 64). This generally differs from many barbeques known in the art which are assembled from the bottom up, beginning with a lower shelf or base and then bolting individual vertical leg members thereto (not shown).

If shelves 68' and 70' are configured with removable tray members 370, the removable members 370 may be placed within frames 372 and encouraged to frictionally or snap fit within frame 372 by application of a downward force thereon when they are aligned within frame 372. If a gravity fit is used, the removable members 370 need only be placed within frame 372 in a downward direction.

If used, front panel 72 may then be assembled between support members 62 and 64. In the present state of assembly, there may be some play in supports 62 and 64. This play permits bridging members 102 and 104 to be moved away from one another. The displacement of bridging members 102 and 104 permits mounting pins 546 to be consecutively mounted into their respective mounting holes 550 in the leg members 98 and 100. Support members 62 and 64 may then be returned to their original position to retain pins 546 in holes 550. Once the pins 546 are located, panel 72 may be pivoted about pins 546 into position as mounting clips 552 are snapped in place onto their respective legs 98 and 100.

Alternatively, front panel 72 may be installed by concurrently sliding both clips 552 onto legs 98 and 100. Clips 552 may then be slid into place and mounting pins 546 can then be inserted into their respective holes 550. This mounting method for panel 72 may be preferable over the former method if the clip 552 is mounted at a mid-point of clip 552, making it difficult to bend a free ends 556 of clip 552 sufficiently to permit passage of leg member 98, 100 into clip 552.

The next step in assembling barbeque 60 is attaching console 86 to the bridging members 102 and 104 in the manner described above. In particular, the console 86 is placed onto tabs 750 and 752 so that slots 764 receive a corresponding tab 750 and 752. Bolt 774 may then be secured by manually inserting it into hole 772 and tightening it in threaded bore 770. In the preferred orientation of bore 770, bolt 774 may be installed horizontally. This step may be alternatively be completed after installation of the lower casting 78, or any of the components thereof.

Tapered guide posts 620 of lower casting 78 may then be aligned with and inserted into guide bores 622. The lower casting 78 may be retained by a generally downward insertion and manual tightening of bolts 254 through casting bores 258 and into threaded bores 256. If post 612' is used then nut 610' is tightened on to post 612' in a generally downward direction. Alternatively, lower casting 78 may be installed after installation of front panel 72.

Burner 80 may then be installed in the manner described above. In particular, burner 80 may be placed within lower casting 78, and free ends 674 of each duct 672 are inserted through separate burner duct passages 316 and 318. Support members 646 are then inserted and secured within openings 658 by applying a generally downward force to form a snap fit with lower casting 78. Alternatively, burner 80 may be installed after both lower casting 78 and console 86 are installed, in which case igniter wire 694 may be attached to console 86 after burner 80 is installed.

Side burner assembly 434 may then be installed in the manner described above. Side shelf 68 may alternatively be installed after burner assembly 434 is installed.

If not pre-installed, handle 582 and temperature gauge 594 may be attached to upper casting 76. Upper casting 76 may then be attached to lower casting 78, or installed at a later step as described below.

If not pre-installed, the components of the ignition assembly may be assembled by fastening, for example with bolts or screws, the igniter activation assembly 690 to the concave side of console 86. Igniter activation knob 692, is attached to igniter activation assembly 690 from the convex side of console 86. The igniter activation assembly 690 is then connected to igniter 688 via igniter wire 694. Igniter 694 may be clipped or otherwise attached between burner 80 and console 86.

In the next step of assembly of barbeque 60, support struts 704 are placed onto fins 706, and one or more openings 702 of angled bars 88 are placed over locating tabs 346 of the support struts 704. One or more grill plates 82 may then be placed to be supported by ledges 718. The hinge bolts 572 of upper casting 76 are aligned and slidingly engaged with receiving members 574 and 576 of the lower casting 78, and may then be retained by clip 578. Cantilevered warming rack 84 may then be installed by inserting mounting pins 722 into mounting pin holes 724 located in upper casting 76. Once the pins 722 are inserted, toes 726 of warming rack support legs 408 may be placed into rebates 644 located in edges 240 of lower casting 78. If not pre-installed, handle 582 may be attached through holes 590 in upper casting 76, using hand tightened bolts 588, and temperature gauge 594 may be attached through holes 595 in upper casting 76, using hand tightened wing nuts 592. If applicable, shelf tray 370, shelf slats 408, and/or the elements of burner 222 or 222' may be attached in the manner described above. Finally, tank 90 may be placed in base 92, and attached to a fuel connector, which is tightened manually. If an alternate fuel source is used, this may be attached to control valves 730, 732.

As will be noted from the above description, the method of assembly described above permits most of the barbeque components to be conveniently installed from a generally top down or horizontal direction. For example, the following connections may be made in a generally top down direction: attaching cross beam 66 to beam connection members 116 and 122 using bolts 200; installing leg extensions 114 or caster plugs 804 to leg 98 or 100; attaching shelf 68 to shelf supporting portions 340 and 342; positioning lower casting 74 relative to bridging member 102; securing nut 610' to bolt 612' to attach lower casting 74 to bridging member 102; attaching burner 80 to lower casting 74; and moving engaging member 345 to engage tank collar 316. Because many components may be installed in a downward direction, gravity may assist in the positioning and connecting of parts. For example, console 86 may be placed upon and supported by tabs 750 and 752 to maintain console 86 in a preferred orientation before it is secured. Installation of components requiring fastening from a bottom up direction is limited.

By enabling the manual and generally top down installation of many components of the barbeque 60, the various features described above may enable manufactures to ship unassembled barbeques to reduce costs, while providing a barbeque that may be readily and quickly assembled by unskilled consumers.

It will be understood by those skilled in the art that this description is made with reference to the illustrative embodiments and methods, and that it is possible to make other embodiments and to make use of other methods, while employing the principles of the invention which fall within the spirit and scope thereof. For example, various embodiments of a barbeque of the present invention may include different combinations of the alternative embodiments of the component parts thereof.

What is claimed is:

1. A clip for mounting a valve to a barbeque support structure, the valve having a stem for controlling fuel flow through the valve, and the barbeque support structure having edges defining an opening for receiving said valve clip, said valve clip comprising:
  a body having:
    a passage defined therein for receiving the stem of the valve;
  means for mounting said body to the valve; and
  a retainer for engaging an edge of the valve clip opening, said retainer including two pairs of opposed wings for receiving said edge therebetween;
  wherein said body is movable from a first position, where it is positioned within the opening, to a second position, wherein said retainer engages the edge of the valve clip opening.

2. The valve clip of claim 1 wherein said retainer is integrally formed in said body.

3. The valve clip of claim 1, wherein each pair of opposed wings extends from said body in a generally opposite direction from the other pair of opposed wings, and each pair of wings respectively engages an opposed edge of said opening when said body is in said second position.

4. The valve clip of claim 1, wherein said wings are generally planar and are joined at proximal ends thereof at an interface, said interface having a curved portion and a tangent portion lying in a plane generally orthogonal to the planes of said wings, wherein said curved portion guides said tangent portion into abutting relationship with said edge when said valve clip is rotated from said first position to said second position.

5. The valve clip of claim 1, wherein said body is rotatable about its central axis from said first position to said second position.

6. The valve clip of claim 5, further comprising a tab for inhibiting further rotation of said valve clip relative to the barbeque support structure when said body is in said second position, said tab aligning with and abutting the edge of the valve clip opening when said body is in said second position.

7. The valve clip of claim 6, wherein said tab engages the edge of the valve clip opening after said body has been rotated by 90 degrees about its central axis from said first position to said second position.

8. The valve clip of claim 6, wherein said tab abuts and is resiliently deflected by said edge when said valve clip is in said first position, and said tab clears the edge and straightens to align with the edge to provide a snap fit between said tab and said edge when said valve clip is rotated to said second position.

9. The valve clip of claim 6, wherein said tab is ramped at a distal end thereof, said ramp increasing in a direction opposite to a direction of rotation of said body from said first to second positions, said ramp being configured to project into plane of the opening when said clip is in said second position.

10. The valve clip of claim 6, wherein said tab is sufficiently resilient to permit manual deflection thereof to clear said edge when said body is in said second position to permit removal of said valve clip by rotation of said valve clip to said first position.

11. The valve clip of claim 6, wherein the edges of said opening are at least partially defined by opposed fins, and said valve clip includes two tabs, wherein each tab abuts a respective fin when said valve clip is in said second position.

12. The valve clip of claim 1, wherein said body has a cross-sectional shape that generally conforms to the edges of the valve clip opening when said valve clip is in said first position.

13. The valve clip of claim 1, wherein said mounting means includes a bore defined in said body, and a fastener cooperable with said bore to mount the valve to said body.

14. The valve clip of claim 13, wherein said bore is defined by a post formed in said body, said post having a length sufficient to position the valve stem so that it projects through said passage to permit the stem to be mounted to a knob when the valve is mounted to said valve clip.

15. The valve clip of claim 1, wherein said body is made from a resilient plastic.

* * * * *